United States Patent
Bahrenburg

(10) Patent No.: US 9,485,066 B2
(45) Date of Patent: Nov. 1, 2016

(54) METHOD OF INTERFERENCE CANCELLATION AND METHOD OF DETECTION OF ERRONEOUS NEIGHBOUR CELL MEASUREMENTS

(75) Inventor: Stefan Bahrenburg, Waterloo (CA)

(73) Assignee: BlackBerry Limited, Waterloo, Ontario (CA)

(*) Notice: Subject to any disclaimer, the term of this patent is extended or adjusted under 35 U.S.C. 154(b) by 385 days.

(21) Appl. No.: 14/009,785

(22) PCT Filed: Dec. 23, 2011

(86) PCT No.: PCT/EP2011/074030
§ 371 (c)(1),
(2), (4) Date: Dec. 16, 2013

(87) PCT Pub. No.: WO2012/136286
PCT Pub. Date: Oct. 11, 2012

(65) Prior Publication Data
US 2014/0112250 A1    Apr. 24, 2014

Related U.S. Application Data

(60) Provisional application No. 61/472,023, filed on Apr. 5, 2011, provisional application No. 61/496,355, filed on Jun. 13, 2011.

(51) Int. Cl.
*H04L 5/00*    (2006.01)
*H04L 1/00*    (2006.01)
*H04B 1/7083*    (2011.01)
(Continued)

(52) U.S. Cl.
CPC .......... *H04L 5/0032* (2013.01); *H04B 1/7083* (2013.01); *H04B 1/7107* (2013.01); *H04J 11/005* (2013.01); *H04J 11/0093* (2013.01); *H04L 1/0011* (2013.01); *H04L 1/0036* (2013.01); *H04L 25/0236* (2013.01)

(58) Field of Classification Search
CPC . H04L 5/0032; H04L 1/0011; H04L 1/0036; H04L 25/0236; H04B 1/7083; H04B 1/7107; H04J 11/005; H04J 11/0093
See application file for complete search history.

(56) References Cited

U.S. PATENT DOCUMENTS

2005/0111408 A1    5/2005    Skillermark et al.
2007/0058697 A1    3/2007    Cheng et al.
(Continued)

FOREIGN PATENT DOCUMENTS

CN    101361335    2/2009
EP    1499032    1/2005
(Continued)

OTHER PUBLICATIONS

Chinese Intellectual Property Office, "Office Action", issued in connection with Chinese Patent Application No. 201180071458.0, dated Aug. 11, 2014 (10 pages).

(Continued)

*Primary Examiner* — Melvin Marcelo
(74) *Attorney, Agent, or Firm* — Fish & Richardson P.C.

(57) ABSTRACT

Methods of interference cancellation are provided. Channel estimation is performed with or without interference cancellation. Methods of detection of erroneous neighbor cell measurements are provided. The channel estimates for neighbor cells are processed to identify unreliable measurements.

16 Claims, 37 Drawing Sheets

(51) Int. Cl.
*H04B 1/7107* (2011.01)
*H04J 11/00* (2006.01)
*H04L 25/02* (2006.01)

(56) References Cited

U.S. PATENT DOCUMENTS

| | | |
|---|---|---|
| 2007/0110127 A1 | 5/2007 | Mergen et al. |
| 2010/0029213 A1 | 2/2010 | Wang |
| 2011/0195684 A1* | 8/2011 | Zhang .................. H04B 1/7107 455/226.1 |

FOREIGN PATENT DOCUMENTS

| | | |
|---|---|---|
| EP | 1501327 | 1/2005 |
| EP | 1653633 | 5/2006 |
| WO | 2007059518 | 5/2007 |
| WO | 2009072961 | 6/2009 |
| WO | 2009078766 | 6/2009 |
| WO | 2011022404 | 2/2011 |

OTHER PUBLICATIONS

3GPP TS 25.221 V7.11.0 (May 2009), Technical Specification: 3rd Generation Partnership Project; Technical Specification Group Radio Access Network; Physical channels and mapping of transport channels onto physical channels (TDD) (Release 7), dated May 2009, 190 pages.

International Search Report and Written Opinion, issued by the International Searching Authority in connection with International Application No. PCT/EP2011/074030, on Jun. 28, 2012, 25 pages.

Office Action issued in Chinese Application No. 201180071458.0 on Jul. 3, 2015; 7 pages.

Communication Pursuant to Article 94(3) EP issued in EP Application No. 11805048.3 on Apr. 21, 2016; 7 pages.

* cited by examiner

METHOD OF INTERFERENCE CANCELLATION AND METHOD OF DETECTION OF ERRONEOUS NEIGHBOUR CELL MEASUREMENTS

RELATED APPLICATIONS

This application claims the benefit of U.S. Provisional Application No. 61/472,023 filed Apr. 5, 2011 and U.S. Provisional Application No. 61/496,355 filed Jun. 13, 2011 both hereby incorporated by reference in their entirety.

FIELD

The application relates to interference cancellation, and to methods of detecting erroneous neighbor cell measurements.

BACKGROUND

In some existing systems, such as in TD-SCDMA (Time Division Synchronous Code Division Multiple Access), HCR (High Chip Rate Time Division Duplex) and VHCR (very HCR Time Division Duplex) systems, interference cancellation is used to cancel a serving cell's/other strong cell's signals from an overall signal for the purpose of preparing to measure receive power of a cell's signals, and in particular, for measuring of the RSCP (Received Signal Code Power) of the P-CCPCH (Primary Common Control Physical CHannel).

Regardless of whether interference cancellation is used or not the presence of (remaining) interference is a serious concern in CDMA systems, in particular the effect of such interference on the aforesaid measurements. The issue might arise that the remaining interference is covering up the measurement result such that it might become unusable.

SUMMARY

According to one aspect of the present application, there is provided a method comprising: processing a signal to produce an interference cancellation component of a first cell; performing signal detection for a to be detected cell operating on a same frequency as the first cell based on the signal minus the interference cancellation component if the interference cancellation component has a power that is large enough compared to a total power of the signal as defined by a first threshold; performing signal detection for a to be detected cell based on the signal without having subtracted the interference component if the interference cancellation component has a power that is not large enough compared to the total power of the signal as defined by the first threshold.

In some embodiments, there is provided the method as summarized above wherein processing the signal to produce the interference cancellation component comprises: generating a channel estimate for the first signal using a cell-specific code of a first cell, the channel estimate comprising a plurality of taps; removing certain taps from the channel estimate to produce a post-processed channel estimate; using the cell-specific code and the channel estimate with the certain taps removed to reconstruct the interference cancellation component; wherein performing signal detection of a to be detected cell based on the signal minus the interference cancellation component comprises using a cell-specific code of the to be detected cell; and performing signal detection of a to be detected cell based on the signal without having subtracted the interference component comprises using the cell-specific code of the to be detected cell.

In some embodiments, there is provided the method as summarized above wherein removing certain taps comprises removing taps that each have a power that is small enough compared to the total power of the signal as defined by a second threshold.

In some embodiments, there is provided the method as summarized above wherein each of the taps other than the certain taps has a power that is large enough compared to the average power of taps other than the certain taps as defined by a second threshold.

According to another aspect of the present application, there is provided a method comprising: processing a signal to produce a channel estimate in respect of a first cell. the channel estimate comprising a plurality of taps; removing certain taps from the channel estimate to leave remaining taps and then producing an interference cancellation component from the remaining taps; performing first signal detection of a to be detected cell operating on a same frequency as the first cell based on the signal minus the interference cancellation component to produce a first signal detection result; performing second signal detection of the to be detected cell based on the signal without having subtracted the interference cancellation component to produce a second signal detection result; selecting between the first signal detection result and the second signal detection result.

In some embodiments, there is provided the method as summarized above wherein: performing first signal detection comprises performing channel estimation to produce a first channel estimate comprising a plurality of taps and removing certain taps to produce a first post-processed channel estimate; performing second signal detection comprises performing channel estimation to produce a second channel estimate comprising a plurality of taps and removing certain taps to produce a second post-processed channel estimate; selecting between the first signal detection result and the second signal detection result is based on: the power of taps in the first post-processed channel estimate; the power of taps in the second post-processed channel estimate; the average power of taps in the first channel estimate; and the average power of taps in the second channel estimate.

In some embodiments, there is provided the method as summarized above wherein selecting comprises: for the first signal detection, determining a ratio of a sum of powers of the taps remaining after removing certain taps to the average power of taps of the first channel estimate; for the second signal detection, determining a ratio of a sum of powers of the taps remaining after removing certain taps to the average power of taps of the second channel estimate; selecting the result with the larger ratio.

According to still another aspect of the present application, there is provided a method comprising: processing a signal to produce an interference cancellation component that is an estimate of a component of the signal that is due to a first cell by: generating a channel estimate for the first signal using a cell-specific code of a first cell to produce a channel estimate comprising a plurality of taps; removing certain taps from the channel estimate to produce a post-processed channel estimate; producing the interference cancellation component using post-processed channel estimate; performing channel estimation of a to be detected cell operating on a same frequency as the first cell based on the signal minus the interference cancellation component by: generating a channel estimate for the to be detected cell using a cell-specific code of the to be detected cell; removing certain taps from the channel estimate to produce a channel estimate with certain taps removed for the to be detected cell; the method further comprising at least one of: a) discarding the channel estimate with certain taps removed for the to be detected cell and/or reporting a lowest reportable value and/or processing a very small value and/or not reporting the channel estimate if a combined power of the taps of the channel estimate with certain taps removed that define a to be measured channel for the to be detected cell is below a total receive power for the signal by a threshold amount; and b) discarding the channel estimate with certain taps removed for the to be detected cell and/or reporting a lowest reportable value and/or processing a very small value and/or not reporting the channel estimate if a combined power of the taps of the channel estimate with certain taps removed for the first cell is small enough compared to a total receive power for the signal as defined by a threshold amount.

According to yet another aspect of the present application, there is provided a method of processing a signal, the method comprising: obtaining a channel estimate for a cell, the channel estimate comprising a plurality of taps; removing certain taps from the channel estimate; if a combined power of taps of the channel estimate after removing certain taps that define a to be measured channel is less than a certain threshold below an amount based on a total power of the signal, discarding the channel estimate for the cell and/or reporting a minimum reportable receive power and/or processing a very small value.

In some embodiments, there is provided the method as summarized above wherein removing certain taps from the channel estimate comprises using a regression approach to differentiate between the taps to be removed and the taps not to be removed.

In some embodiments, there is provided the method as summarized above wherein using a regression approach comprises: sorting the plurality of taps into a sorted list; performing a regression on a subset of taps in a sorted list representing interference and noise to produce a regression result; removing taps that are not large enough compared to the regression result as defined by a threshold.

In some embodiments, there is provided the method as summarized above wherein the certain taps comprises taps that each have a power that is small enough compared to the total power of the signal as defined by a second threshold.

In some embodiments, there is provided the method as summarized above wherein taps other than the certain taps are those that each have a power that is large enough compared to the average power of the certain taps as defined by a second threshold.

In some embodiments, there is provided the method as summarized above, comprising: without first performing interference cancellation, a mobile device processing a signal to detect a ghost cell, a ghost cell being a cell with an unreliable measurement result as defined by ghost cell detection criteria; in case a ghost cell is detected, the mobile device systematically searching for cells and their midamble codes which are not in a neighbor cell list; for each cell found as a result of the systematic search, the wireless device applying interference cancellation of a component of the received signal due to the cell if a total received power as defined by a sum of taps of a post processed channel estimate of the cell is large enough as defined by a threshold compared to the overall received power of the midamble.

According to a further aspect of the present application, there is provided a method comprising: without first performing interference cancellation, a mobile device processing a signal to detect a ghost cell, a ghost cell being a cell with an unreliable measurement result as defined by ghost cell detection criteria; in case a ghost cell is detected, the mobile device systematically searching for cells and their midamble codes which are not in a neighbor cell list; for each cell found as a result of the systematic search, the wireless device applying interference cancellation of a component of the received signal due to the cell if a total received power as defined by a sum of taps of a post processed channel estimate of the cell is large enough as defined by a threshold compared to the overall received power of the midamble.

In some embodiments, there is provided the method as summarized above, comprising: processing a signal to detect a cell in accordance with a ghost cell detection criteria, a ghost cell being a cell with an unreliable measurement result as defined by the ghost cell detection criteria; in case a cell is detected with the ghost detection threshold, determining that the cell is a ghost cell if the cell's BCCH (broadcast control channel) cannot be detected; determining that the cell is not a ghost cell if the cell's BCCH can be detected successfully.

According to still a further aspect of the present invention, there is provided a method comprising: processing a signal to detect a cell in accordance with a ghost cell detection criteria, a ghost cell being a cell with an unreliable measurement result as defined by the ghost cell detection criteria; in case a cell is detected with the ghost detection threshold, determining that the cell is a ghost cell if the cell's BCCH (broadcast control channel) cannot be detected; determining that the cell is not a ghost cell if the cell's BCCH can be detected successfully.

In some embodiments, there is provided the method as summarized above further comprising: where interference cancellation is employed in respect of a primary-common control channel of a to be cancelled cell, the method further comprising performing interference cancellation of at least one other channel transmitted by the to be cancelled cell.

In some embodiments, there is provided the method as summarized above wherein performing interference cancellation for at least one other channel known to be transmitted by the to be cancelled cell comprises performing interference cancellation for at least one of S-CCPCH, PICH, FPACH (Secondary-Common Control Channe, Paging Indicator Channel, Fast Physical Access Channel).

In some embodiments, there is provided the method as summarized above further comprising: determining an overall receive power; determining a power associated with at least one midamble shift other than a midamble shift of interest, the at least one other midamble shift using the same basic midamble code as the midamble shift of interest; subtracting the power associated with the at least one midamble shift other than the midamble shift of interest from the overall receive power to produce a corrected total receive power, and using the corrected total receive power in place of the overall receive power.

In some embodiments, there is provided the method as summarized above further comprising: for a to be cancelled cell, determining the at least one midamble shift other than the midamble shift of interest from broadcast system information.

In some embodiments, there is provided the method as summarized above further comprising: for a to be cancelled cell, determining the at least one midamble shift other than the midamble shift of interest from already known behaviour of another nearby cell, based on an assumption that nearby cells will behave similarly.

In some embodiments, there is provided the method as summarized above further comprising adjusting the power associated with the at least one midamble shift other than the midamble shift of interest that is subtracted from the total receive power to produce a corrected total receive power by: determining a set of taps for the P-CCPCH (Primary-Common Control Channel); determining the power associated with the least one midamble shift using only taps that belong to the set of taps for the P-CCPCH.

In some embodiments, there is provided the method as summarized above further comprising: determining a receive power associated with unused channel estimation windows; adjusting the power associated with the at least one midamble shift other than the midamble shift of interest that is subtracted from the total receive power to produce a corrected total receive power by: setting the power to zero if it is not larger than the power associated with the unused channel estimation windows by a threshold amount.

In some embodiments, there is provided the method as summarized above further comprising: determining an average receive power associated with unused channel estimation windows; discarding the channel estimate for the cell and/or reporting a minimum reportable receive power and/or processing a very small value if it is not larger than the power associated with the unused channel estimation windows by a threshold amount.

In some embodiments, there is provided the method as summarized above further comprising: determining if a cell measurement is reliable or unreliable in accordance with a criteria that spans over multiple measurement intervals.

In some embodiments, there is provided the method as summarized above further comprising: processing a signal to detect a cell in accordance with a ghost cell detection criteria, ghost cell being a cell with an unreliable measurement result as defined by the ghost cell detection criteria; looking systematically for cells that are not included in a neighbor cell list, and if some are found, treating them as known cells, for the purpose of performing interference cancellation; at least one of: if no such cell is found found, then declaring the cell detected in accordance with the ghost detection criteria to be a ghost cell; if no such cell is found, attempting to detect a BCCH of the cell, and declaring the cell detected in accordance with the ghost detection criteria to be a ghost cell if the BCCH cannot be detected.

In some embodiments, there is provided the method as summarized above further comprising: assigning one of two states to a cell, the two states being reliable_cell or ghost_cell; transitioning between the two states on the basis of a criteria applied to multiple consecutive measurements.

In some embodiments, there is provided the method as summarized above further comprising: recognizing when it is difficult to synchronize to a cell, and using such information to aid the identification of a ghost cell.

In some embodiments, there is provided the method as summarized above further comprising: when a ghost cell is detected with a high total receive power and no interference cancellation being performed, performing a systematic search for cells not included in a neighbor cell list, and if some are found treating them as known cells for the purpose of interference cancellation.

In some embodiments, there is provided the method as summarized above further comprising: attempting to read the BCCH of a cell in the neighbour cell list; in case the SNR on a carrier of the cell on the neighbour cell list would not allow the BCCH of the cell in the neighbor cell list to be detected with sufficient quality this cell is either not reported or reported at the option of the mobile device for neighbor cell measurements not being in need to be reported or reported with the minimum reportable RSCP for neighbor cell measurements which have to be reported.

In some embodiments, there is provided the method as summarized above further comprising: estimating an SNR of a to be detected/measured cell; in case the SNR on that carrier would not allow the BCCH of the cell in the neighbor cell list to be detected with sufficient quality this cell is either not reported or reported at the option of the mobile device for neighbor cell measurements not being in need to be reported or reported with the minimum reportable RSCP for neighbor cell measurements which have to be reported.

In some embodiments, there is provided the method as summarized above further comprising: using the input of the channel estimation for a first cell as an input to performing channel estimation for a second cell.

In some embodiments, there is provided the method as summarized above wherein the method is performed in a user equipment.

In some embodiments, there is provided the method as summarized above wherein the signal is a TD-SCDMA (time divisional-synchronized code division multiple access) signal.

In some embodiments, there is provided the method as summarized above wherein the signal is a HCR-TDD (High Chip Rate Time Division Duplex) signal.

In some embodiments, there is provided the method as summarized above wherein the signal is a VHCR TDD (Very High Chip Rate Time Division Duplex) signal.

In some embodiments, there is provided the method as summarized above wherein the signal is a LTE (Long Term Evolution) signal.

In some embodiments, there is provided the method as summarized above wherein the signal is a GSM (Global System for Mobile Communications) signal.

In some embodiments, there is provided the method as summarized above wherein performing signal detection and channel estimation upon a signal in respect of a cell comprises using a cell-specific code of that cell.

In some embodiments, there is provided the method as summarized above wherein the cell-specific code is a midamble.

In some embodiments, there is provided the method as summarized above wherein the cell-specific code is a reference signal.

In some embodiments, there is provided the method as summarized above further comprising reporting a power measurement based on the channel estimate for cell.

In some embodiments, there is provided the method as summarized above wherein the power measurement is an RSCP (received signal code power) measurement.

In some embodiments, there is provided a mobile device configured to implement any one of the methods summarized above.

In some embodiments, there is provided a computer readable medium having stored thereon instructions for execution by one or more processors of a mobile device which when executed perform any one of the methods summarized above.

DETAILED DESCRIPTION

Figure 1:
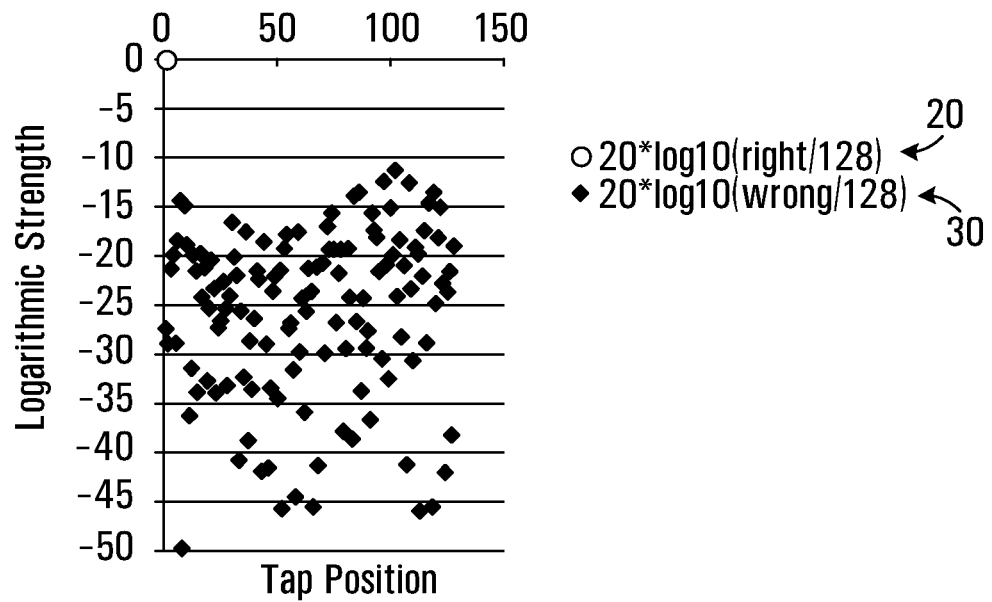
FIG. 1 is a plot of channel estimates using a correct midamble and an incorrect midamble.

In some lab testing for routing area updates, experiments were conducted to examine a case in which the signal of the serving cell is made very small from one instant to another and in the same instant another cell's signal is made as strong as the previous serving cell's signal has been. For this experiment, both the serving cell and the new cell are assumed to work on the same frequency. Since both cells are on the same frequency, reselection from a first cell to a second cell on the same frequency can be referred to as intrafrequency cell reselection. In this situation, the device under test was not able to find the new cell and stayed with the previous cell whilst assuming that the previous cell is still in good condition.

Typically, the network supplies a neighbor cell list in respect of a serving cell. This neighbor cell list contains neighbor cells of the serving cell. In the field, there are often situations where due to the way network planning was conducted, the neighbor cell list in respect of a serving cell supplied by the network lists cells that can be much weaker than other cells on the same frequencies that are not included in the neighbor cell list. The result is that the device under test A) reports neighbor cells on these frequencies which are not there at all, or B) reports neighbor cells on these frequencies which are there, but which are heavily interfered with by the strong cells which are not included in the neighbor cell list on those frequencies, and in so doing reports an incorrect RSCP measurement. The same might be the case for a heavily interfered with serving cell. This may result in failed handovers and call drops.

In TD-SCDMA, a given cell operates with an assigned frequency or frequencies from a set of available frequencies and an assigned midamble. In TD-SCDMA there are 128 basic midamble codes of length 128 available for assignment to the different cells. Cells with the same basic midamble code should not be able to be received on the same frequency. Appropriate radio network planning should ensure that no mobile device is receiving two cells on the same frequency and the same basic midamble code. The midamble code is used for channel estimation and differentiation of the cells. The transmitted TD-SCDMA signal has a midamble section during which the midamble is transmitted and a data section during which other channels are transmitted.

If channel estimation is performed for a cell operating on frequency $F_i$, and (basic) midamble (code) $M_j$, but using $F_i$ and $M_k$ for the channel estimation (i.e. the right frequency and the wrong midamble), the result looks like noise. A channel estimate for a cell for these purposes may be performed by performing correlation of a midamble portion of a received signal (what is assumed to be the midamble portion of the received signal) with the midamble code of the cell. In the absence of interference, this produces a set of taps, each having an amplitude and delay, that collectively represent the impulse response of the channel. Note that in some cases, a different cyclic shift of the midamble assigned to a given cell is transmitted to each mobile device; in this case, the mobile device uses an appropriate channel estimation window to detect the appropriate cyclic shifted midamble and its channel impulse response in the channel estimation window.

FIG. 1 shows this result quite clearly. The channel estimate 20 is the result of the channel estimate derived from a pure received signal of the right midamble code. Each channel estimate 30 is the result of the wrong midamble code being used to derive the channel estimate. For channel estimate 20, there is one tap for the channel estimate—the other taps are so small that they are not visible on this graph. For channel estimates 30, these are noisy channel estimates in which the estimated taps have on average $\frac{1}{128}$ of the power as the overall received signal; the tap position is in units of the CDMA chip duration.

Interference from Cells on Same Frequency:

In the case of the channel estimation for intrafrequency cell reselection (cells operating on the same frequency as that of the serving cell), the interference from the serving cell's midamble and possibly other data signals is cancelled from the received signals such that the channel estimation of the intrafrequency neighbor cells is done with the resultant signal.

More generally, in the case of channel estimation for a second cell operating on a frequency, where there is a first cell (or cells) operating on the same frequency as that of the first cell, the interference due to the first cell's midamble and possibly due to other channel(s) transmitted from the first cell in the data section is cancelled from the received signals such that channel estimation of the second cell is done with the resulting signal. In the case, the first cell may be another known cell that is not necessarily the serving cell.

The following is an example of the steps which might be performed with the midamble portion of the to be detected signal and the midamble portion of a known to be cancelled signal:

1. Channel estimation of the first received signal with the midamble of the known to be cancelled cell.
2. Post processing of the channel estimate by identifying taps containing only noise (e.g. lower than a threshold with respect to the overall RX power). These taps are removed from the channel estimate by setting them to zero.
3. Reconstructing the midamble and possibly the rest of the data signal of the known cell with the postprocessed channel estimate. In case the midamble of another cell is received, it usually has a different timing than that of the to be detected cell. This means that it could well be that a data section of a burst of the to be cancelled cell is overlapping with the midamble of the to be detected cell. In some embodiments, in order to benefit further from interference cancellation, the part of the data section overlapping with the to be detected midamble is cancelled as well. The result is subtracted from the first received signal to get a second received signal. This is quite effective in the case the known to be cancelled cell has almost the same or a lot higher power than the other cells.
4. The to be detected cells are then detected by means of processing the second received signal with their midamble codes.

There may be a case where there is almost only noise/interference. This will be the case where the component from the known to be cancelled cell is very weak compared to the overall signal, or absent altogether. In this case, the channel estimate of the known cell looks like noise. In this case, it will not be possible to distinguish a useful channel impulse response in the channel estimate because the noise is then also creating very strong taps. Typically, the channel impulse response is viewed as containing only a few taps each with a small power.

A simple algorithm then will see only the random noisy channel impulse response taps and is not able to decide whether the channel estimate is useful or not. It will assume that it has a channel impulse response (CIR) with strong multiple path propagation and will only chose the very weak taps to be removed. Most of the taps will pass the post processing.

Note that at least one tap is to be removed because otherwise the interference cancelled midamble will be the same as the received midamble and the result after interference cancellation will be zero in the midamble section of the received signal.

The result is that the known cell has still a quite a large apparent noise power (for the RSCP measurement a channel estimation window of 16 of the 128 taps is taken—9 dB below the received power of the first received signal if all 16 taps are considered). If this cell is then taken for interference cancellation the result will be that, the reconstructed signal is almost the same as the first received signal and the intrafrequency cell cannot be detected from the remaining debris of the received signal. In case an algorithm is not detecting this situation, a small result will be measured and reported even if the to be detected cell comes in very strong. In case the known cell is subject to measurement, a RSCP measurement result of about 9 dB below the interference plus noise would be reported—even if the cell is not there any more.

Solutions to Measurement in the Presence of Cells on the Same Frequency

Selectively Perform Interference Cancellation

In a first embodiment, in case a known cell (such as a serving cell or another cell operating on the same frequency as the to be detected cell) could be interference cancelled from a first receive signal, interference cancellation is switched off if the known cell has a receive power (for example as determined by the sum of tap powers after the channel estimation) of less than or equal to a defined fraction (e.g. a defined fraction IC_threshold) of the overall receive power of the first receive signal, or is at least a defined amount less than the overall receive power. In other words, interference cancellation is only performed for a known cell whose power is large enough relative to the power of the first receive signal as defined by a threshold. Throughout this description, it is to be understood that a threshold can be a factor, for example a fractional factor, e.g. 20%, or a defined amount (in dB or other units).

Figure 2:
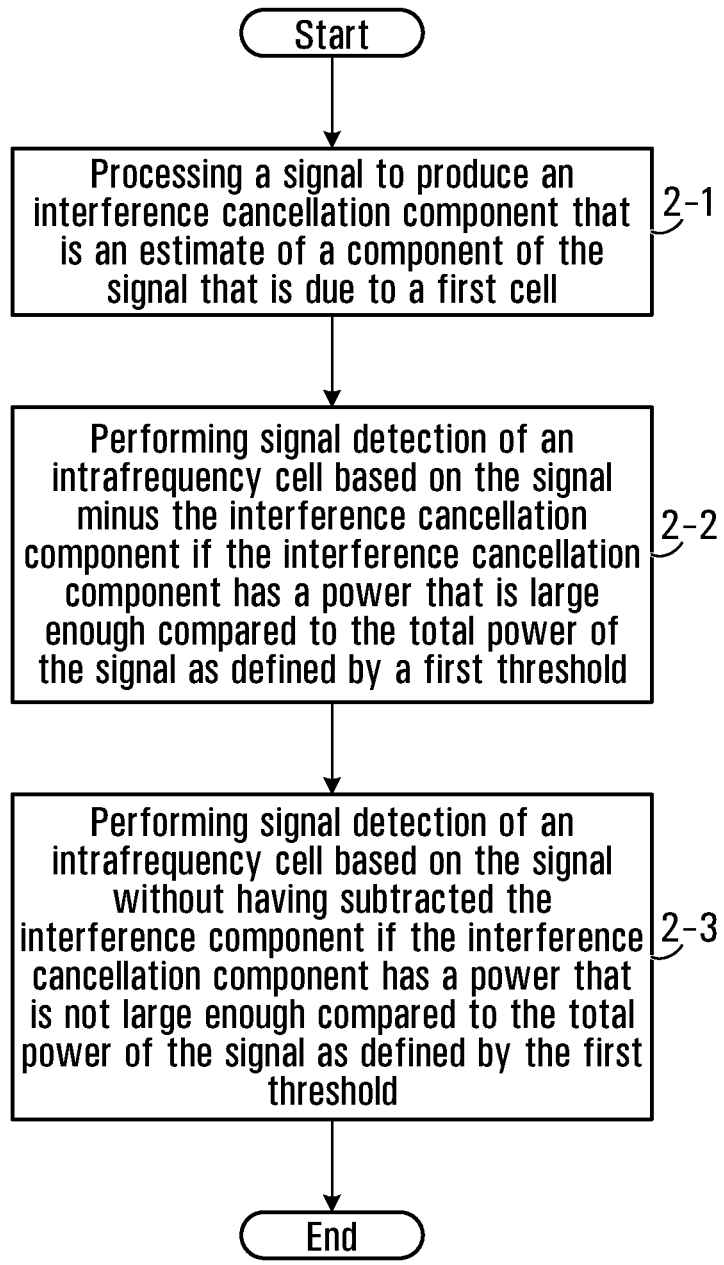
FIG. 2 is a flowchart of a method of performing channel estimation with selective interference cancellation.

Referring now to FIG. 2, a flowchart of a method provided by an embodiment of the application will now be described. This method may, for example, be performed by a mobile device. The method begins in block 2-1 with processing a signal to produce an interference cancellation component that is an estimate of a component of the signal that is due to a first cell. The signal may, for example, be a received TD-SCDMA signal, but may alternatively be a signal from another standard, examples of which were provided in the background. The component due to the first cell may be a component from a serving cell, or from another known cell. The method continues in block 2-2 with performing signal detection (e.g. channel estimation) of a to be detected cell on the same frequency as that of the first cell based on the signal minus the interference cancellation component if the interference cancellation component has a power that is large enough compared to the total power of the signal as defined by a first threshold. In block 2-3, if the interference cancellation component has a power that is not large enough compared to the total power of the signal as defined by the first threshold, signal detection of the to be detected cell is performed based on the signal without having subtracted the interference component.

In some embodiments, processing the signal to produce the interference cancellation component of a first cell that is the to be cancelled cell involves the following steps:

generating a channel estimate for the first signal using a cell-specific code of a first cell;

post processing of the channel estimate by identifying certain taps and removing these taps from the channel estimate;

using the cell-specific code (and possibly part of the rest of the data signal) with the postprocessed channel estimate to produce the interference cancellation component.

The cell-specific code may, for example, be the previously referenced midamble code, but other cell-specific codes may alternatively be employed. The specific form of the cell-specific code may differ depending upon the radio access technology and the part of the signal to be cancelled.

In some embodiments, identifying certain taps to be removed involves identifying taps that each have a power that is smaller than the total power of the first signal as defined by a second threshold.

Perform Channel Estimation with and without Interference Cancellation

In a second embodiment, channel estimation for a to be detected cell in the presence of a known cell operating on the same frequency is performed both with and without the interference cancellation step, and a decision is made on which channel estimate to use. The following is a specific example of how this decision might be made. A channel estimate of the known cell is generated, and post processing is performed to remove certain taps and an interference component is generated based on the post processed channel estimate for the known cell. A second signal is reconstructed by removing the interference component. Then the channel estimation for the to be detected cell is performed based on the second signal, and post processing is again performed to remove certain taps to produce a first post processed channel estimate for the to be detected cell. In addition, channel estimation for the to be detected cell is performed using the first signal without removing the interference component, and this is post processed by removing certain taps to produce a second post processed channel estimate. The sum of the powers of taps remaining after the postprocessing of the to be detected cell is determined for both the first post processed channel estimate and the second post processed channel estimate. For each post processed channel estimate, the ratio of the sum of powers of the remaining taps to the average/median power of the taps for the corresponding channel estimate with no post processing is determined. Then the channel estimate with the larger power ratio is selected. Other methods of selecting between the two results may alternatively be employed.

Figure 3:
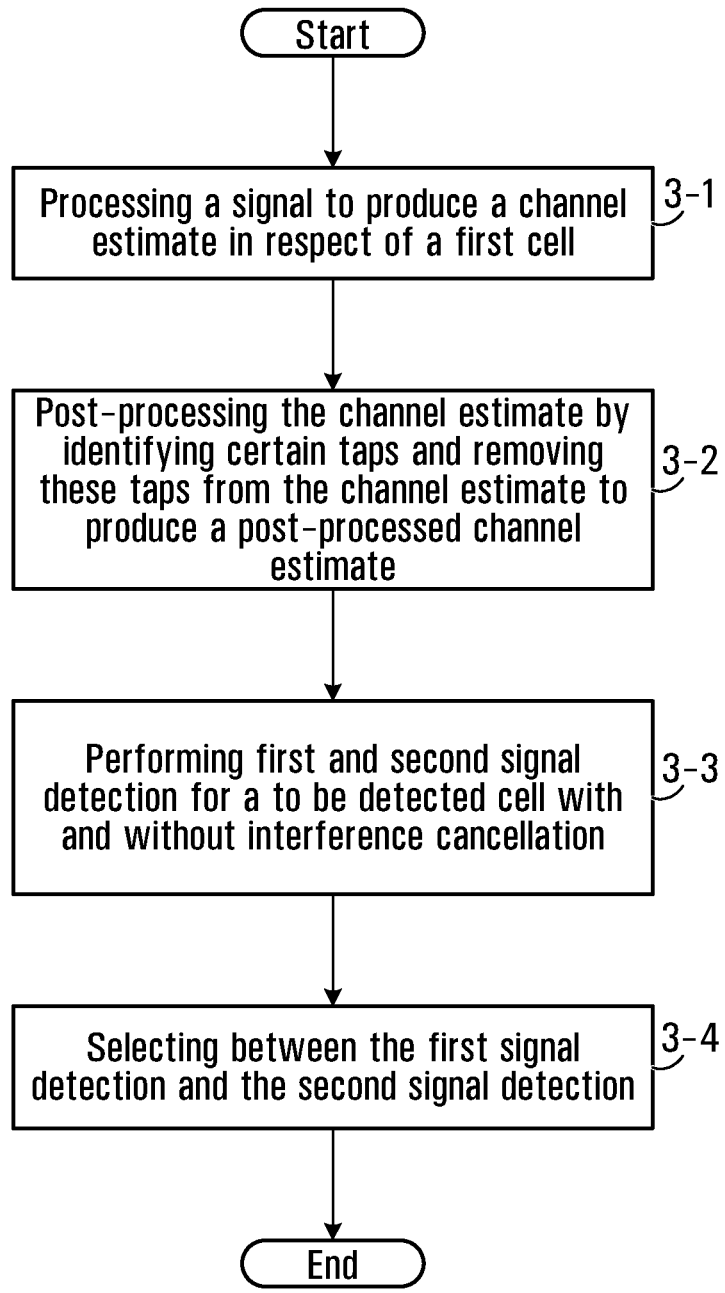
FIG. 3 is a flowchart of another method of performing channel estimation with selective interference cancellation.

Referring now to FIG. 3, shown is a flowchart of a method provided by an embodiment of the application. The method begins with processing a signal to produce a channel estimate in respect of a first cell in block 3-1. In block 3-2, the channel estimate is post-processed by identifying certain taps and removing these taps from the channel estimate to produce a post-processed channel estimate. In block 3-3, first signal detection of a to be detected cell is performed based on the signal minus an interference cancellation component of the first cell, and second signal detection of the to be detected cell is performed based on the signal without having subtracted the interference cancellation component of the first cell. In block 3-4, a selection is made between the first signal detection and the second signal detection, for example, using the method described above. In case there is no suitable known cell to perform interference cancellation with, signal detection is carried out without interference cancellation.

Discard Unreliable Results

In a third embodiment, a decision is made as to whether the measurement result for a cell (the to be cancelled cell and/or the to be detected cell) has become unreliable. For example, if the combined power of the channel impulse response taps surviving the postprocessing (either the post processing that is performed to produce the interference cancellation component, or the post processing that is performed to produce the channel estimate for the to be detected cell, or both) is small enough compared to the overall receive power of the to be processed signal (first receive signal) as defined by a threshold, the measurement result may be considered unreliable. Here the threshold may differ depending on whether interference cancellation is being performed in the process to detect this cell or not. In the event the mobile device is required to report on the particular neighbour cell, the mobile device may report the lowest reportable receive power instead. In case the mobile device is required to process the result—in another algorithm for example—it can perform the processing using a very small power. Alternatively, the measurement result can be discarded altogether. In the event the mobile device is not required to report on the particular cell, the result may be either not be reported, or the mobile device can choose whether or not to report. This decision may be made on a context specific basis. For example, if reporting a single host cell on a frequency, there is the possibility of being handed over to that cell, and as such, the mobile device may choose not to report on that cell to prevent such a handover. On the other hand, if there is a report on a group of ghost cells having a similar power, this may have the effect of preventing the network from handing over.

The following is a specific example of a method based on the above embodiment using interference cancellation. Begin by processing a signal to produce an interference cancellation component that is an estimate of a component of the signal that is due to a first cell by:

generating a channel estimate for the signal using a cell-specific code of a first cell;

post processing of the channel estimate by identifying certain taps and removing these taps from the channel estimate to produce a post processed channel estimate for the first cell;

producing the interference cancellation component using the post processed channel estimate.

Perform channel estimation of a to be detected cell operating on the same frequency as the first cell based on the signal minus the interference cancellation component by:

generating a channel estimate for the to be detected cell using a cell-specific code of that to be detected cell;

post processing of the channel estimate for the to be detected cell by identifying certain taps and removing these taps from the channel estimate to produce a post processed channel estimate for the to be detected cell;

The method further comprises at least one of:

a) discarding the post processed channel estimate for the to be detected cell and/or reporting a lowest reportable value/other very small value and/or not reporting the channel estimate if a combined power of the taps of the post processed channel estimate for the to be detected cell is small enough compared to a total receive power for the signal by a threshold amount; and b) discarding the post processed channel estimate for the to be detected cell and/or reporting a lowest reportable value/other very small value and/or not reporting the channel estimate if a combined power of the taps of the post processed channel estimate for the first cell is small enough compared to a total receive power for the signal by another threshold amount. In the case of a) the post processed channel estimate for the to be detected cell is considered unreliable. In the case of b) the post processed channel estimate for the to be cancelled cell is unreliable which leads to the post processed channel estimate for the to be detected cell to also be considered unreliable, since interference cancellation based on an unreliable channel estimate was performed.

Here optionally for the measurement of a specific power such as the RSCP of the P-CCPCH the combination of power might be restricted to the channel estimation window of the P-CCPCH power. In later described embodiments the power of the channel estimates for other physical channels used together with the P-CCPCH on the same time slot will be taken into the equation as well.

In some cases, only a) is implemented, or only b) is implemented. In some cases, both a) and b) are implemented. In case of b) another estimate for the to be detected cell without interference cancellation might be generated or another cell to perform interference cancellation with may be found.

In some embodiments, a combination of one or more of the first, second, and third embodiments described above are implemented.

Figure 4:
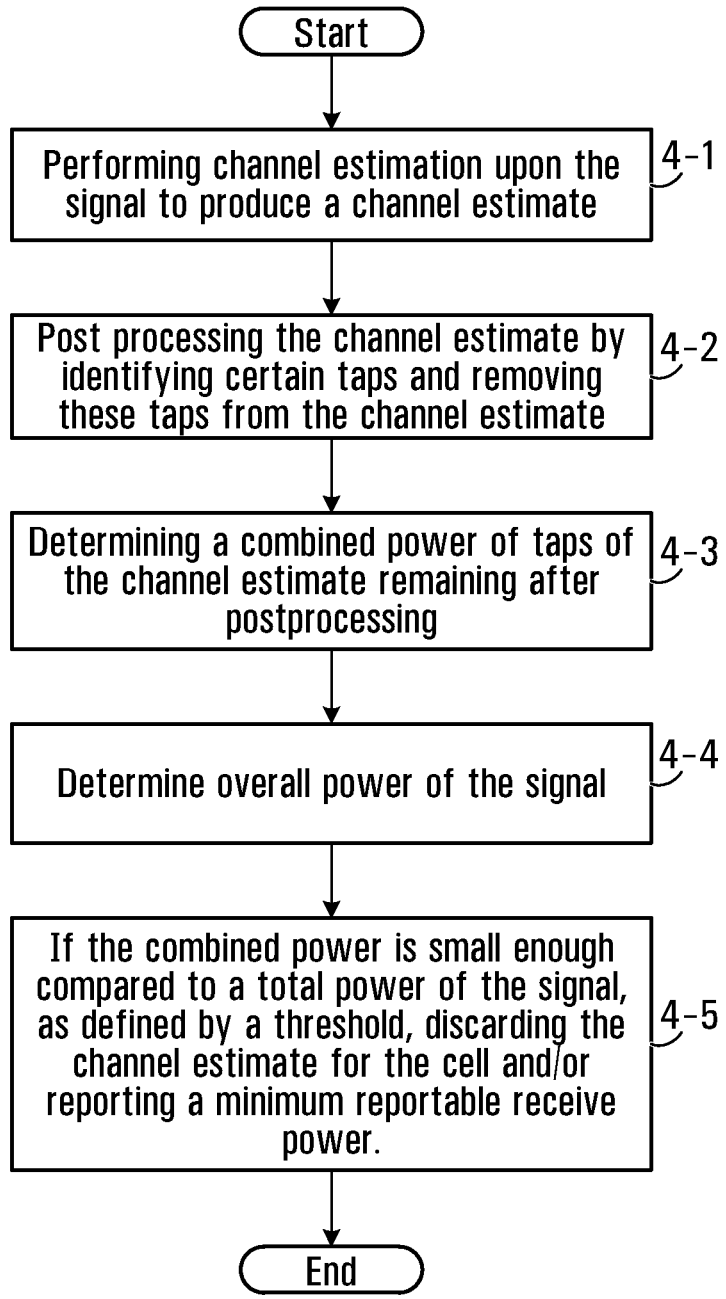
FIG. 4 is a flowchart of a method of performing channel estimation with detection of erroneous neighbour cell measurements.

FIG. 4 is a flowchart of another example. In block 4-1, channel estimation is performed of the first received signal with the midamble of a to be detected neighbour cell. In block 4-2, the channel estimate is post processed by identifying certain taps (e.g. taps containing only noise, for example as determined by being small enough with respect to the overall receive power as defined by a threshold). These taps are removed from the channel estimate, for example by setting them to zero, to produce a post-processed channel estimate. The combined power of the remaining taps of the post-processed channel estimate is determined in block 4-3 and the overall power of the first signal is determined in block 4-4. If this combined power is small enough compared to the overall power of the first signal as defined by a threshold, then the results are discarded and/or a minimum value is reported, and/or not reporting the channel estimate (block 4-5).

A cell that has an unreliable measurement result, for example as determined by the above-summarized method, is also referred to herein as a "ghost cell". If the combined power of the remaining taps is small enough compared to the overall power of the signal as defined by a threshold, also referred to as a ghost detection threshold, then the conclusion is reached that the cell is a ghost cell. The ghost detection threshold may be different for cases where interference cancellation has been employed (ghost detection threshold with IC) as opposed to cases where interference cancellation has not been employed (ghost detection threshold without IC).

Note that this approach may also be applied to signal detection of a to be detected cell in the presence of interference from a known cell (serving cell or other cell) operating on the same frequency to determine whether the known cell is significantly present in the overall received signal; then interference cancellation is employed for the known cell or not based on this determination as described previously. In other words, the detection of a cell as being a ghost cell or not is used as a trigger for the decision to perform interference cancellation or not. The approach can be used to decide whether the measurement report for a to be detected cell, or a to be cancelled known cell or a to be cancelled unknown cell is unreliable.

Figure 5:
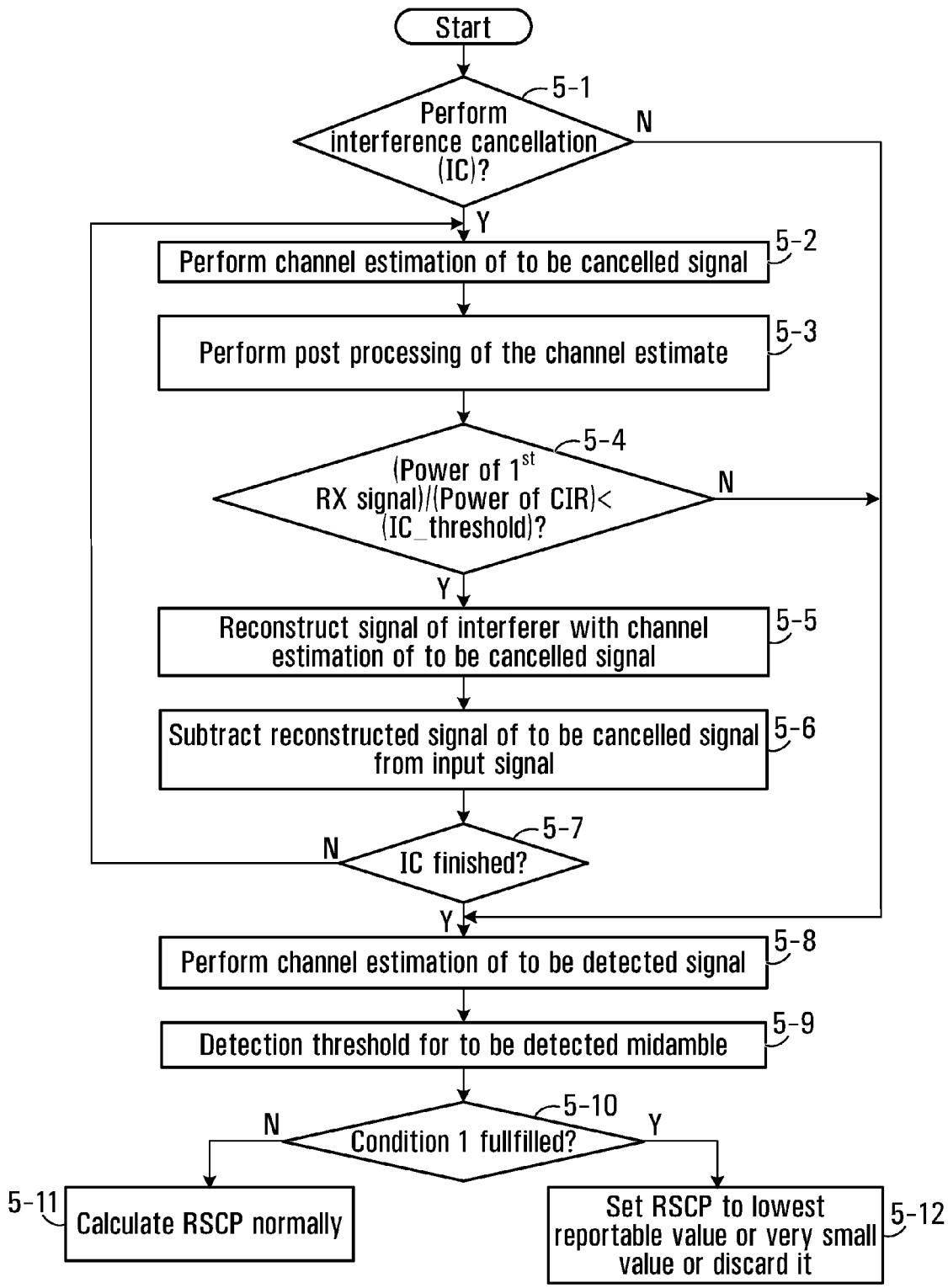
FIG. 5 is a flowchart of a method of performing channel estimation with both selective interference cancellation and detection of erroneous neighbour cell measurements.
Figure 6:
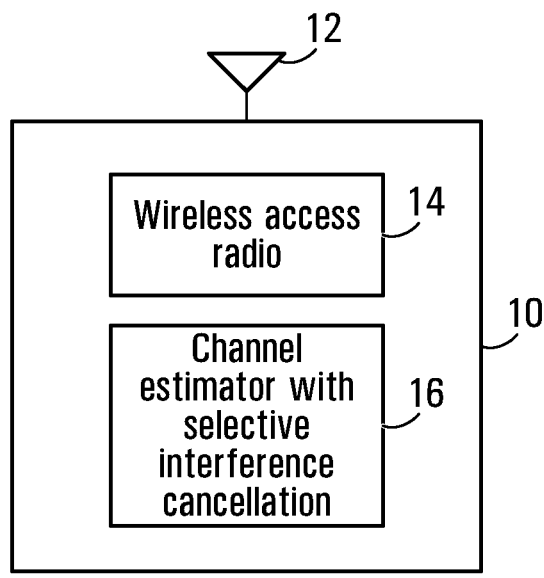
FIG. 6 is a block diagram of a mobile device that performs channel estimation with selective interference cancellation.
Figure 7:
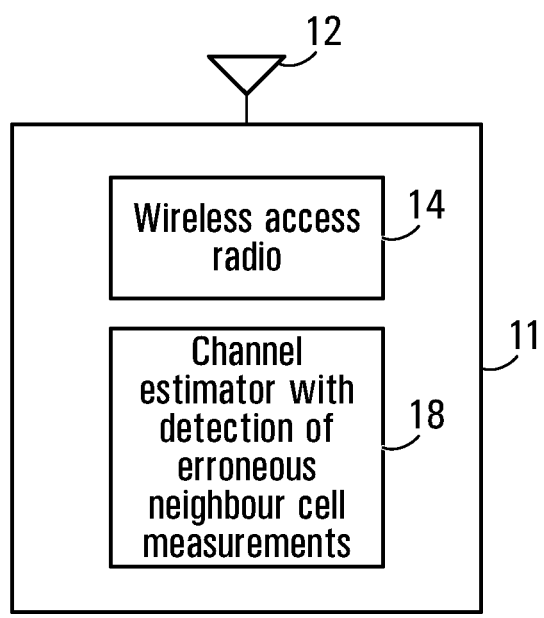
FIG. 7 is a block diagram of a mobile device that performs channel estimation with detection of erroneous neighbour cell measurements.
Figure 8:
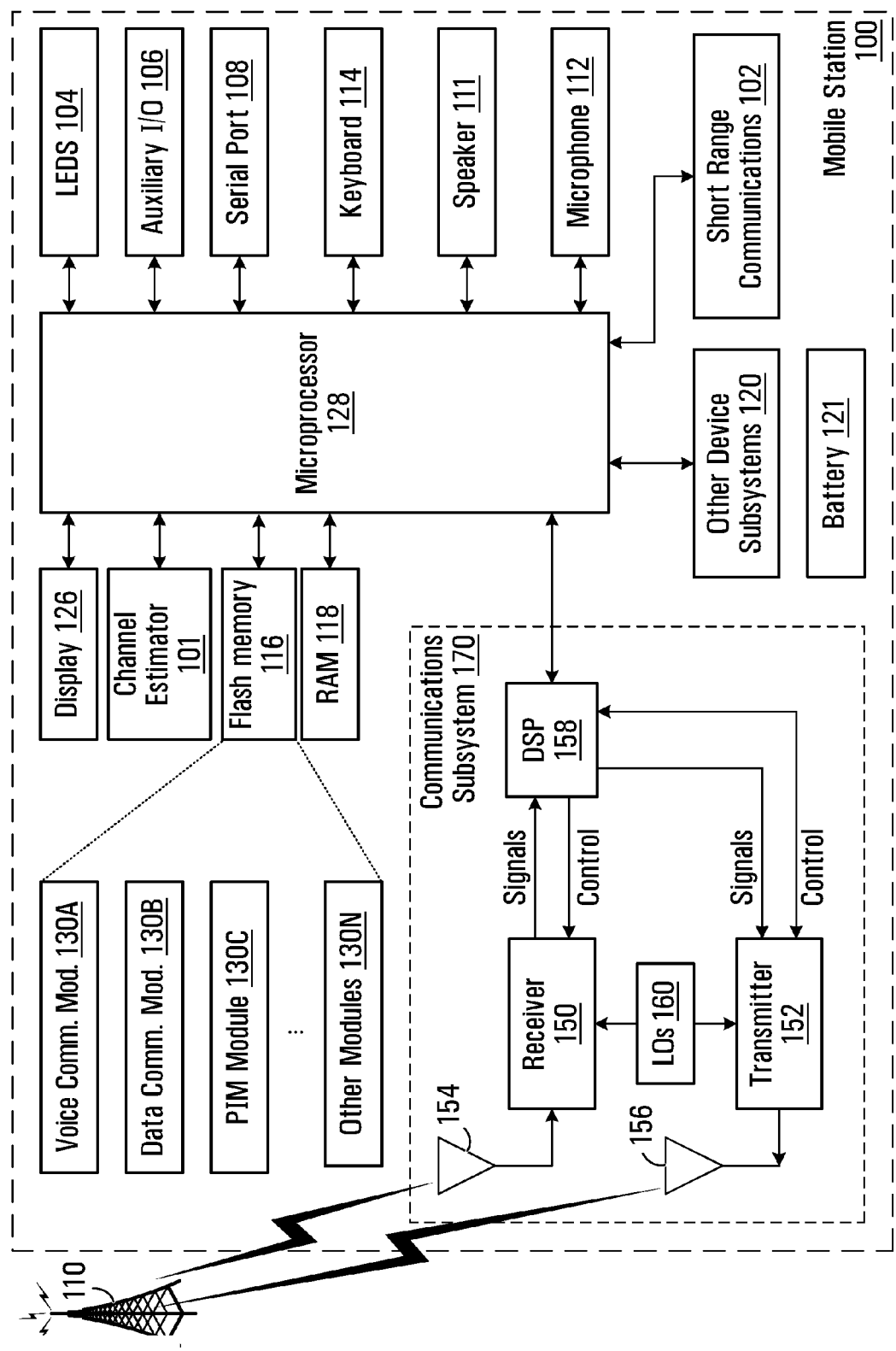
FIG. 8 is a block diagram of a mobile device that performs channel estimation with selective interference cancellation and/or with detection of erroneous neighbour cell measurements.

FIG. 5 is a flowchart of a specific example of a method that combines some of the methods described above.

Interference cancellation may or may not be performed. If it is, then yes path block 5-1 is followed. If it is not, then no path, block 5-1 is followed. Assuming interference cancellation is performed, then in block 5-2, channel estimation of the to be cancelled signal is performed. In block 5-3, the channel estimate is post processed, for example by removing certain taps. The outcome of block 5-3 is the channel impulse response. In block 5-4, an assessment of whether the post processed channel estimate for the to be cancelled cell is reliable or not is made. If the post processed channel estimate is unreliable, then block 5-4, no path is followed which results in the method continuing at block 5-8 without subtracting out a component due to the to be cancelled cell. If the post processed channel estimate is reliable, then the method continues at block 5-6 with reconstructing a signal of the to be cancelled cell using the post processed channel estimate.

Interference cancellation for additional cells may be performed in which case no path 5-7 is followed. Otherwise, channel estimation is performed for the to be detected signal at block 5-8. This can be post processed by removing certain taps that are considered to be noise. In blocks 5-9, 5-10, a decision is made as to whether the channel estimate for the to be detected cell is reliable or not based on whether or not "condition 1" is fulfilled, as detailed below. If it is reliable (no path block 5-10), then the RSCP is calculated normally and reported. If it is not reliable (yes path, block 5-10), then the RSCP is set to a lowest reportable value, or a very small value, or not reported at all.

In FIG. 5, block 5-4, the post processed channel estimate for the to be cancelled cell is determined to be reliable if the power of the taps of the post processed channel estimate is large enough compared to the overall power of the receive signal as defined by a threshold. In the specific example depicted, if the power of the received signal (the sum of the taps output in block 5-2) over the power of the taps of the post processed channel estimate (the sum of the taps output in block 5-3 (channel impulse response)), is less than an IC_threshold, then the post processed channel estimate is considered reliable.

Similarly, in block 5-10, the channel estimate for the to be detected cell is determined to be reliable if the power of the taps of the channel estimate is large enough compared to the overall power of the receive signal as defined by a threshold. Different thresholds may be applied depending on whether interference cancellation was employed or not. For example:

If interference cancellation (IC) has been applied, condition 1 is fulfilled and the result considered unreliable if:

RSCP<(Ghost detection threshold with IC applied)*overall receive power of received signal) and receive power of receive signal>(lower ghost detection bound)*thermal_noise_power If IC has not been applied, condition 1 is fulfilled and the result considered unreliable if:

RSCP<(Ghost detection threshold without IC applied)*overall receive power of receive signal and receive power of receive signal>(lower ghost detection bound)*thermal_noise_power.

In the above, the RSCP is the sum of the taps remaining for the first midamble shift/first channel estimation window of interest in time slot zero. More generally, it can simply be the sum of a set of taps of interest. In some embodiments, the ghost detection thresholds are only applied if the receive power is more than an amount "lower ghost detection bound" (for example 3 dB) greater than the thermal noise. This approach has been taken in the example of FIG. 5.

Simulation Results

Simulation results were obtained. In the following, the performance of the algorithm has been simulated with the following further improvements on the measurement procedure:

First improvement: When post processing a channel estimate (either for a to be detected cell or a to be cancelled cell), instead of deleting all the taps for the channel estimate which are less than a certain threshold below the overall received power the following algorithm was applied:
  a) Set the result vector to zero
  b) Calculate the average power of all the channel impulse response vector
  c) Find the strongest channel impulse response tap
  d) If the strongest channel impulse response tap is stronger large enough as defined by a threshold compared to the average power of the remaining channel impulse response taps take this tap over to the result vector, remove this tap from the channel impulse response vector and calculate the average power of the remaining channel impulse response taps in the channel impulse response vector. Go to step c)
  e) If the condition of d) is not fulfilled terminate the post processing and thus discard all the remaining channel impulse response taps.

The result is that each of the taps other than the certain taps has a power that is large enough compared to the average power of taps other than the certain taps as defined by the threshold.

Second Improvement: The average power of all the taps being discarded in the first improvement described above is determined. The power of all the remaining channel impulse response taps is adjusted downward by that average for the purpose of generating RSCP measurements.

On the discarded taps there is the assumption that only noise is on them. Since usually more than one tap is discarded the result can be averaged.

On the taps surviving the post processing (i.e. the ones that are not discarded) there is both noise and signal on them. When determining the RSCP measurement, the noise power can be removed from the surviving taps by subtracting the average noise power from each of the surviving taps power to produce noise-adjusted surviving taps and the RSCP is then determined by summing the noise-adjusted surviving taps.

Definitions and Parameters for Simulations

Definition of Ghost Cell:

For these simulations, a ghost cell is a cell with an unreliable RSCP result. A more general definition of a ghost cell was presented above. Once all the channel impulse response taps have been discarded (set to 0) this is considered a ghost cell as well. The RSCP is measured on the 16 taps of midamble shift 1 in TS0.

The standard channel estimation algorithm and a simple interference cancellation algorithm has been chosen to simulate the performance of this algorithm. The parameters of this algorithm have been optimized for the purpose of RSCP measurements. For the purpose of detection processes another set of parameters has to be chosen.

The chosen parameters are the following:

Detected Midamble

The to be detected midamble has the code 48.

Interfering Midamble

The interfering midamble has the code 49.

Detection Threshold for the to be Detected Midamble:

This is the threshold for the first improvement described above for the channel estimation of the cells to be detected. It is set to 8 dB.

Detection Threshold for to be Cancelled Midamble:

This is the threshold for the first improvement described above for the channel estimation of the cells to be cancelled. It is set to 10 dB. Since IC only makes sense once the cells to be cancelled are very strong it is set to a tougher value than for the to be detected midamble.

IC Threshold

Interference cancelling is not used once the interfering cell is not in the neighbor cell list/or it is not the serving cell. In case a known cell could be cancelled, IC is switched off if the to be cancelled cell has an RX power (sum of tap powers after the channel estimation) of less than or equal to 3 dB of the overall RX power.

Ghost Detection Threshold without IC Applied

For the case that no IC is applied the cells with a RSCP that is an amount "ghost detection threshold without IC applied" (for example 10 dB or more in the simulations) less than the RX power of the RXed midamble are considered as ghost cells.

Ghost Detection Threshold with IC Applied

For the case that IC is applied the cells with a RSCP that is an amount "ghost detection threshold with IC applied" (for example 35 dB or more in the simulations) less than the RX power of the RXed midamble are considered as ghost cells. This threshold is depending on the AD word width and the processing word width.

Lower Ghost Detection Bound

In some embodiments, the ghost detection thresholds are only applied if the RX power is large enough compared to thermal noise as defined by an amount "lower ghost detection bound" (for example 3 dB in the simulations). In the simulations, the thermal noise has an RX power of 0 dB.

Not Simulated Brute Force Algorithms:

1. In case a ghost cell is detected with the ghost detection threshold and no IC is used the mobile device could systematically search for the cells and their midamble codes which are not in the neighbor cell list and in case they are strong enough apply IC with them. This approach would find the interferer which is unknown to the receiver once the ghost cell is detected.

2. In case a ghost cell is detected with the ghost detection threshold it is only assumed to be a ghost cell once its BCCH cannot be detected successfully. That means in case the BCCH can be ready the cell is there with sufficient strength to be detected and is thus no ghost cell.

3. In some embodiments, once the algorithm looks systematically for cells not being in the neighbor cell list (e.g. in case there is a ghost cell) and finds none then either the ghost cell is finally detected or a detection of the BCCH is attempted to determine whether it is a ghost cell.

Equations

These are the Equations for a Simple Channel Estimation Algorithm for TD-SCDMA: (Other Standards HCR_TDD and VHCR-TDD have Different Parameters)

$$\text{unfiltered} = \textit{ifft}(\textit{fft}(\text{input}))./\textit{fft}(\text{to\_be\_detected\_midamble}) \quad (1)$$

Where ./ means the division of the vector elements and input and to_be_detected_midamble are vectors of length 128. fft and ifft are the Fourier Transformation and the inverse Fourier Transformation respectively.

After that, postprocessing is performed by creating a vector result which is the vector unfiltered with all the elements:

$$result_i = \begin{cases} unfiltered_i & \text{if } \frac{|unfiltered_i|^2}{\text{interfer\_P}} >= \text{detection\_threshold} \\ 0 & \text{else} \end{cases} \quad (2)$$

where $$\text{interfer\_P} = \frac{\sum_{result_i=0} |unfiltered_i|^2}{\sum_{result_i=0} 1}. \quad (3)$$

(3) is the interference power of all the CIR taps being cancelled in the preprocessing process.

The solution to (2) and (3) is first sorting the unfiltered channel impulse response according to the absolute value, setting result to be the zero vector, then calculating the interfere_P assuming that all elements of the vector result are 0, then applying the condition of the strongest unfiltered element.

If the equation (2) is fulfilled making the strongest unfiltered element part of the result vector—if not setting the corresponding element and all the remaining elements of the result vector to zero.

Then update interfere_P (3) and then working with the second strongest element in the vector unfiltered and so on until the condition is not fulfilled any more.

detection_threshold is either the "Detection threshold for the to be detected midamble" of the "Detection threshold for the to be cancelled midamble" depending on whether IC is used or not.

Note there are different result vectors for the to be cancelled midamble and the to be detected midamble.

These Equations Apply for the Interference Cancellation Algorithm:

result(midamble_to_be_cancelled_signal) is the result if the channel estimation with the detection_threshold set to the "detection threshold with IC"

$$\text{total\_power} = \frac{\sum_i |(1st\ RX\ \text{signal})_i|^2}{128} \quad (4)$$

is the total RX power of the $1^{st}$ RX signal in the midamble portion of the to be cancelled cell. In case the timing of the to be detected cell and the to be cancelled cell is different a different total_power has to be used for both and their respective midamble portions have to be taken.

And $$\text{power\_to\_cancel} = \sum_i |(\text{result}(\text{midamble\_to\_be\_cancelled\_signal}))_i|^2 \quad (5)$$

The power of the to be cancelled signal.

If $$(\text{total\_power}/\text{power\_to\_cancel}) > \text{IC\_threshold} \quad (6)$$

is fulfilled then create the $2^{nd}$ RX signal with:

$$(2^{nd}\ RX\ \text{signal}) = (1^{st}\ RX\ \text{signal}) - \text{conv}(\text{reconstructed\_signal\_to\_be\_cancelled}, \text{result}(\text{midamble\_to\_be\_cancelled\_signal})) \quad (7)$$

The "reconstructed signal to be cancelled" is calculated by detecting the burst of the interfering cell and recreating the transmitted signal of the transmitting node B. Here shortcuts might be taken e.g. by only reconstruction (parts of) the signal overlapping with the midamble to be detected. conv(x,y) is the convolution of the two vectors x and y.

If (6) is not fulfilled (8) is applied.

$$(2^{nd}\ RX\ \text{signal}) = (1^{st}\ RX\ \text{signal}) \quad (8)$$

Then the $2^{nd}$ RX signal is the input signal of the channel estimation algorithm described above.

These Equations Apply for the RSCP Measurement:

The vector of the channel impulse response power is created by manipulating the individual elements of the result like this:

$$\text{CIR\_power}_i = |\text{result}_i|^2 - \text{interfer\_P} \quad (9)$$

With result and interfer_P being the solutions to (2) and (3) for the step creating the CIR of the to be measured cell. Then the RSCP is $$RSCP = \begin{cases} \sum_{i=1}^{16} result_i & \text{if } \left(\sum_{i=1}^{16} result_i\right) * \\ & \text{(ghost detection threshold)} >= \text{total\_power} \\ & \text{or total\_power} <= \\ & \text{(lower ghost detection bound)} \\ 0 & \text{else} \end{cases} \quad (10)$$

where the ghost detection threshold is either the one with IC or the one without IC depending whether IC has been applied before.

4 Simulations and their Discussion

There are two kinds of simulations performed:

1. Simulations with interfered to be measured cells. There the RX power of the to be measured cell should be 55 dB. The simulations are run versus the ISR (Interference to Signal Ratio). An ISR of 10 dB means that the interfering cell is 10 dB stronger than the to be measured cell. In these simulations for each point the phase offsets 1-360 degree in-between interfering cell and measured cell have been taken. In case of fading channels the RX powers have been normalized such that instantaneous ISRs are measured. Otherwise the fading statistics would overlay the simulation results.

2. Simulations without interfering cells. Here the effect of the thresholds and measurement procedures on normal measurements is studied. The simulations are run versus the SNR. The noise power is held at a level of 0 dB. The SNR is the average SNR in case of a fading channel being used. 400 independent snapshots per point have been made.

For each campaign 3 results are obtained:
1. The measured RX power in dB versus SNR or ISR
2. The standard deviation of the measured RX power in dB versus SNR or ISR
3. The percentage of the ghost cells being detected versus SNR or ISR Not Simulated Improvements:

Once the detection threshold for the to be detected midamble is set to 6 dB the results without interference look better: less bias at low SNRs and less ghost cells detected.

If this behavior is desired, change the detection threshold for the to be detected midamble from 8 dB to 6 dB once the total TX power falls below the Lower ghost detection bound.

Figure 9:
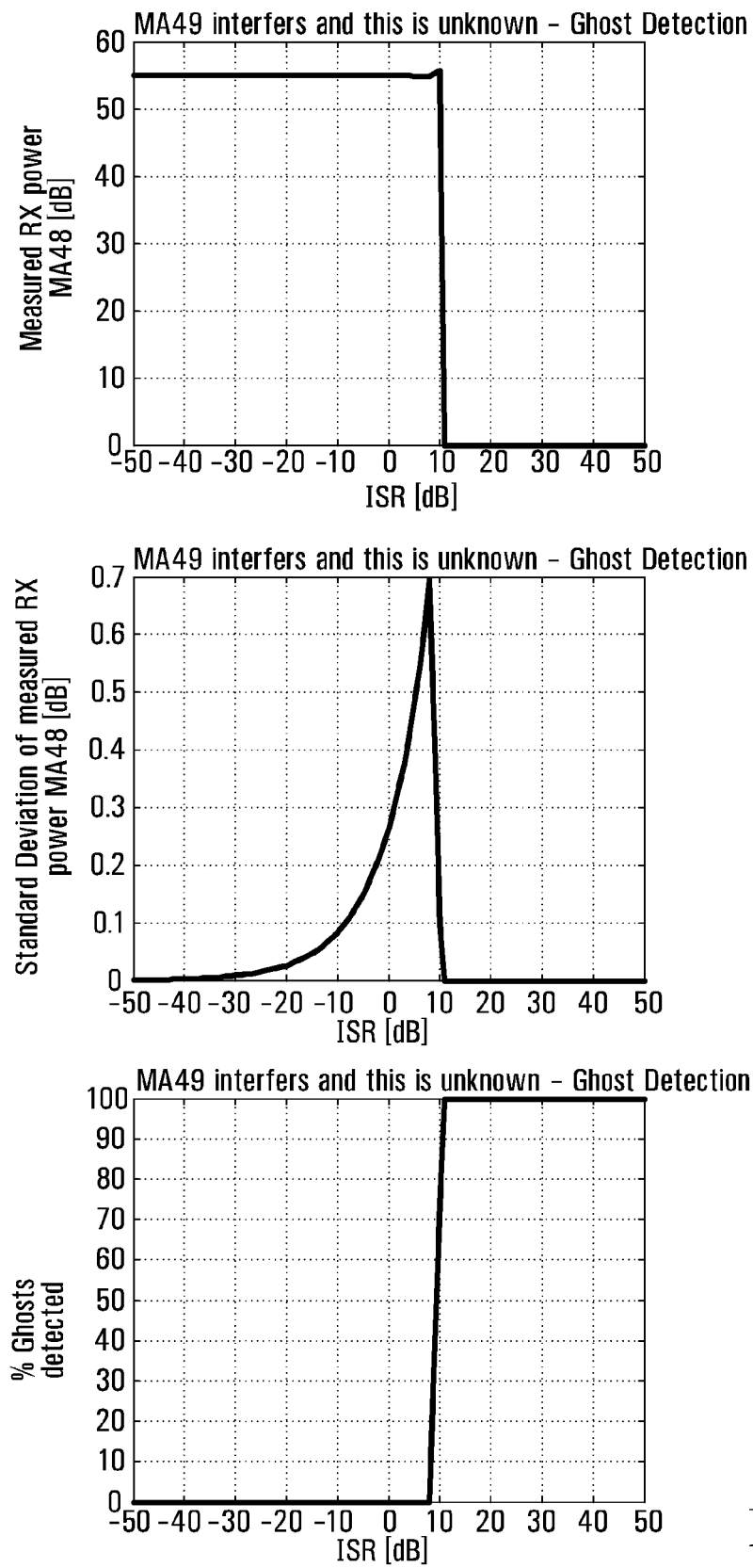
FIG. 9 depicts simulation results for unknown interfering cell and no interference cancellation—static 1 tap channel.

FIG. 9 depicts simulation results where there is an unknown interfering cell and no interference cancellation, and a static 1 tap channel is assumed. Here the ghost cell detection algorithm almost works perfectly. At 10 dB ISR the algorithm cuts off. At that point the measured RX power is not significantly higher than it should be.

Figure 10:
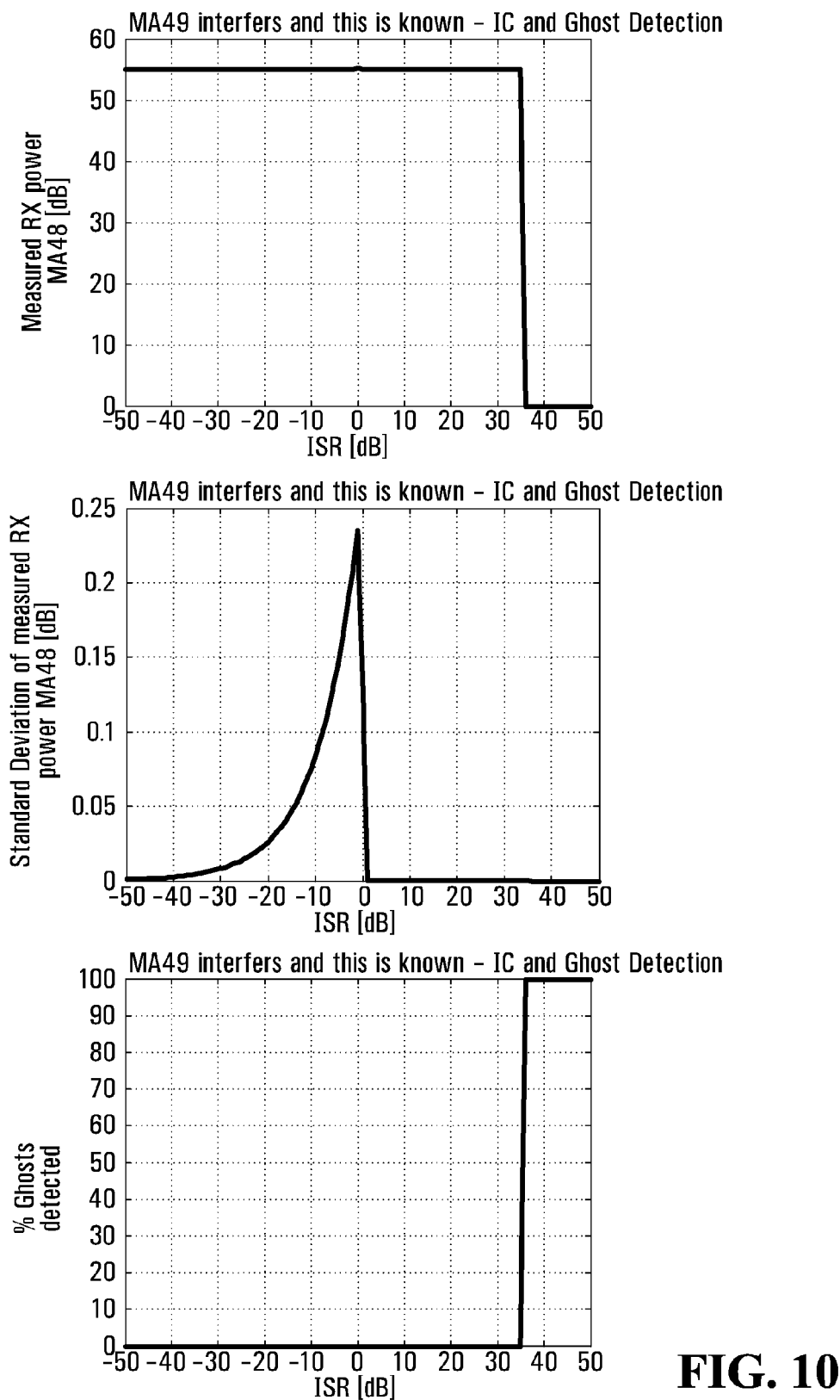
FIG. 10 depicts simulation results for known interfering cell and interference cancellation—static 1 tap channel.

FIG. 10 depicts simulations results where there is a known interfering cell and interference cancellation, and a static 1 tap channel is assumed. The algorithm works perfect: Cut off at 35 dB and almost no standard deviation once the interference cancellation is switched off (0 dB ISR).

Figure 11:
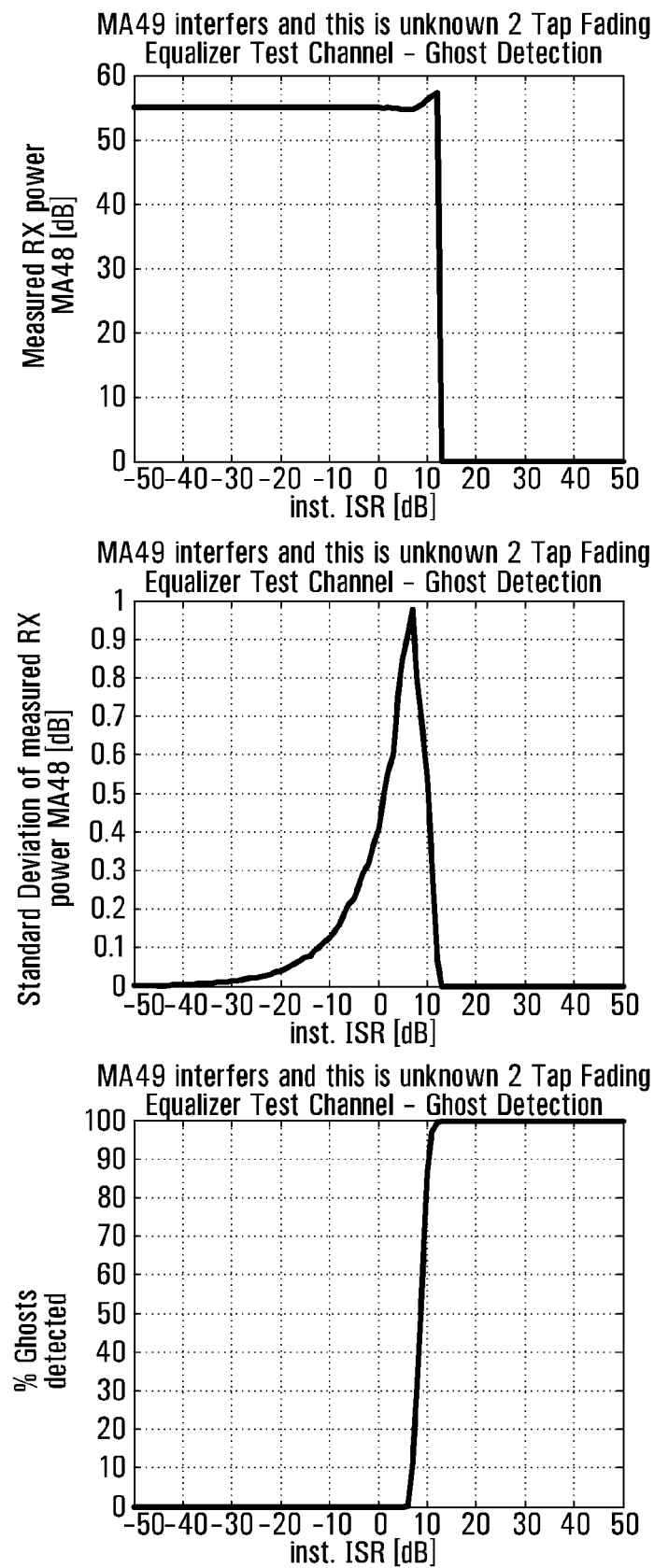
FIG. 11 depicts simulation results for unknown interfering cell and no interference cancellation—2 tap equalizer test channel.

FIG. 11 depicts simulation results where there is an unknown interfering cell and no interference cancellation, and a 2 tap equalizer test channel is assumed. The 2 tap equalizer test channel applies for both detected cell and interfering cell. It can be seen that the zone where the ghost cells are beginning to be detected is widening up. This is to be expected since for cases where both detected taps have about the same RX power their individual RX power is only half as big as for the 1 tap case. It is noted that the RX power and the standard deviation is only taking the cells into account which are detected as no ghost cells.

Figure 12:
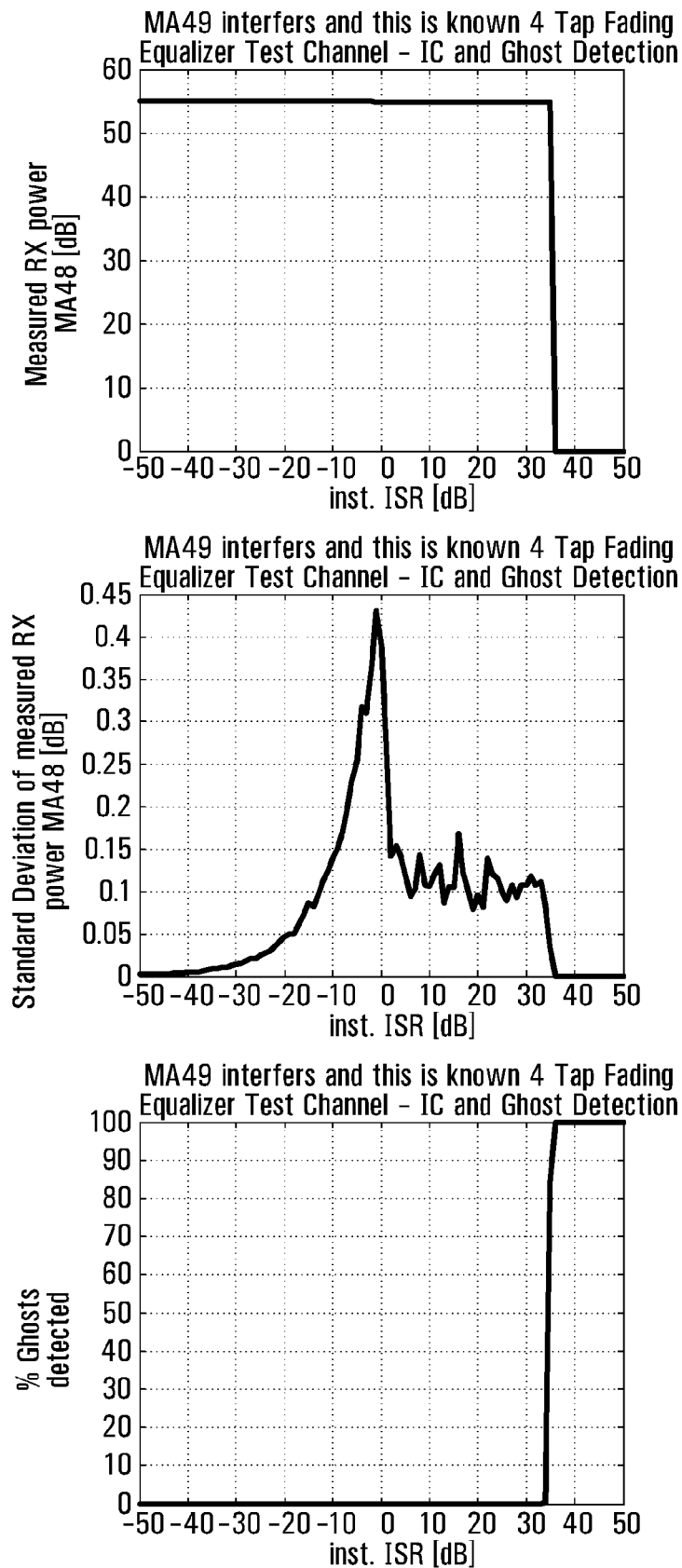
FIG. 12 depicts simulation results for known interfering cell and interference cancellation—2 tap equalizer test channel.

FIG. 12 depicts simulation results where there is a known interfering cell and interference cancellation, and a 2 tap equalizer test channel is assumed. The algorithms works still perfect but the standard deviation is greater than for the 1 tap channel.

Figure 13:
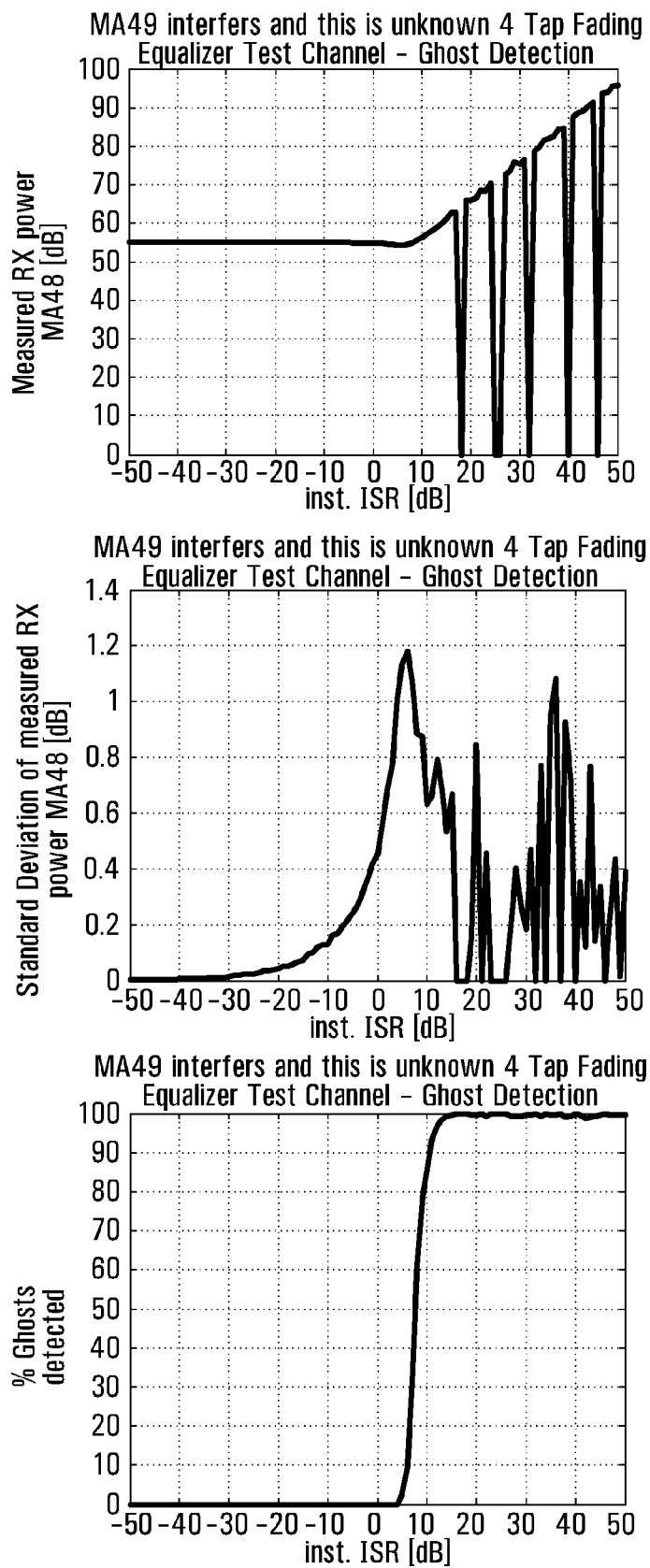
FIG. 13 depicts simulation results for unknown interfering cell and no interference cancellation—4 tap equalizer test channel.

FIG. 13 depicts simulation results where there is an unknown interfering cell and no interference cancellation, and a 4 tap equalizer test channel is assumed. The 4 tap equalizer test channel applies for both detected cell and interfering cell. It can be seen that the zone where the ghost cells are beginning to be detected is widening up more. This is to be expected since for cases where both detected taps have about the same receive power their individual RX power is only a quarter as big as for the 1 tap case. It is noted that the RX power and the standard deviation is only taking the cells into account which are detected as no ghost cells.

It is also noted that a 4 tap equalizer test channel is quite unrealistic already. In any case even though 1 or 2% of all ghost cells are not detected this seems to be indicate the limit of this algorithm.

Figure 14:
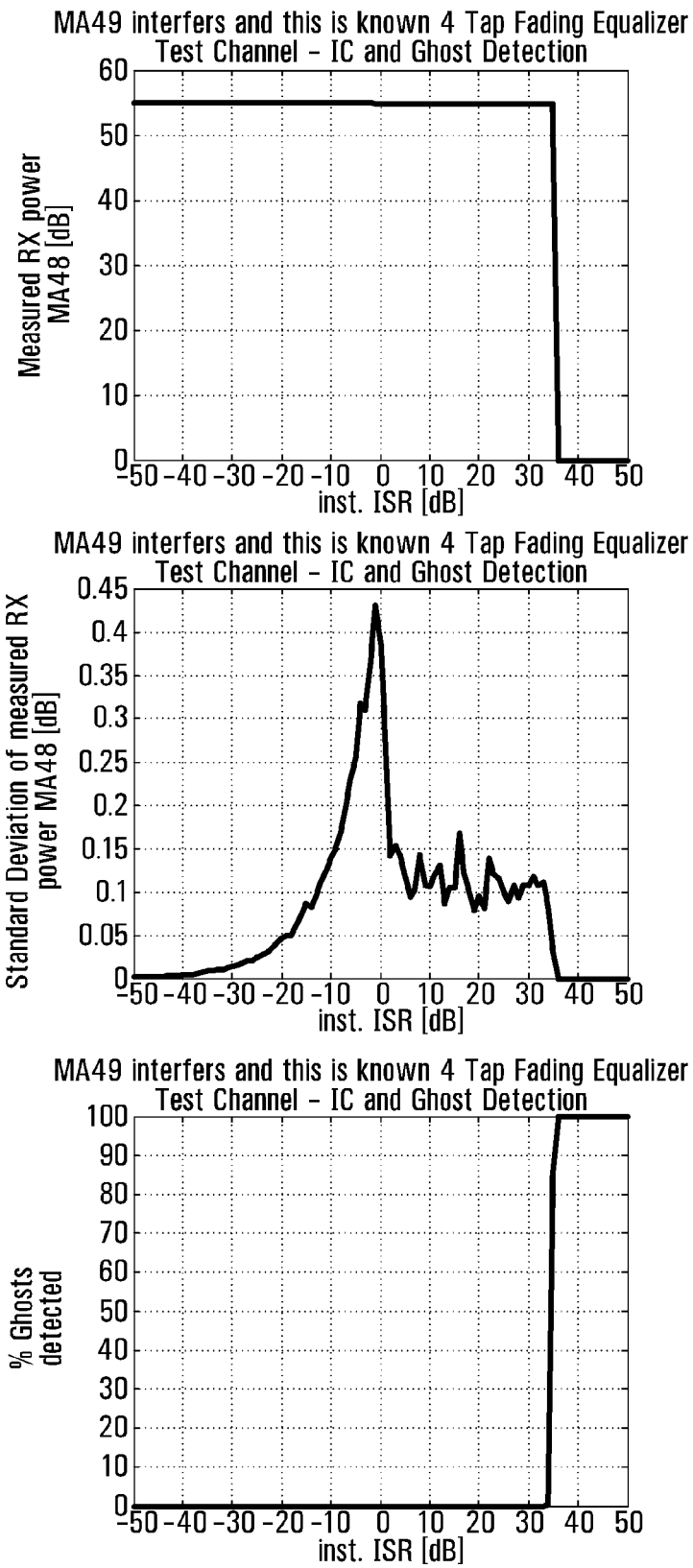
FIG. 14 depicts simulation results for known interfering cell and interference cancellation—4 tap equalizer test channel.

FIG. 14 depicts simulation results where there is a known interfering cell and interference cancellation, and a 4 tap equalizer test channel is assumed. It can be seen that there is a greater standard deviation, but that in general, the approach is still working fine.

Figure 15:
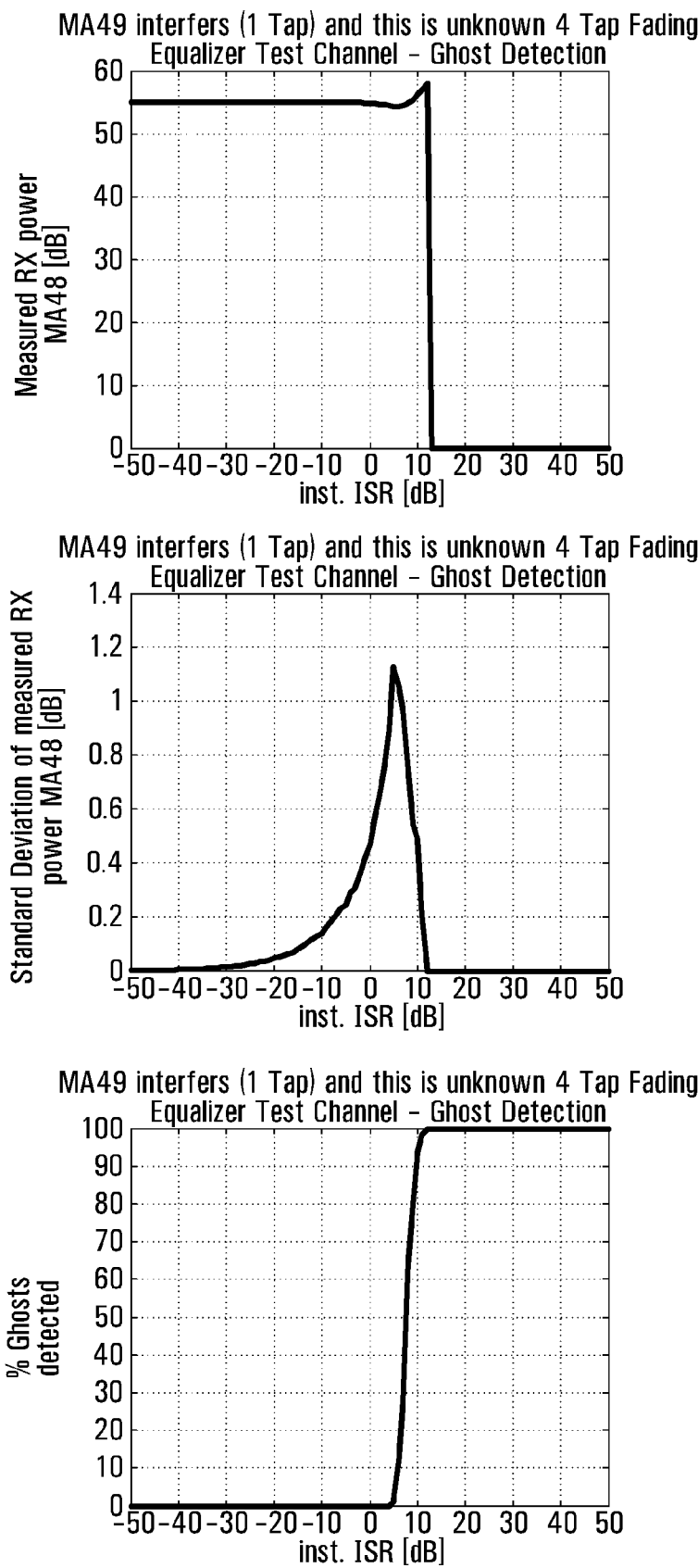
FIG. 15 depicts simulation results for unknown interfering cell and no interference cancellation—4 tap equalizer test channel for detected cell and 1 tap for interfering cell.

FIG. 15 depicts simulation results where there is an unknown interfering cell and no interference cancellation, and a 4 tap equalizer test channel for detected cell and 1 tap for interfering cell area assumed. Once the more realistic scenario is simulated that the interferer has just 1 tap the result is looking fine again.

Figure 16:
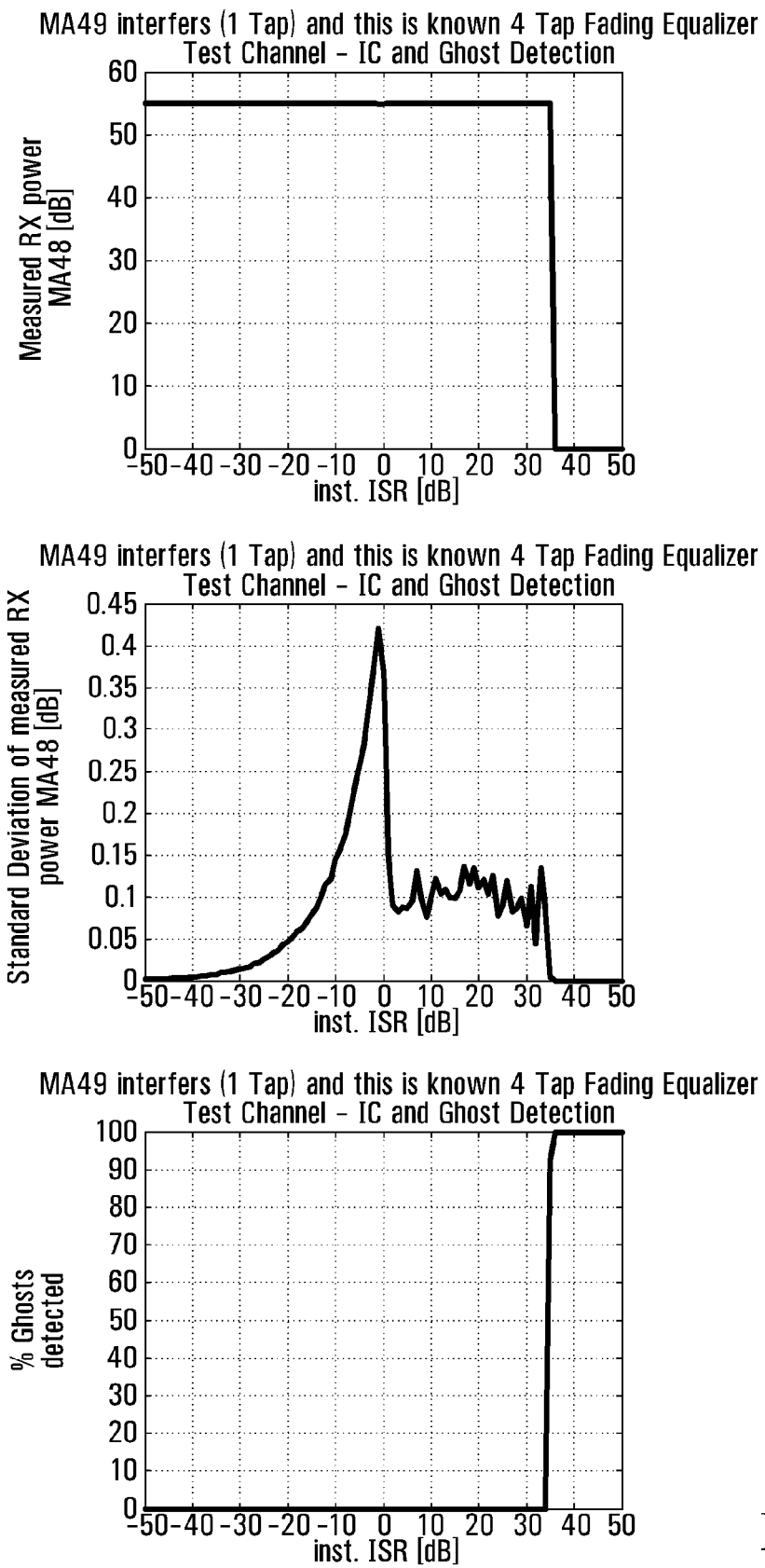
FIG. 16 depicts simulation results for known interfering cell and interference cancellation—4 tap equalizer test channel for detected cell and 1 tap for interfering cell.

FIG. 16 depicts simulation results where there is a known interfering cell and interference cancellation, and a 4 tap equalizer test channel for detected cell and 1 tap for interfering cell are assumed. No problem.

Figure 17:
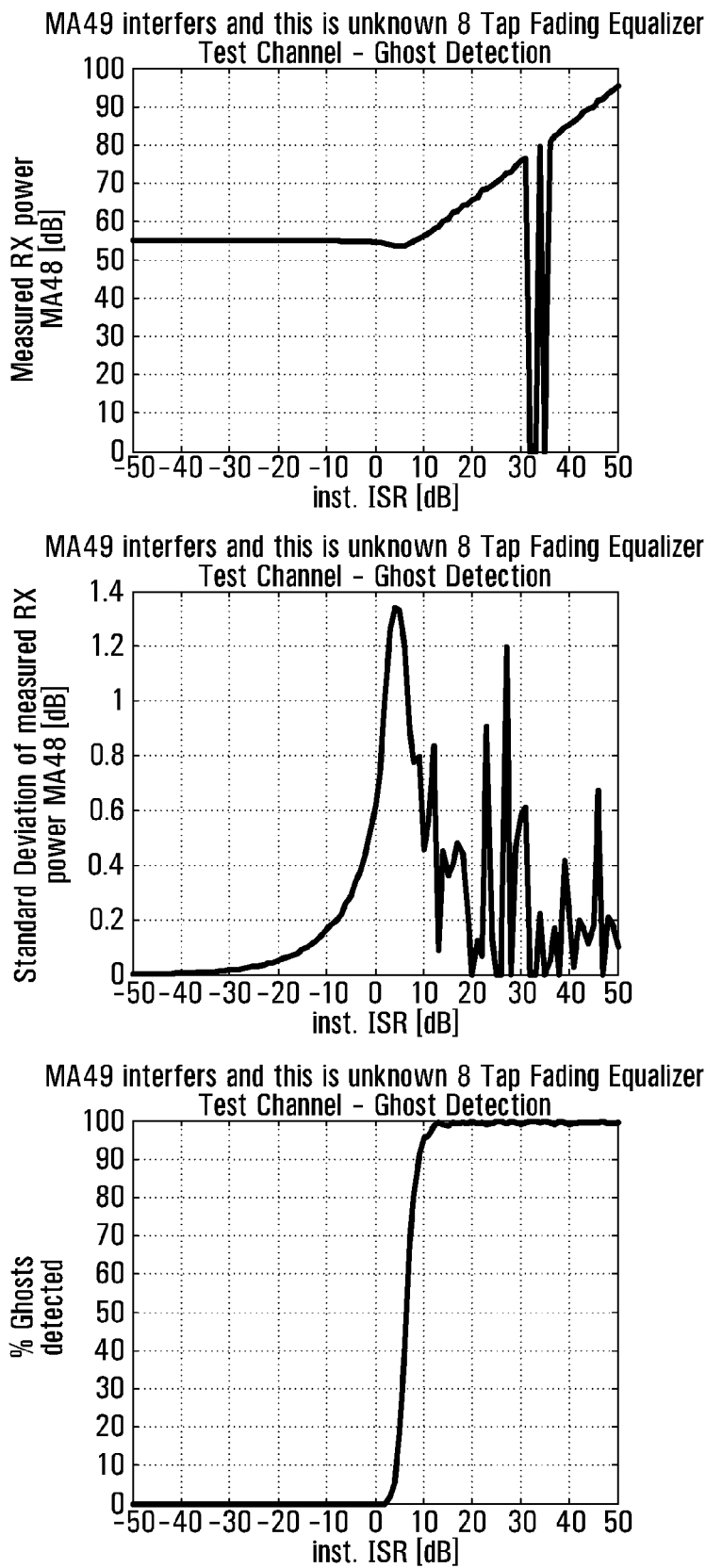
FIG. 17 depicts simulation results for unknown interfering cell and no interference cancellation—8 tap equalizer test channel.

FIG. 17 depicts simulation results where there is an unknown interfering cell and no interference cancellation, and an 8 tap equalizer test channel is assumed. The 8 tap equalizer test channel applies for both detected cell and interfering cell. It can be seen that the zone where the ghost cells are beginning to be detected is widening up most. This is to be expected since for cases where both detected taps have about the same RX power, their individual RX power is only an eighth as big as for the 1 tap case. It is noted that the RX power and the standard deviation is only taking the cells into account which are detected as no ghost cells. It is noted that an 8 tap equalizer test channel is unrealistic. In any case even though 1 or 2% of all ghost cells are not detected this seems to indicate the limit of this algorithm.

Figure 18:
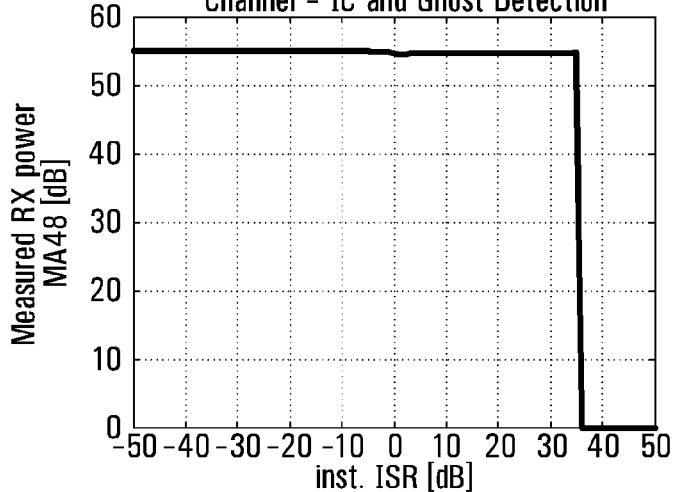
FIG. 18 depicts simulation results for known interfering cell and interference cancellation—8 tap equalizer test channel.
Figure 18:
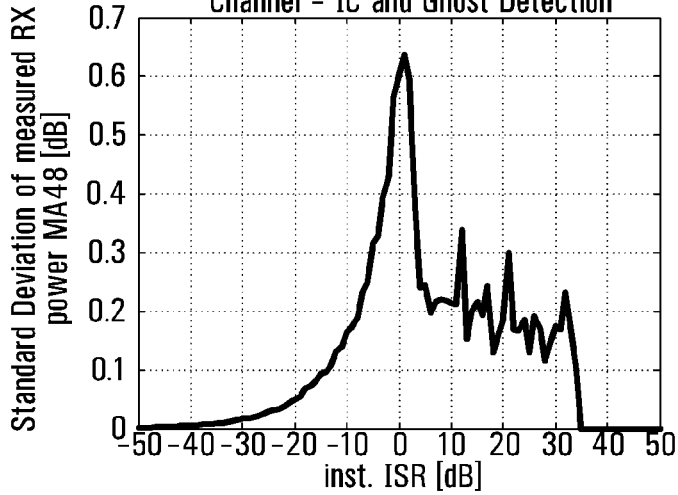
Figure 18:
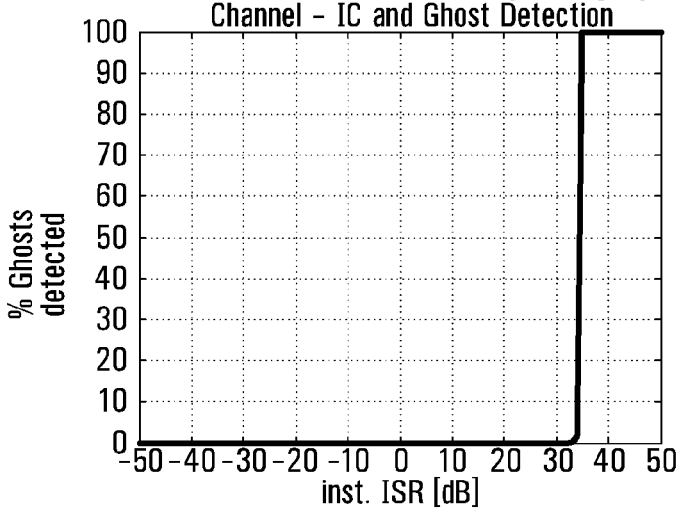

FIG. 18 depicts simulation results where there is a known interfering cell and interference cancellation, and an 8 tap equalizer test channel is assumed.

Figure 19:
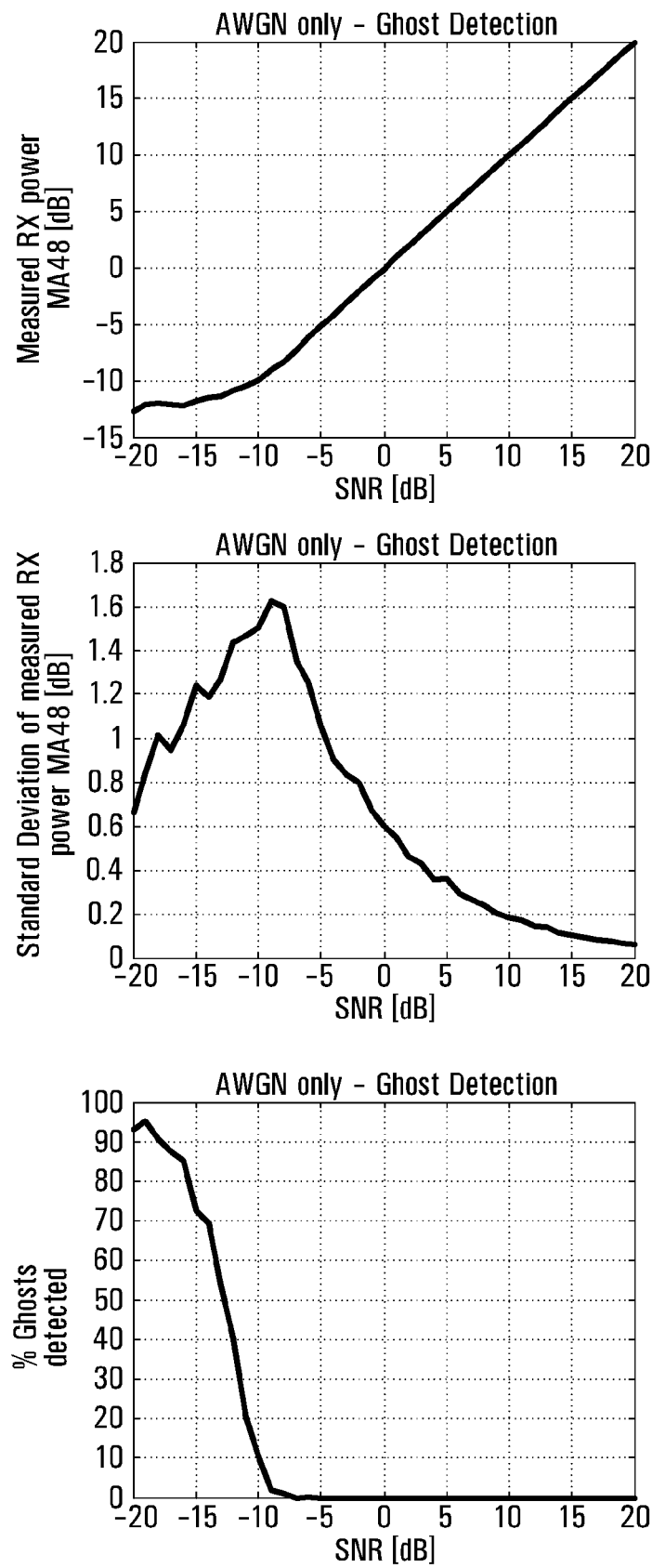
FIG. 19 depicts simulation results for AWGN and no interference.

FIG. 19 depicts simulation results for AWGN and no Interference. With negative SNR the algorithm becomes impaired by noise. With too low SNR ghost cells are detected because no useful channel impulse response tap can be detected inside the channel estimation window. The result is becoming biased below −10 dB SNR. That would be the case if no modifications would have been applied anyway.

Figure 20:
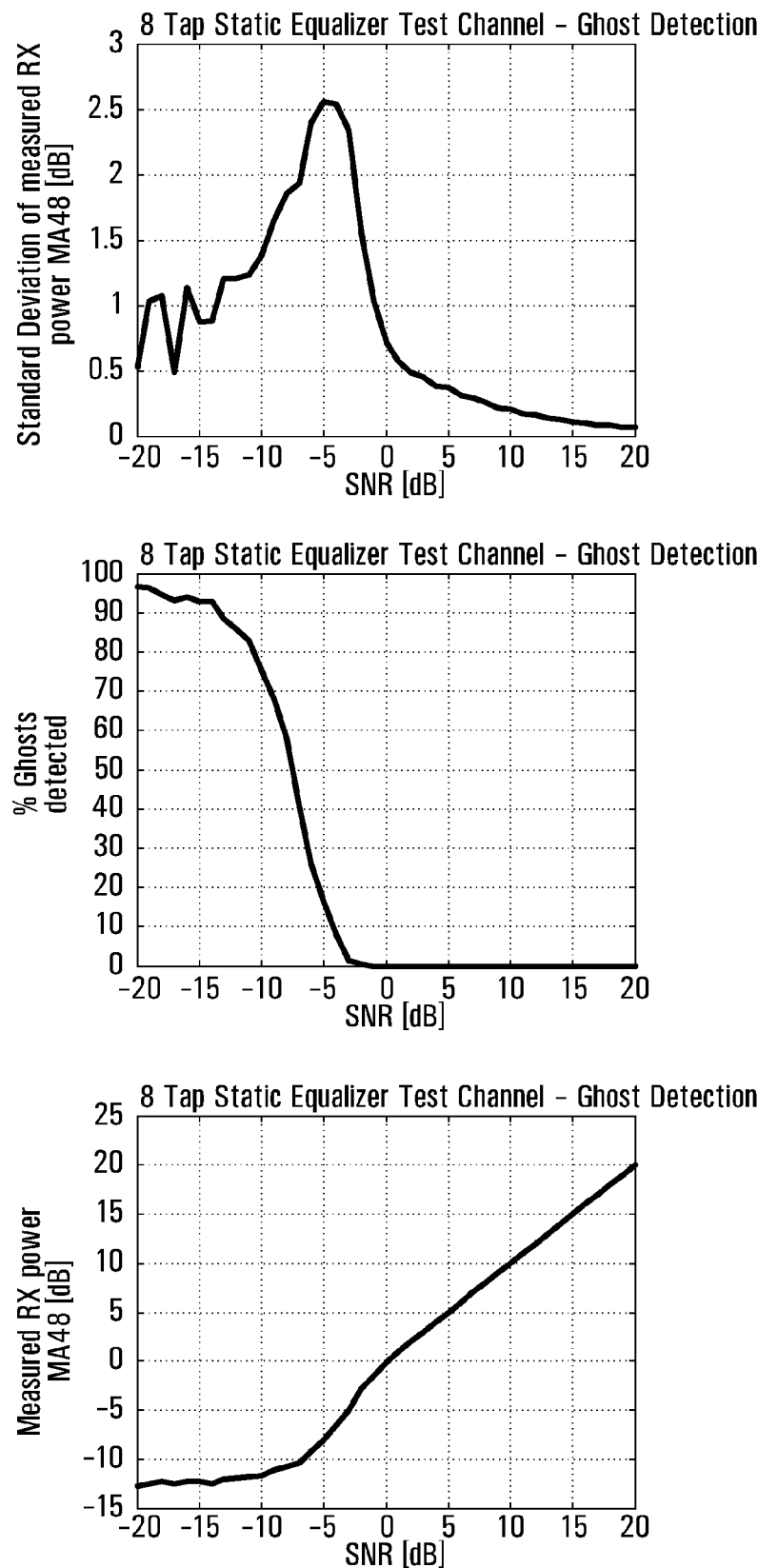
FIG. 20 depicts simulation results for static 8 tap equalizer test channel and no interference.

FIG. 20 depicts simulation results for a static 8 tap equalizer test channel and no interference. With negative SNR a ditch can be seen with 8 taps having the same power each tap is having only $\frac{1}{8}^{th}$ of the power as in AWGN. Some taps are overshadowed by noise.

Figure 21:
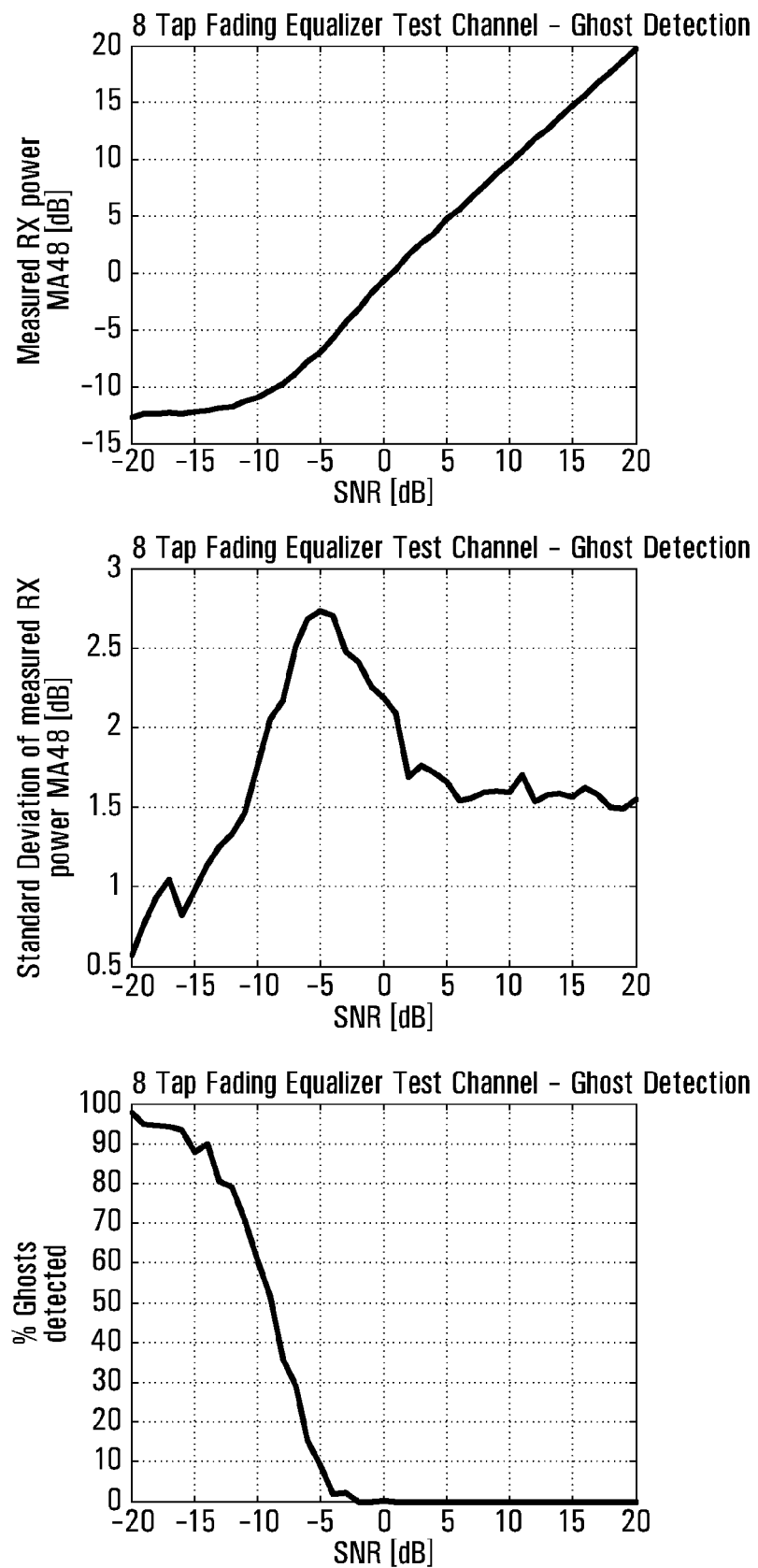
FIG. 21 depicts simulation results for fading 8 tap equalizer test channel and no interference.

FIG. 21 depicts simulation results where there is a fading 8 tap equalizer test channel and no interference. Due to the fading nature of the channel more ghost cells are detected once the fading lets the cell drop below the noise level. This is normal.

Figure 22:
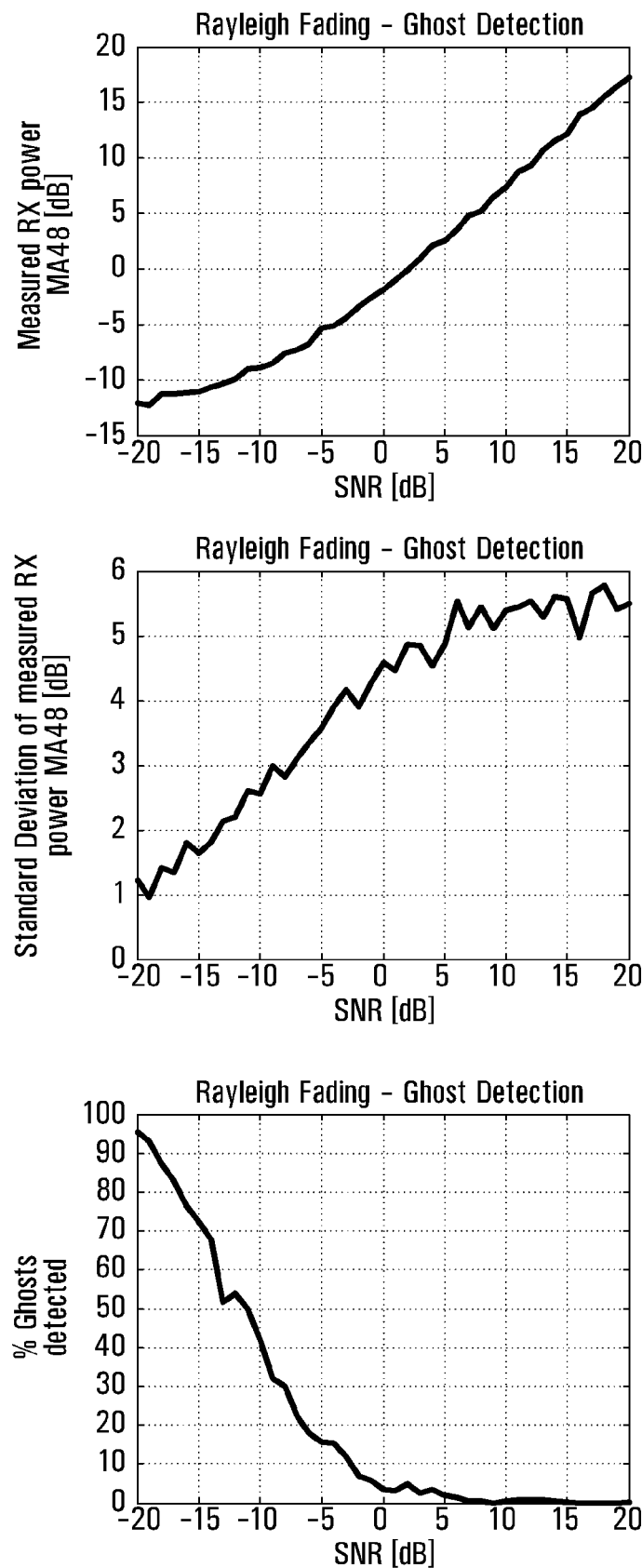
FIG. 22 depicts simulation results for Rayleigh fading and no interference.

FIG. 22 depicts simulation results where there is Rayleigh fading and no interference. Due to the strongest fading nature of the channel even more ghost cells are detected once the fading lets the cell drop below the noise level. This is normal.

Figure 23:
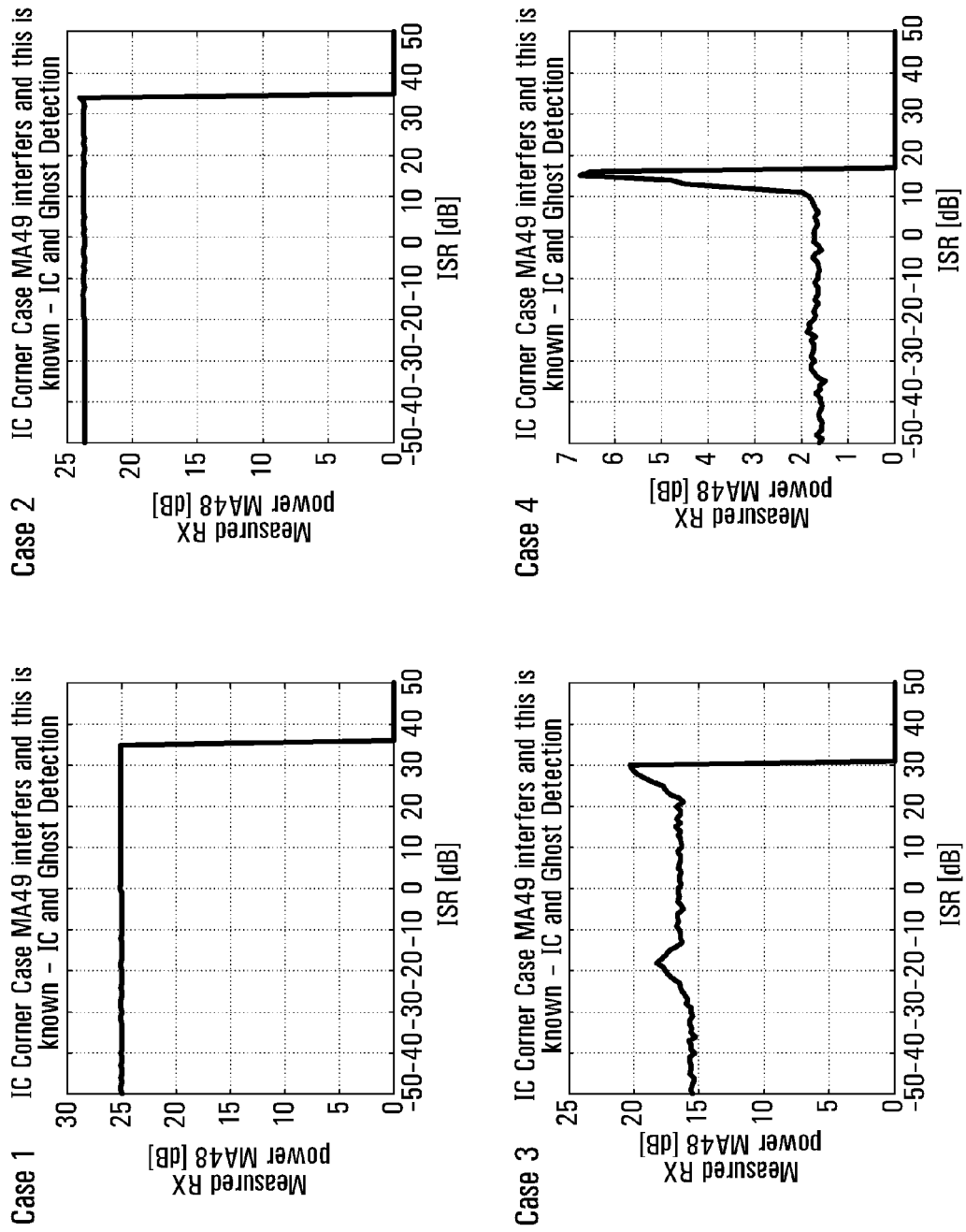
FIG. 23 depicts simulation results for various interference cancellation corner cases.

FIG. 23 depicts simulation results for various interference corner cases. Based on observations of the logs from the field trials, it was observed that the IC algorithm might be responsible for some call drops as well. In this case the serving cell is impaired by a strong intracell interferer not being in the neighbor cell list. The radio link is established in fine conditions. After a while the interferer is falsifying the measurement results. The serving cell is measured with a high power and the IC reduces the RX power of the intra-neighbor cells in the neighbor cell list to a low power. Since the call is not on TS0 this situation stays undetected until the interfering cell is opening a call in the used DL TS. Then the interference in the traffic TS is causing RLF.

It has been tried to model this situation with the following additional settings:
1. Adding thermal noise at 0 dB power.
2. Reducing the RX power of the to be detected cell to 25 dB above the thermal noise power.
3. Using static channels We show only the RX power versus the ISR for the 4 sets of parameters:
Case 1: parameters as suggested before.
Case 2: following parameters changed:
  Detection threshold for to be cancelled midamble 7 dB (letting more taps to be considered for the IC process)
  IC threshold 30 dB (IC is not disabled based on the total RX power)
Case 3: following parameters changed:
  Detection threshold for to be cancelled midamble 6 dB (letting more taps to be considered for the IC process)
  IC threshold 30 dB (IC is not disabled based on the total RX power)
Case 4: following parameters changed:
  Detection threshold for to be cancelled midamble 5 dB (letting more taps to be considered for the IC process)
  IC threshold 30 dB (IC is not disabled based on the total RX power)

From the results it can be seen that case 1 is fine. Case 2 is showing signs of deterioration.

Cases 3 and 4 show a significant power reduction of the very strong to be detected cell. The same is seen for the RSCPs of the intra neighbor cells in the traces. The assumption is that the current IC algorithm is having a detection threshold which is variable: High for high SNR in the CIR and low for low SNR in the CIR.

Additional Interference from Other Signals

In some embodiments, the signal detection is performed on the basis of a sequence that is transmitted by the base station at the same time that other signals are transmitted by the base station, with code channelization being used to distinguish between the various signals. The other signals are transmitted with different channelization codes but with the same sequence (e.g. midamble) using a different cyclic shift. This enables the related interference of these codes to be invisible for the to be measured channel impulse response (e.g. the ones used for the P-CCPCH).

Recall a ghost cell is a cell with an unreliable measurement result. The following is another example of a ghost cell detection criterion.

Ghost Detection Threshold:
  a cell with a power of a to be detected power of the P-CCPCH channel impulse response (RSCP) (more generally the power of a sequence for signal detection, for example in the first channel estimation window) within a received signal that is smaller than the total receive power (or the total corrected receive power where correction is applied) of the received signal during the midamble period as defined by a threshold (more generally during the period of the sequence for signal detection) is considered to be a ghost cell.

For example, in TD-SCDMA networks, the sequence for signal detection is the midamble, and the midamble for signal detection purposes is be transmitted on the P-CCPCH on time slot 0 (TS0) using the first two channelization codes, while at the same time (i.e. during TS0) one or more of S-CCPCH, PICH and FPACH are also transmitted using respective channelization codes using a different midamble shift than the P-CCPCH. These channels are usually allocated with a default midamble allocation and K=4, where "K=4" means that 4 midamble shifts are employed, and there is a default mapping between the midamble shifts and the channelization codes. Other mappings may alternatively be employed. The content of TS0 can be specified in system information, for example in SIB (system information block) 5.

Once a mobile station detects this to be the case for one cell, it can also be assumed to be the case for the other cells in the same area. It is the nature of these channels that they do not appear all the time. Some (FPACH (e.g. 1 code) and S-CCPCH (e.g. 3 codes) for DCCH/DTCH) might be beam-formed but PICH and S-CCPCH for CCCH are transmitted in an omni cell fashion. In the best case the P-CCPCH has TS0 on its own and in the worst case, assuming a scaling of the powers of the midamble shifts according to the number of used codes there is 3 times more power on the midamble of TS0 (and not only there). The power of a midamble shift is the same as the power of the codes used with it (multiple codes might use the same midamble shift). It is assumed that the power of the codes is all the same to reach the cell edge with all codes. There are 2 codes for the P-CCPCH, e.g. 3 codes for the S-CCPCH, e.g. 1 code for the FPACH, for a total of 6 codes altogether—three times as many codes as if there were only 2 for the P-CCPCH. Since then there are 3 times more codes there is 3 times more power than in the best case where there is the P-CCPCH alone on TS0.

Additional Interference Cancellation of Components Due to a to be Cancelled Cell:

In a case the other channels are used in a known or an unknown neighbour cell, there will be more interference from the known and unknown neighbor cells. This is up to e.g. 5 dB (3 times) more. In the simulations below, the ISR (Interference to Signal Ratio) reflects the ratio of the P-CCPCH powers only. This reflects that normally the cells are transmitting the P-CCPCH alone. For the worst case the graphs will be shifted by 5 dB or more towards lower ratios. The additional interference will have the same properties as for the P-CCPCH case apart from the increase in power.

In some embodiments, for the interference cancellation algorithms, the additional paths (also referred to as taps) for the additionally used midamble shifts of a to be cancelled cell are cancelled from the received signal as well. This is done as described before (Estimation of the interferer, identification of the noise in the estimate, then reconstruction the receive signal of the to be cancelled cell and subtracting it from the receive signal). However, with each of the paths being cancelled also a fraction of the power of the to be detected midamble is taken away. It has to be expected that the estimation of the to be detected midamble power will be more biased than before.

Removal of Contributions to Total Receive Power Due to Other Channels of to be Detected Cell:

The total receive power may, for example, initially be calculated as the sum of the powers of the samples divided by the number of samples. For the case of interference cancellation, this is done before interference cancellation.

There are other midamble shifts that may simultaneously be used in the to be detected cell. Since the channel estimation algorithm is unbiased, the P-CCPCH channel impulse response can be detected as before. However once other midamble shifts are used, their power will also contribute to the overall receive power and thus without any other change more ghost cells are detected, since the ghost cell detection is a function of the power of the to be detected cell compared to the overall received power. Keep in mind here there the ghost detection threshold is different depending on whether interference cancellation is performed or not.

In some embodiments, the other midamble shifts of the to be detected cell are considered for the ghost cell detection by performing subtraction of the power of the other midamble shifts (the ones not belonging to the P-CCPCH) from the total receive power before applying the ghost detection threshold.

An assumption is made that the other channel estimation windows associated with other midamble shifts (for example 4 channel estimation windows associated with K=4 shifts) could contain used midamble shifts. If this approach is taken, there are three potential errors that may result:

a. There are midamble shifts detected which are not there. Subtracting an amount from the received power associated with a midamble shift that is not there will reduce the received power, and make it easier for a cell to pass the ghost cell detection threshold. This will in tendency prevent ghost cells from being detected.
 b. There are midamble shifts not detected which are there. This will in tendency result in ghost cells being detected which should not be detected. In this case, an amount of received power associated with a midamble shift is not subtracted because it was not detected; the receive power will not be reduced to the extent it should have been, and it will be harder for a cell to pass the ghost cell detection threshold.
 c. Detected midamble shifts are detected with erroneous path positions and path powers.

In short this will result in a bigger transition zone (zone of uncertainty) from no ghost cells being detected to ghost cells being detected. This is because the measurement errors may provoke a detection of a ghost cell which is not there. Then the measured power is only below the threshold by chance. Similarly, the measurement errors provoke that a ghost cell is not detected. Then the measured power is above the threshold by chance.

In some embodiments, the following changes are implemented compared to the previously described embodiments, where it has been assumed that the configuration of certain other (than P-CCPCH) midamble shifts also applies to the other cells of this area. This assumption need not apply if the mobile station examines system information of other cells directly by looking at broadcast information from the other cells, if possible, for example from SIB5. In case the system information of a cell can be received, it can be confirmed the cell is not a ghost cell, the configuration of midamble shifts can be learned and used for the measurement of the RSCP.

1) Reduction in Overall Receive Power for Detected Midamble Shift Other than to be Detected Midamble Shift If a configured midamble shift on to be detected cell is detected aside from the to be detected (e.g. P-CCPCH) midamble shift, the detected power of this shift is subtracted from the overall receive power of the midamble before applying the ghost detection threshold.

In a specific example of this, assume that a cell is near the boundary to become a ghost cell in presence of an unknown interferer.

For this example, the power on the P-CCPCH is assumed to be about 9 dB lower than the interference. The total received power during the midamble is composed of the following powers in the worst case:

1. P-CCPCH of to be measured cell: 1 pico Watt—(this value is arbitrarily chosen for this example)
 2. Power of interference: 8 pico Watt (9 dB>P-CCPCH)
 3. Power of the other physical channels on TS0: 2 pico Watt (twice the power of the P-CCPCH as per worst case assumption)
 Total receive power: 11=8+1+2 pico Watt Ghost Cell Detection in dB:

$$\text{total receive power (db)} - \text{threshold (dB)} > \text{RSCP (dB)} \rightarrow \text{ghost cell}$$

Ghost Cell Detection in Pico Watt:

$$\text{Total receive power(pico Watts)/threshold(pico Watt)} > \text{RSCP (Watts)} \rightarrow \text{ghost cell}$$

Assuming that the ghost detection threshold is 10 dB, for the case where no subtraction of the other physical channels is performed, the test is applied as follows:

$$\text{Total received power/10(ghost detection threshold:} \\ 10 \text{ dB*log } 10(10)=10 \text{ dB})=11/10=1.1>\text{RSCP of} \\ \text{P-CCPCH}(=1) \rightarrow \text{power is below ghost cell} \\ \text{detection threshold, so a ghost cell would be} \\ \text{detected}$$

Assuming that the ghost detection threshold is 10 dB, for the case where subtraction of the other physical channels is performed:

Total received power—detected powers of the other midamble shifts used in TS0 of the to be detected cell: 11−2=9
 Ghost detection threshold: 9/10=0.9<1→power is above ghost cell detection threshold, so cell is treated as a reliable cell.

2) Adjustments to the Subtraction Amounts

Because the P-CCPCH is transmitted on an omni antenna, and other channels may be transmitted using beam forming, every path/tap that is present in one of the other channels should also be present in the P-CCPCH. Thus, if additional paths/taps are present on the other channels, these additional paths/taps can be treated as noise.

If the set of taps on the P-CCPCH is {SET_A}, and the set of taps on another channel is {SET_B}, then for the purpose of determining an amount to subtract from the overall receive signal during the preamble, only the taps of {SET_B} that are also in {SET_A} are subtracted.

For example, assume the paths for the midamble shift for the S-CCPCH are 1, 3, 8, 10, and the paths for P-CCPCH are 5 to 10. Then the power of the S-CCPCH on taps 1 and 3 is set to zero before subtracting an amount from the total receive power. This has the effect of making the power that is subtracted less, in turn making it more difficult for a ghost cell to stay undetected, and detected as an OK cell.

3) Adjustments Made Based on Power in Unused Windows

The default midamble allocation K=4 leaves half of the channel estimation windows unused (TS0 is configured for the P_CCPCH using two of the 16 channel estimation windows for channel estimation in order to cover cells with a big delay spread. This leaves only 8 bigger channel estimation windows in TS0. With the K=4 configuration, 4 of them are used leaving the other 4 unused. There may some receive power left after post processing in the unused channel estimation windows, and this is noise. The amount of receive power in the unused channel estimation windows can be determined.

Recall that an amount is subtracted from the total receive power for each of S-CCPCH, FPACH and PICH that are present in TS0. Each has its own channel estimation window. In some embodiments, conditional subtraction based on the power of used window relative to power of unused window is employed as follows:

For each used window (S-CCPCH, FPACH and PICH), if the power in the used window after post processing (sum of the taps) is not larger than the (average) power in the unused estimation windows by a threshold amount (e.g. a factor of 2) then an amount for that window is not subtracted from the total receive power for the purpose of ghost cell detection.

In some embodiments, ghost cell detection is also based on power of used window relative to power of unused window. If there is some receive power left after post processing in the unused channel estimation windows this is noise. For the P-CCPCH window, if the power in the used window after post processing (sum of the taps) is not larger than the power in the unused estimation by a threshold amount (e.g. a factor of 2) then a ghost cell is detected.

This part of the method is dealing with the detection of noise in the used channel estimation windows. For example, consider a case where the receive power in the unused channel estimation windows is the same as in a used one. Then this means that the power in the unused channel estimation windows is noise for sure and that the power in the used channel estimation windows is noise, most likely, too. Only if the receive power in the used channel estimation windows is large enough (as defined by a threshold amount) than the power in the unused channel estimation windows is it considered to carry the power of the used midamble shift. Otherwise all the paths in the used channel estimation windows are set to 0. If the P-CCPCH midamble shift is concerned this leads to a detected ghost cell.

4) Regression Based Method of Differentiating Between Signalling and Noise.

Raw channel estimates for a to be detected cell, or a to be cancelled cell, are obtained in the form of taps at the outcome of filtering with the basic midamble code. At this point, no particular midamble shift is yet being applied. The taps are the sorted in descending order of magnitude. The sorted taps can be plotted in a logarithmic scale. The shape of the plot of taps thus generated can be referred to as a signature for a given signal.

A signal that was purely noise, and a signal that was purely interference would have the same signature. This signature can be approximated with a square/square root or linear function. This information can be used to extract a noise/interference signature from the raw channel estimates.

If the sorted raw channel estimates are composed of N taps (e.g. 128 taps), it can be assumed that the last M (e.g. 88 taps) of these are noise/interference only—i.e. they do not contain any component of the signal of interest. Linear regression on L (e.g. 60 taps) of these last M taps can be performed to derive a square or linear function describing the noise/interference signature over L of the last M taps, the last M-L taps (e.g. the last 28 taps) are not considered in the regression; the result can then be extrapolated to the first N taps to produce an estimate of an overall noise/interference signature over the N taps.

Next, a post processing step on the first N-M taps is performed. In order for a given tap to be considered reliable, it must exceed the noise/interference signature for that tap by a tap-wise detection threshold amount. If a given tap does not exceed the noise/interference signature by this tap-wise threshold amount, it is considered noise, and is set to zero. Then, the remaining taps are returned to their original order.

In the case of a to be cancelled cell, these taps are then used for interference cancellation purposes.

In the case of a to be detected cell, these taps are then used for ghost cell detection purposes. Note that the adjustments described above under one or a combination of items 1) Reduction in overall receive power for detected midamble shift other than to be detected midamble shift, 2) Adjustments to the subtraction amounts, and 3) Adjustments made based on power in unused windows, can also be applied, using the set of taps output by the regression approach.

A set of simulations using regressed signature functions was performed. For these examples, the raw channel estimate is composed of N=128 taps, and M=60 of these are used to develop the noise/interference signature. The following parameters were assumed for the simulations:
Tap-Wise Detection Threshold for the to be Detected Midamble: 5 dB
Tap-Wise Detection Threshold for to be Cancelled Midamble: 6 dB
Interference Cancellation Threshold: 6 dB
In the worst case scenario, there is a significant ghost detection rate without interference cancellation once the two midambles have the same power so the threshold can be increased.
Ghost Detection Threshold without IC Applied: 8 dB
This threshold can be lowered because otherwise too many ghost cells would have stayed undetected. This is a tribute to the tough interference situation.
Ghost Detection Threshold with IC Applied: 20 dB
Laboratory measurements have shown that with IC ghost cells have been detected beyond 20 dB power difference. This adjustment has nothing to do with the increased interference problem.
Other Midamble (MA) Shifts: 'Y' and 'N':
Y means that the midamble shifts for S-CCPCH, PICH and FPACH are used for both interfering and detected cell.
N means that the midamble shifts for S-CCPCH, PICH and FPACH are not used for both interfering and detected cell.
Used MA Shift str: '10101010'—
This means that the detector is assuming that out of the 8 midamble shifts with 16 chip channel estimation length shifts 1, 3, 5, and 7 could be used. The other 4 channel estimation windows are assumed not to be used.
Ghost Detection Threshold 2: 6 dB
In case the used channel estimation window is not at least 6 dB stronger than the average measured signal strength of the unused windows all the paths in this window are set to 0.
Lower Ghost Detection Bound: 6 dB
Modified because new algorithms have an adverse effect on the interference less case.
In the following the results with the regression method are shown for the best case scenario. The results with the standards deviation are omitted.

Figure 24:
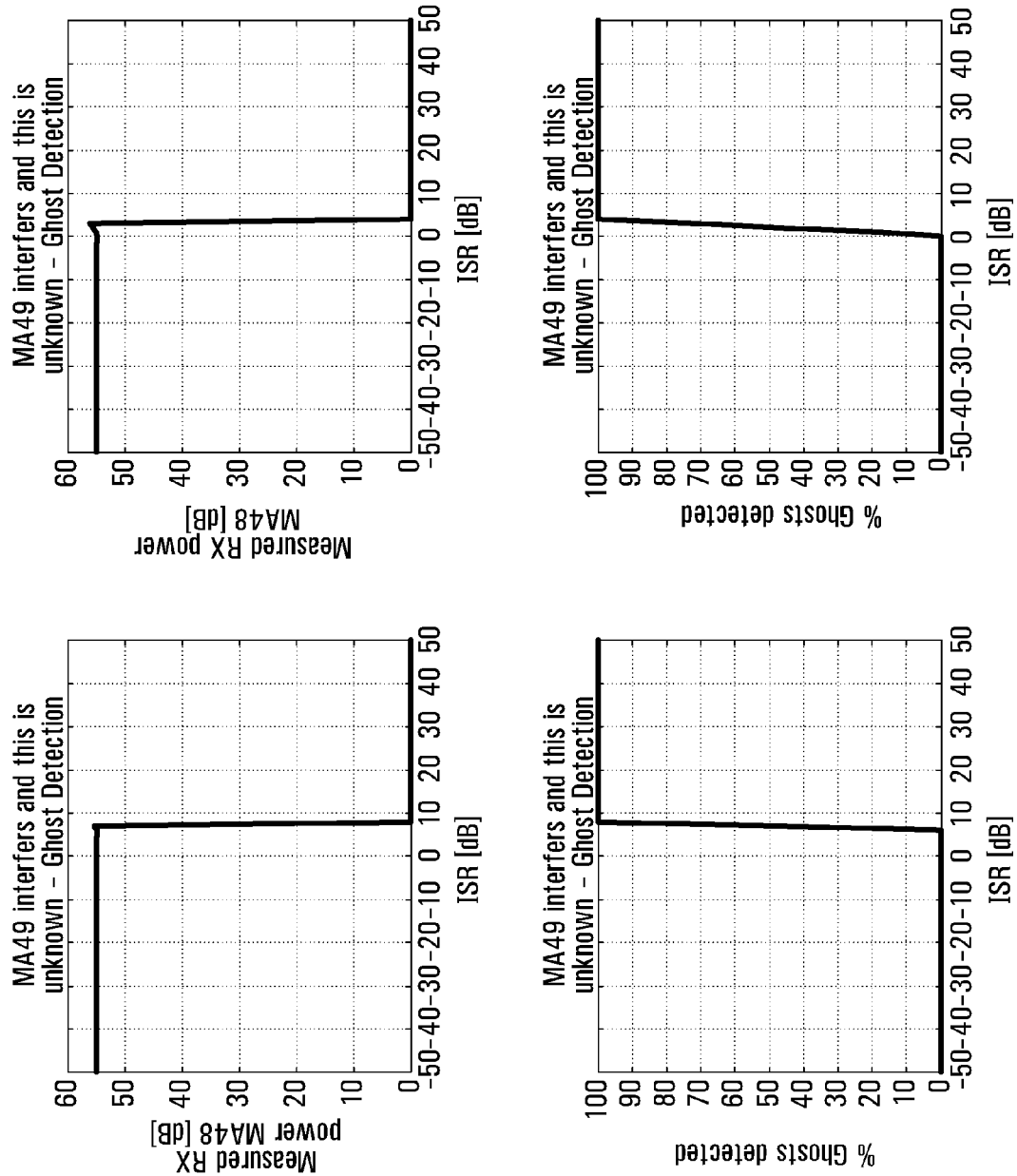
FIG. 24 depicts simulation results for unknown interfering cell and no interference cancellation—static 1 tap channel.

FIG. 24 depicts simulation results where there is an unknown interfering cell and no interference cancellation, and a static 1 tap channel is assumed. The result looks fine in the sense that there is a sharp detection transition zone at ISR of 8-9 dB. It is noted that for the worst case the actual instantaneous receive power for the interfering cell is 5 dB higher—as per worse case assumption. The best case results are depicted in the left hand two plots, while the worst case results are depicted in the right hand two plots. For the best case, no other than P-CCPCH MA shift is used but 4 MA shifts were considered. For the worst case, 2 other than P-CCPCH MA shifts used and 4 MA shifts were considered.

Figure 25:
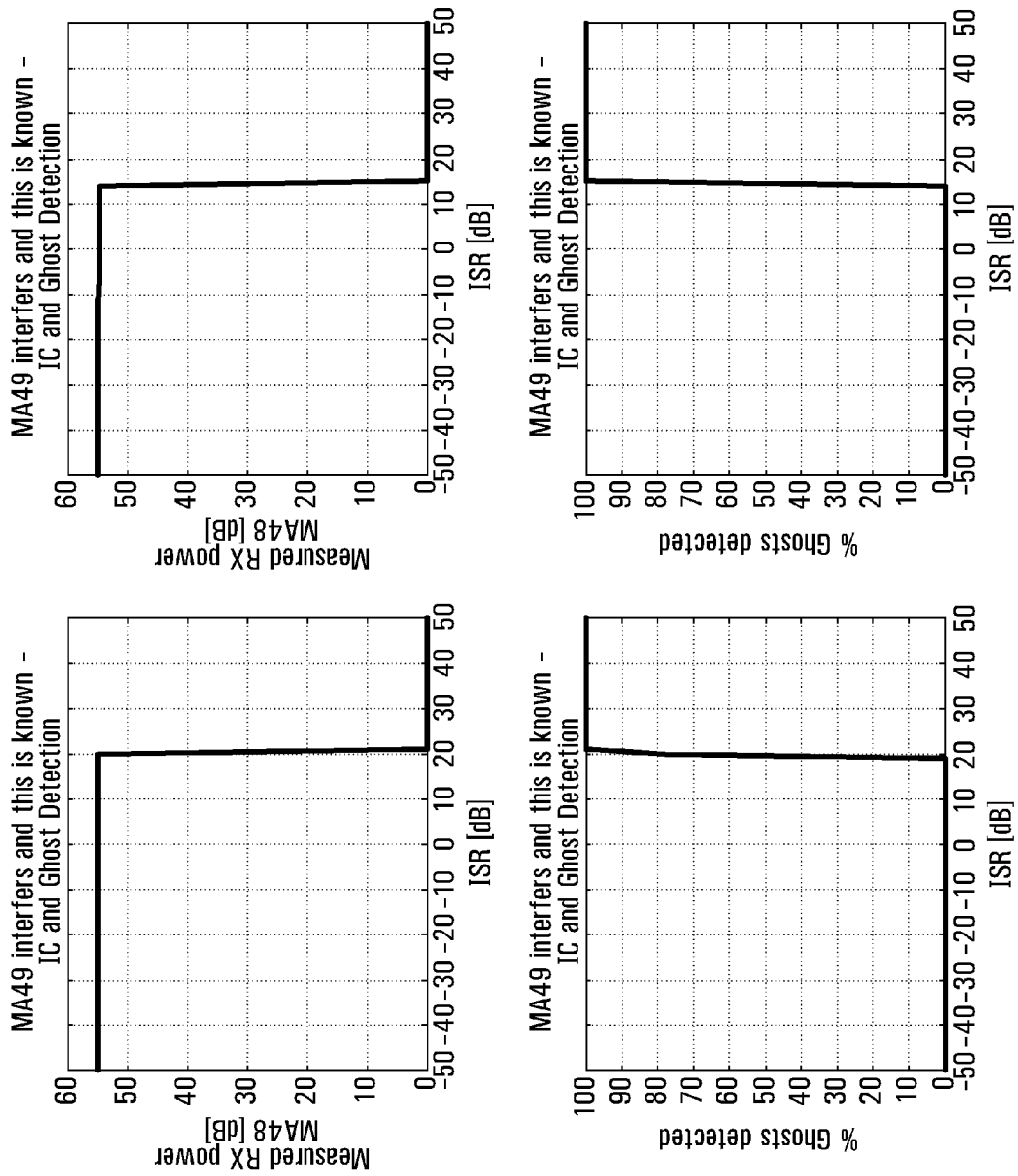
FIG. 25 depicts simulation results for known interfering cell and interference cancellation—static 1 tap channel.

FIG. 25 depicts simulation results where there is a known interfering cell and interference cancellation, and a static 1 tap channel is assumed. The result looks fine. Please note that for the worst case the actual instantaneous RX power for the interfering cell is 5 dB higher—as per worse case assumption. The best case results are depicted in the left hand two plots, while the worst case results are depicted in the right hand two plots. For the best case, no other than P-CCPCH MA shift was used but 4 MA shifts were considered. For the worst case, 2 other than P-CCPCH MA shifts were used and 4 MA shifts were considered.

Figure 26:
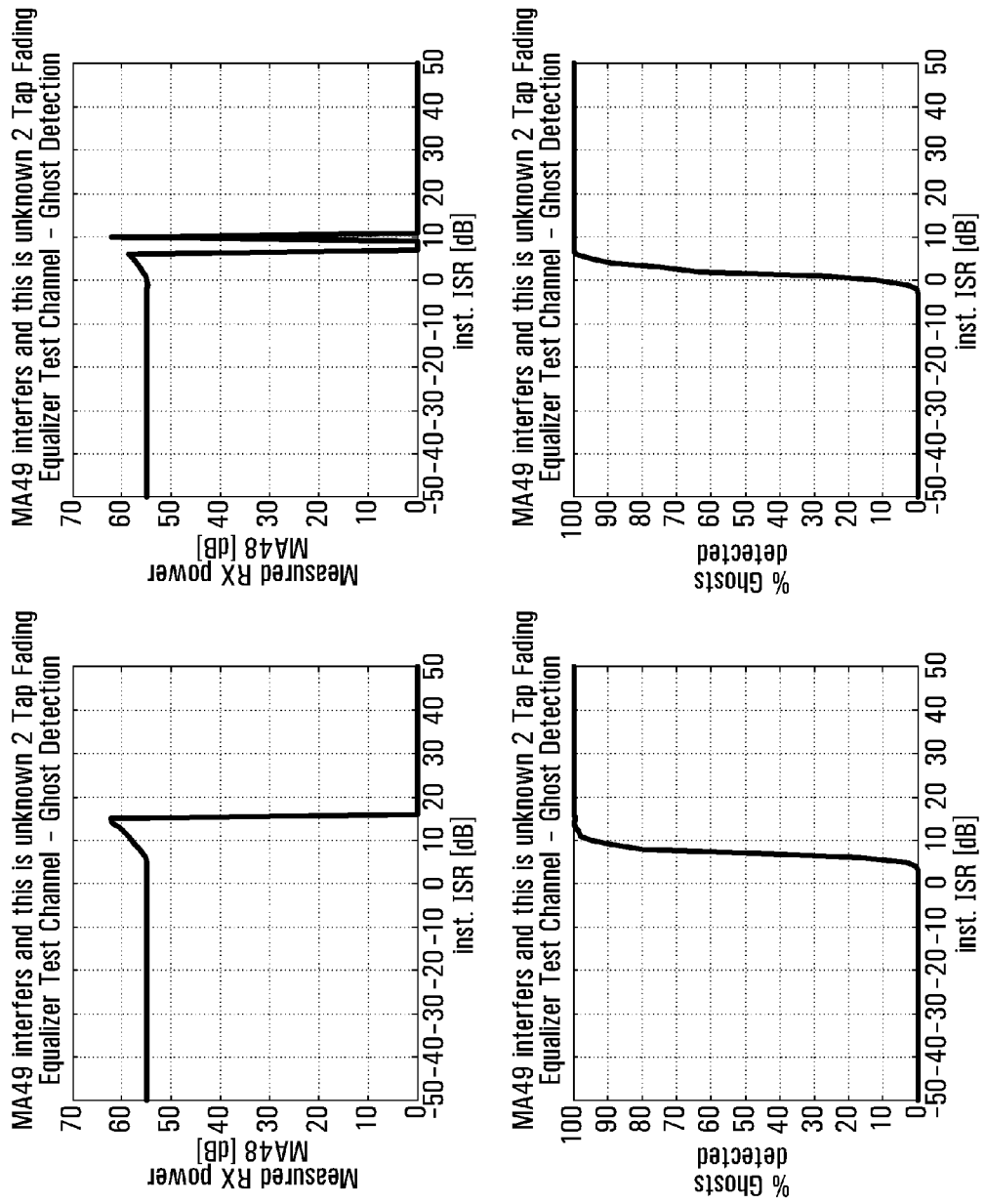
FIG. 26 depicts simulation results for unknown interfering cell and no interference cancellation—2 tap equalizer test channel.

FIG. 26 depicts simulation results where there is an unknown interfering cell and no interference cancellation, and a 2 tap equalizer test channel is assumed. The result is still fine even though the RX measurement gets biased and there is a wider transition zone. Please note that for the worst case the actual instantaneous RX power for the interfering cell is 5 dB higher—as per worse case assumption. The best case results are depicted in the left hand two plots, while the worst case results are depicted in the right hand two plots. For the best case, no other than P-CCPCH MA shift was used but 4 MA shifts were considered. For the worst case, 2 other than P-CCPCH MA shifts were used and 4 MA shifts were considered.

Figure 27:
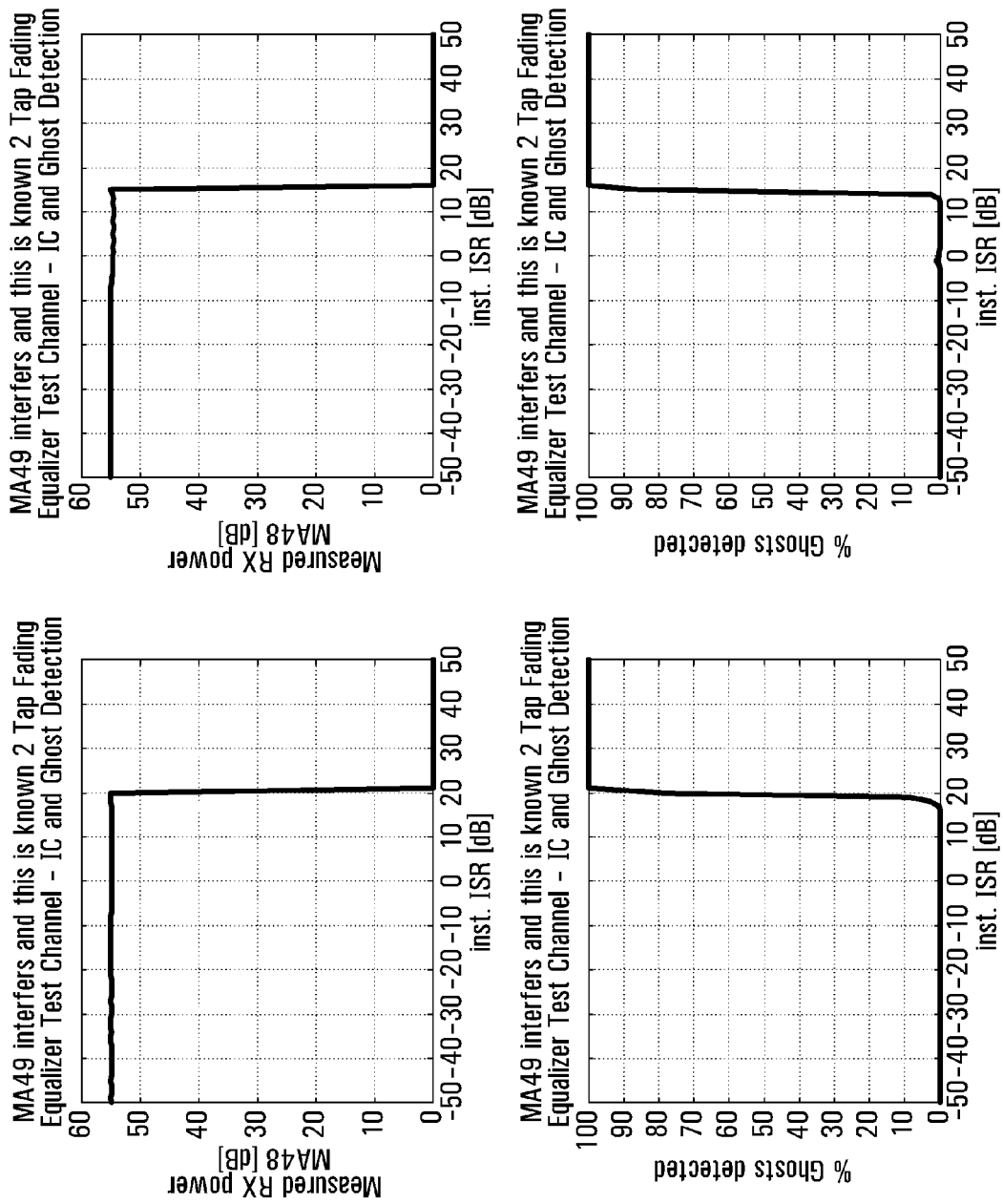
FIG. 27 depicts simulation results for known interfering cell and interference cancellation—2 tap equalizer test channel.

FIG. 27 depicts simulation results where there is a known interfering cell and interference cancellation, and a 2 tap equalizer test channel is assumed. The result still looks fine even though for the worst case bias is to be seen and there are little issues for the ghost detection to be seen where both cells have the same power. Here the to be detected cell is also interfering the measurements for the interfering cell. it is noted that for the worst case the actual instantaneous RX power for the interfering cell is 5 dB higher—as per worse case assumption. The best case results are depicted in the left hand two plots, while the worst case results are depicted in the right hand two plots. For the best case, no other than P-CCPCH MA shift was used but 4 MA shifts were considered. For the worst case, 2 other than P-CCPCH MA shifts were used and 4 MA shifts were considered.

Figure 28:
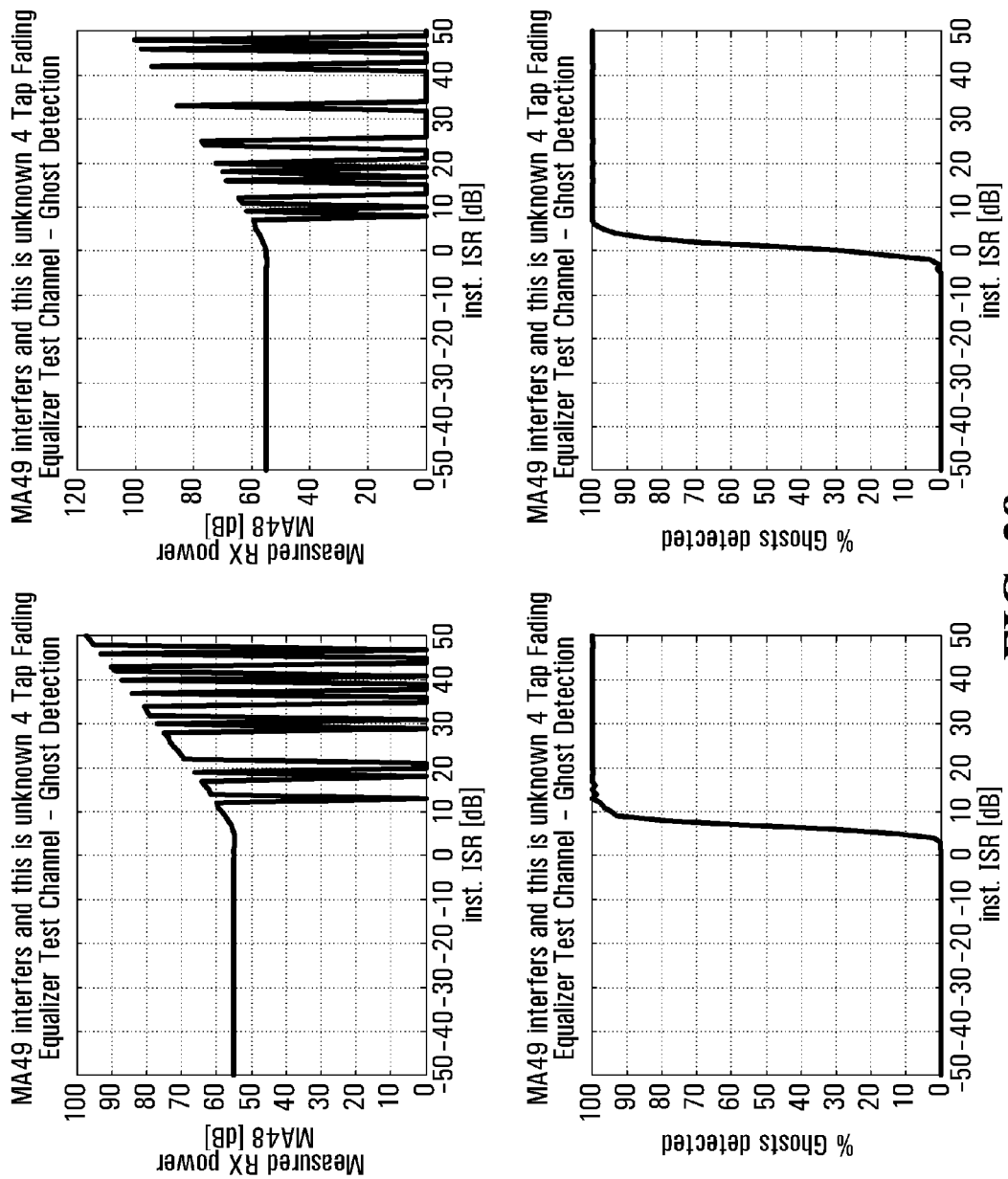
FIG. 28 depicts simulation results for unknown interfering cell and no interference—4 tap equalizer test channel.

FIG. 28 depicts simulation results where there is an unknown interfering cell and no interference cancellation, and a 4 tap equalizer test channel is assumed. The result still looks fine even though for the worst case bias is to be seen and there are little issues for the ghost detection to be seen where both cells have the same power here the to be detected cell is also interfering the measurements for the interfering cell. The isolated measurement glitches have to be filtered by post processing in order not to cause unwanted events 2a for example. It is noted that the worst case the actual instantaneous RX power for the interfering cell is 5 dB higher—as per worse case assumption. Note also that this case is unlikely. The best case results are depicted in the left hand two plots, while the worst case results are depicted in the right hand two plots. For the best case, no other than P-CCPCH MA shift was used but 4 MA shifts were considered. For the worst case, 2 other than P-CCPCH MA shifts were used and 4 MA shifts were considered.

Figure 29:
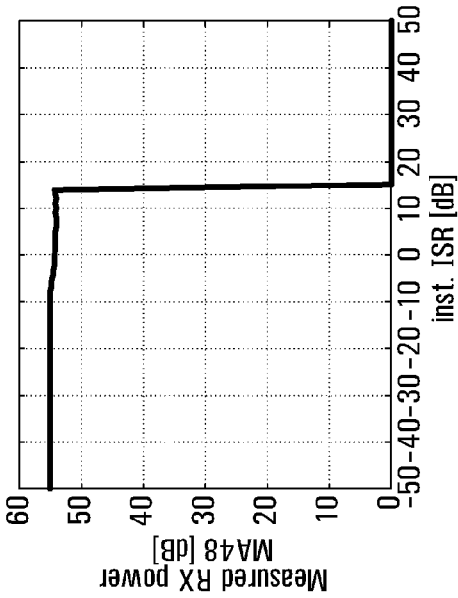
FIG. 29 depicts simulation results for known interfering cell and interference cancellation—4 tap equalizer test channel.
Figure 29:
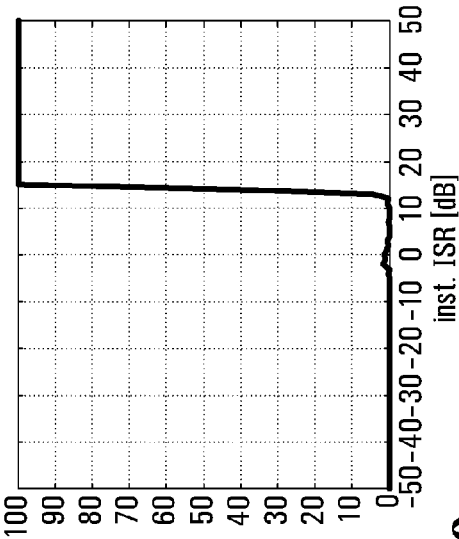
Figure 29:
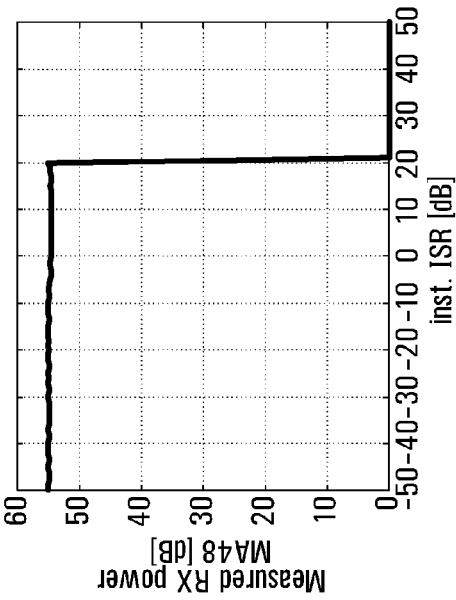
Figure 29:
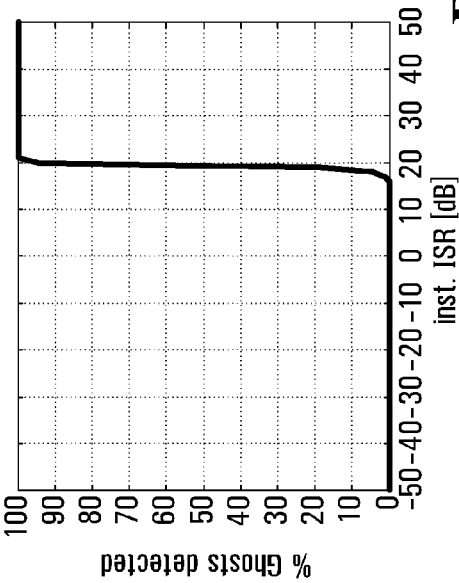

FIG. 29 depicts simulation results where there is a known interfering cell and interference cancellation, and a 4 tap equalizer test channel is assumed. The result still looks fine even though for the worst case bias is to be seen and there are little issues for the ghost detection to be seen where both cells have the same power. Here the to be detected cell is also interfering the measurements for the interfering cell. It is noted that for the worst case the actual instantaneous RX power for the interfering cell is 5 dB higher—as per worse case assumption. The best case results are depicted in the left hand two plots, while the worst case results are depicted in the right hand two plots. For the best case, no other than P-CCPCH MA shift was used but 4 MA shifts were considered. For the worst case, 2 other than P-CCPCH MA shifts were used and 4 MA shifts were considered.

Figure 30:
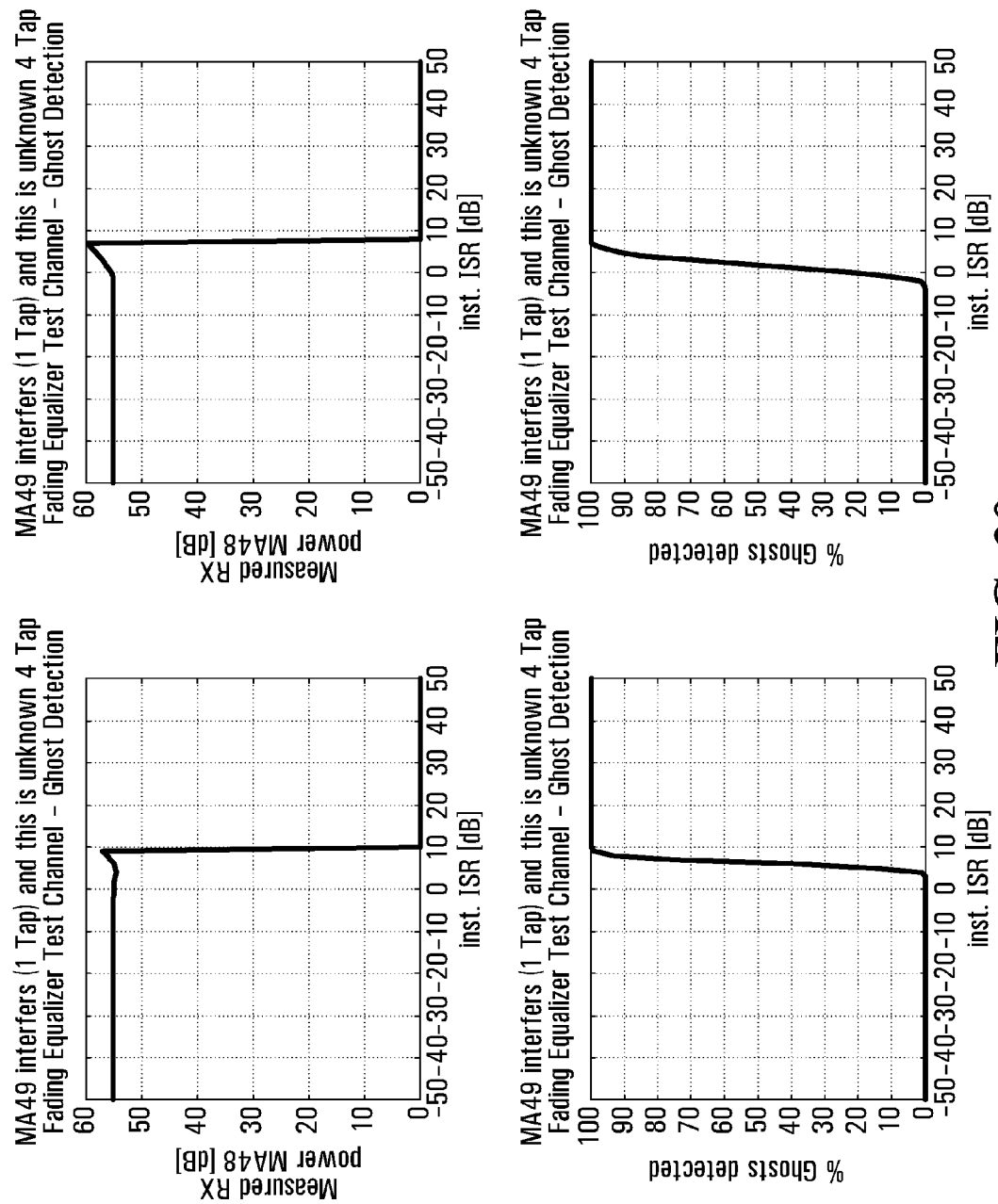
FIG. 30 depicts simulation results for unknown interfering cell and no interference cancellation—4 tap equalizer test channel for detected cell and 1 tap for interfering cell.

FIG. 30 depicts simulation results where there is an unknown interfering cell and no interference cancellation, and a 4 tap equalizer test channel for detected cell and 1 tap for interfering cell were assumed. The result shows that ghost cells can be detected at a quite low ISR already. It is noted that for the worst case the actual instantaneous RX power for the interfering cell is 5 dB higher—as per worse case assumption. The best case results are depicted in the left hand two plots, while the worst case results are depicted in the right hand two plots. For the best case, no other than P-CCPCH MA shift was used but 4 MA shifts were considered. For the worst case, 2 other than P-CCPCH MA shifts were used and 4 MA shifts were considered.

Figure 31:
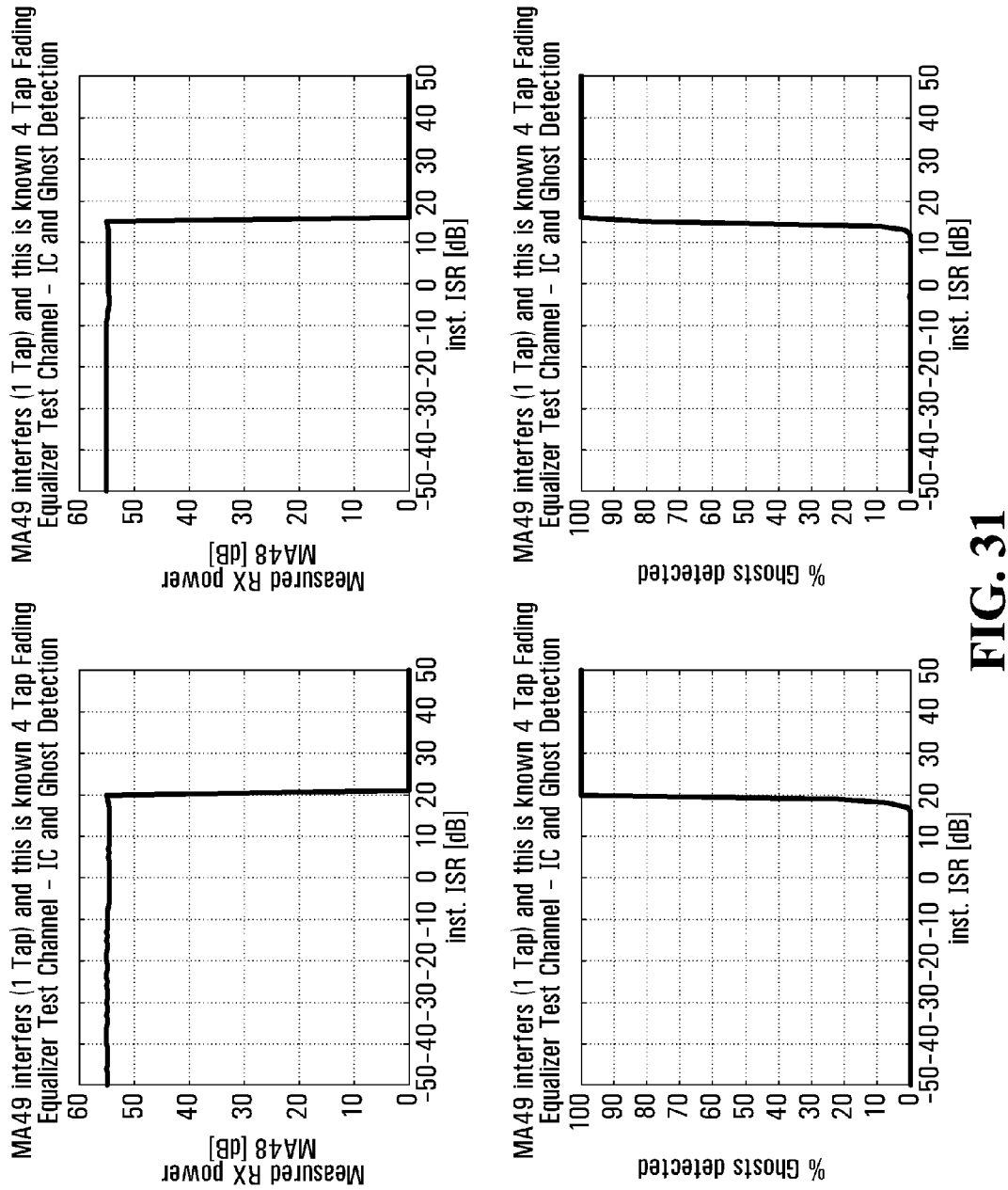
FIG. 31 depicts simulation results for known interfering cell and interference cancellation—4 tap equalizer test channel for detected cell and 1 tap for interfering cell.

FIG. 31 depicts simulation results where there is a known interfering cell and interference cancellation, and a 4 tap equalizer test channel for detected cell and 1 tap for interfering cell were assumed. The result looks fine. It is noted that for the worst case the actual instantaneous RX power for the interfering cell is 5 dB higher—as per worse case assumption. The best case results are depicted in the left hand two plots, while the worst case results are depicted in the right hand two plots. For the best case, no other than P-CCPCH MA shift was used but 4 MA shifts were considered. For the worst case, 2 other than P-CCPCH MA shifts were used and 4 MA shifts were considered.

Figure 32:
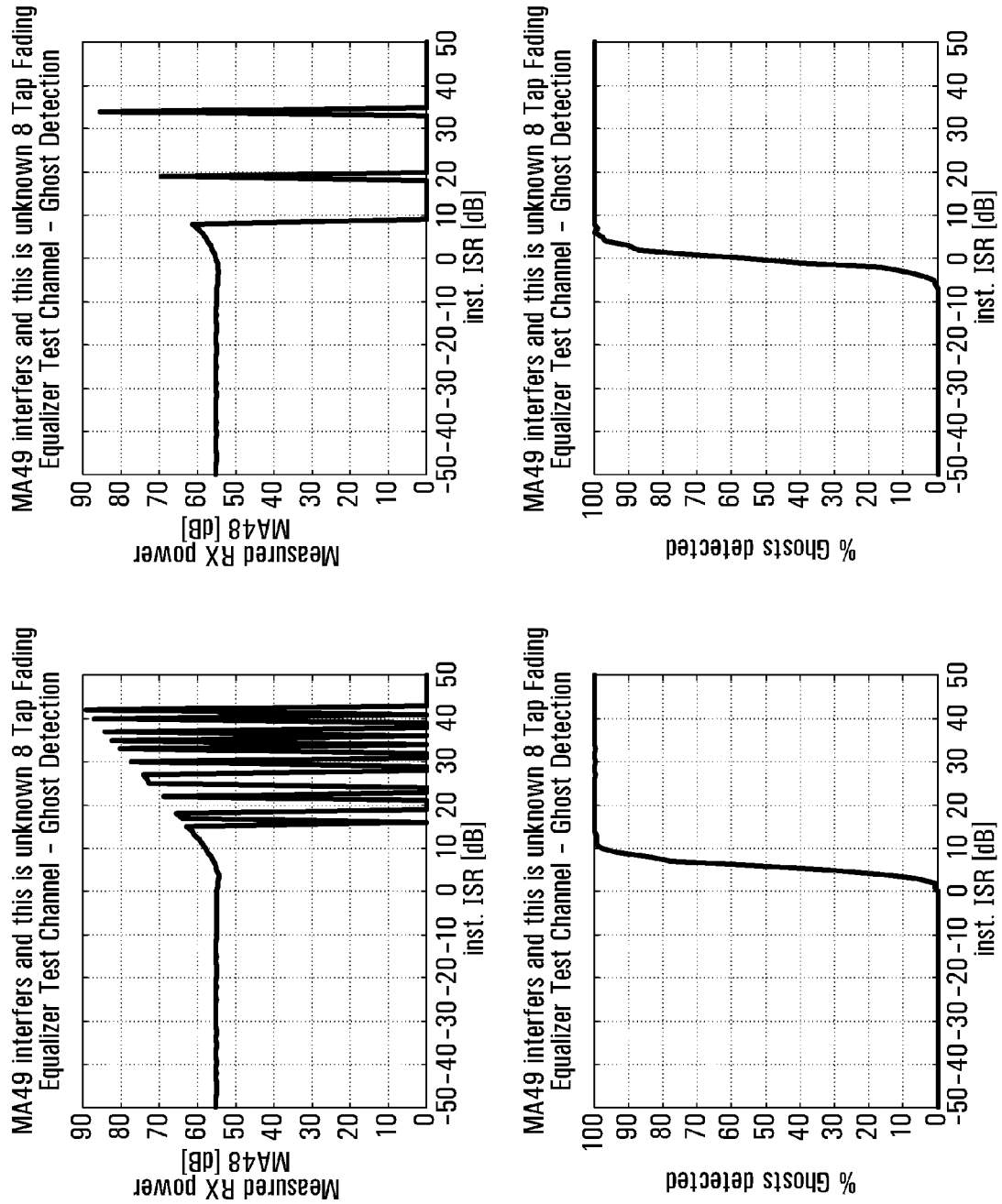
FIG. 32 depicts simulation results for unknown interfering cell and no interference cancellation—8 tap equalizer test channel.

FIG. 32 depicts simulation results where there is an unknown interfering cell and no interference cancellation, and an 8 tap equalizer test channel is assumed. The result looks worse because in the worst case ghost cells are detected at a very low ISR. It is noted that for the worst case the actual instantaneous RX power for the interfering cell is 5 dB higher—as per worse case assumption. This case is very unlikely. The best case results are depicted in the left hand two plots, while the worst case results are depicted in the right hand two plots. For the best case, no other than P-CCPCH MA shift was used but 4 MA shifts were considered. For the worst case, 2 other than P-CCPCH MA shifts were used and 4 MA shifts were considered.

Figure 33:
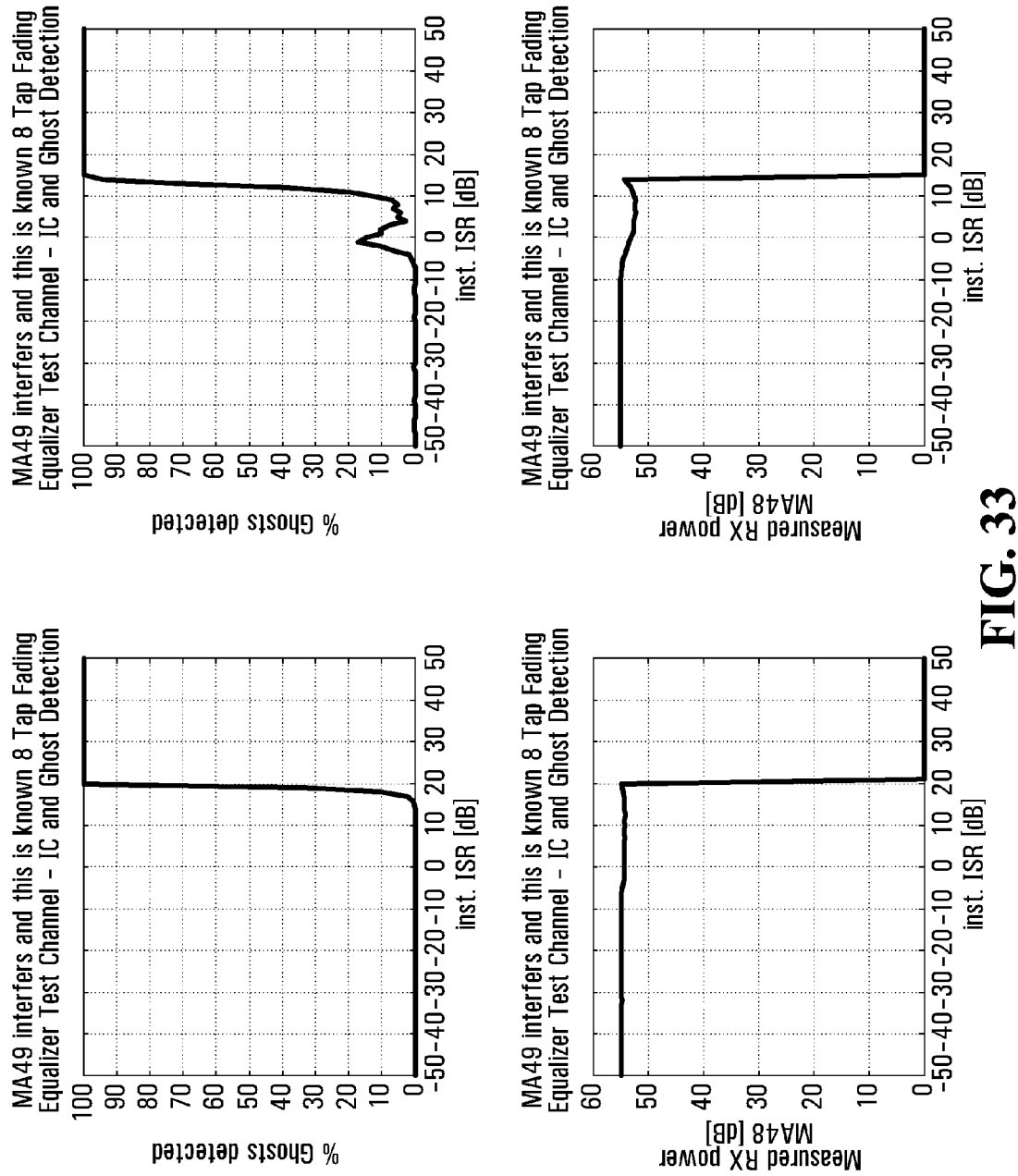
FIG. 33 depicts simulation results for known interfering cell and interference cancellation—8 tap equalizer test channel.

FIG. 33 depicts simulation results where there is a known interfering cell and interference cancellation, and an 8 tap equalizer test channel is assumed. The result looks bad for the worst case in scenarios like this (however unlikely they are) it is least advisable to load 1 TS with 3 omni cell channels. It is noted that for the worst case the actual instantaneous RX power for the interfering cell is 5 dB higher—as per worse case assumption. The best case results are depicted in the left hand two plots, while the worst case results are depicted in the right hand two plots. For the best case, no other than P-CCPCH MA shift was used but 4 MA shifts were considered. For the worst case, 2 other than P-CCPCH MA shifts were used and 4 MA shifts were considered.

Figure 34:
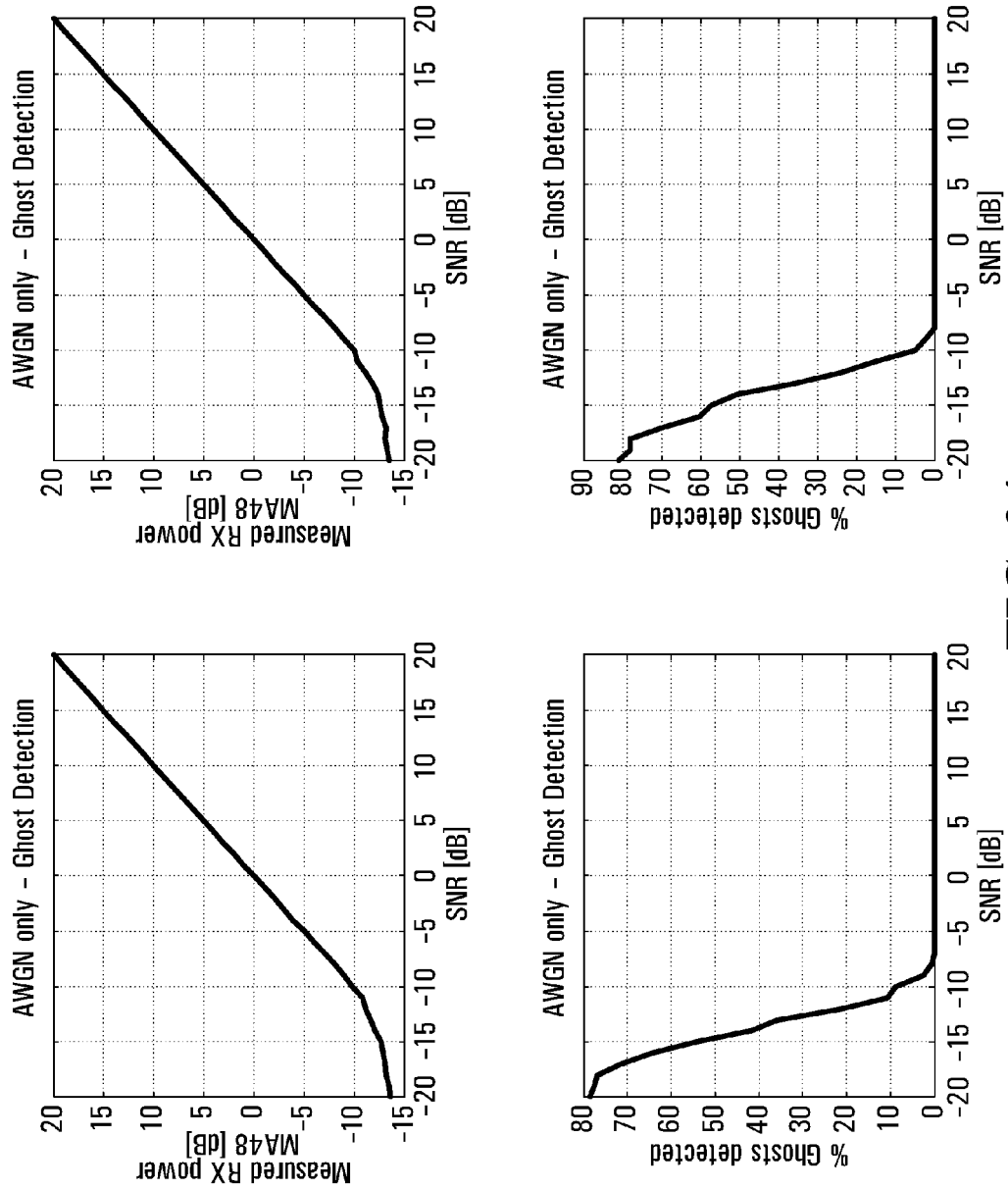
FIG. 34 depicts simulation results for AWGN and no interference.

FIG. 34 depicts simulation results where there is AWGN and no Interference. The result looks fine. As expected there is no significant difference in-between best and worst case. The best case results are depicted in the left hand two plots, while the worst case results are depicted in the right hand two plots. For the best case, no other than P-CCPCH MA shift was used but 4 MA shifts were considered. For the worst case, 2 other than P-CCPCH MA shifts were used and 4 MA shifts were considered.

Figure 35:
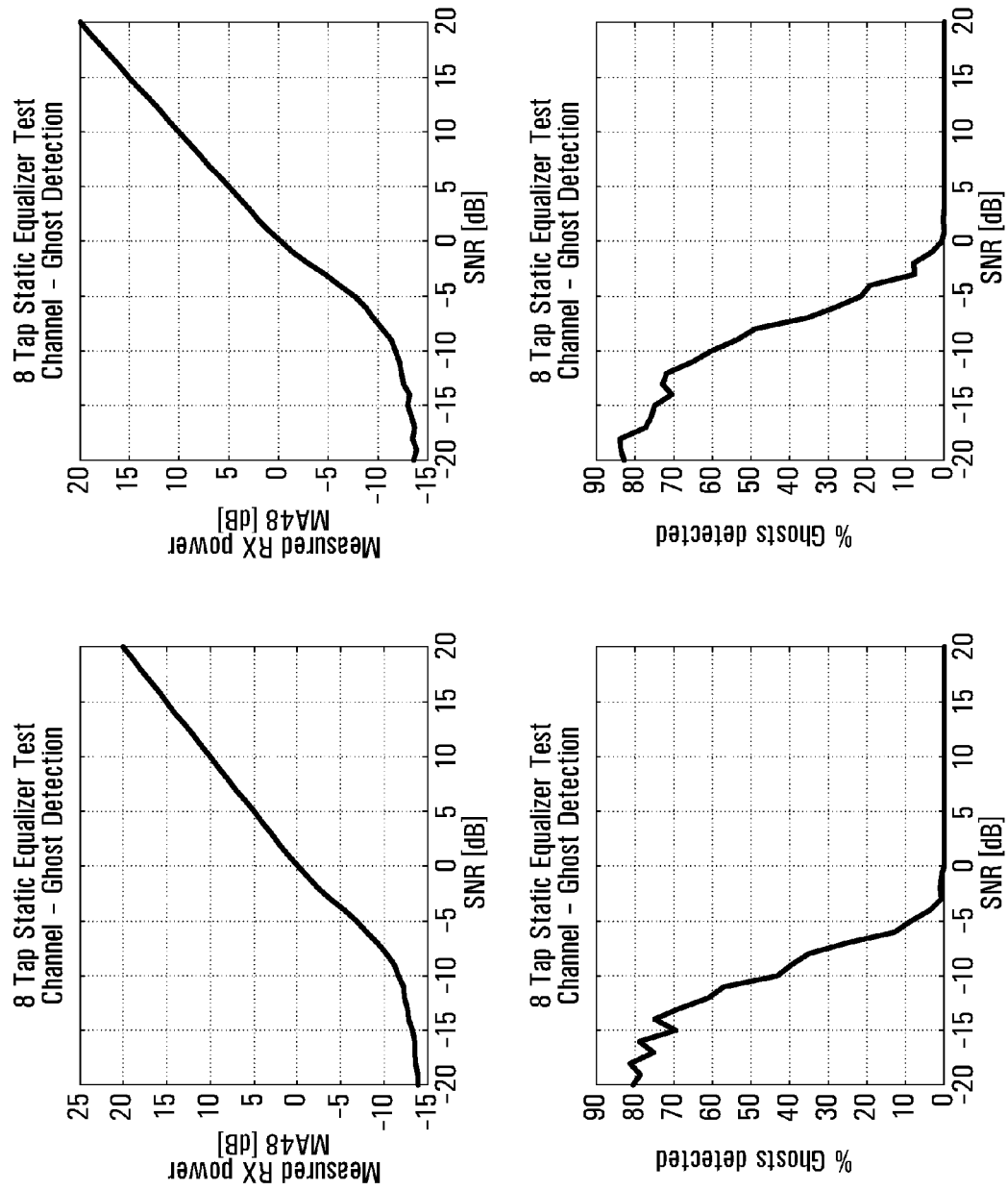
FIG. 35 depicts simulation results for static 8 tap equalizer test channel and no interference.

FIG. 35 depicts simulation results where a static 8 tap equalizer test channel is assumed and there is interference. The result looks fine. For the ghost detection rate there is a difference in-between best and worst case. The best case results are depicted in the left hand two plots, while the worst case results are depicted in the right hand two plots. For the best case, no other than P-CCPCH MA shift was used but 4 MA shifts were considered. For the worst case, 2 other than P-CCPCH MA shifts were used and 4 MA shifts were considered.

Figure 36:
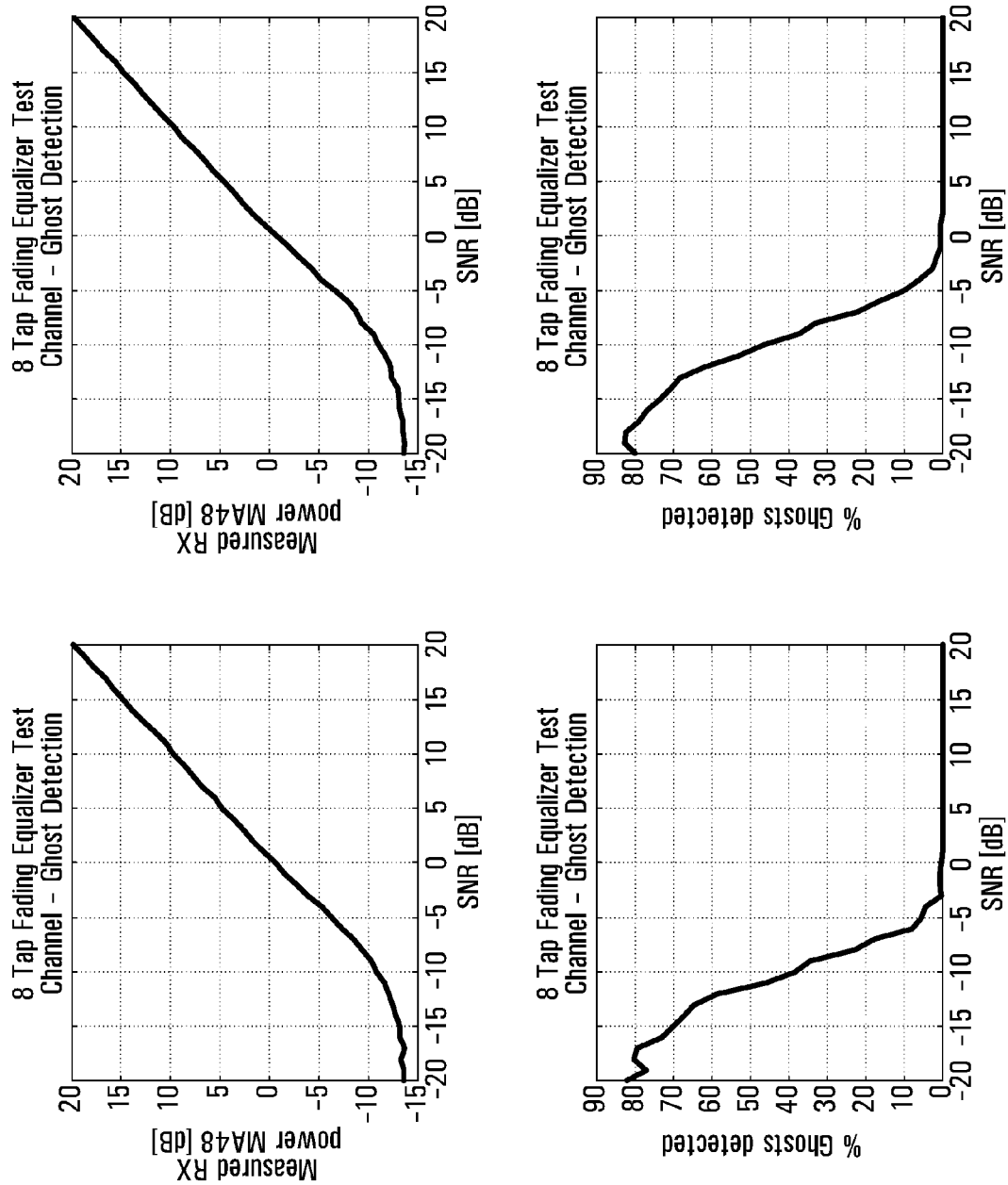
FIG. 36 depicts simulation results for fading 8 tap equalizer test channel and no interference.

FIG. 36 depicts simulation results where a fading 8 tap equalizer test channel is assumed and there is no interference. The result looks fine. As expected there is no significant difference in-between best and worst case. The best case results are depicted in the left hand two plots, while the worst case results are depicted in the right hand two plots. For the best case, no other than P-CCPCH MA shift was used but 4 MA shifts were considered. For the worst case, 2 other than P-CCPCH MA shifts were used and 4 MA shifts were considered.

Figure 37:
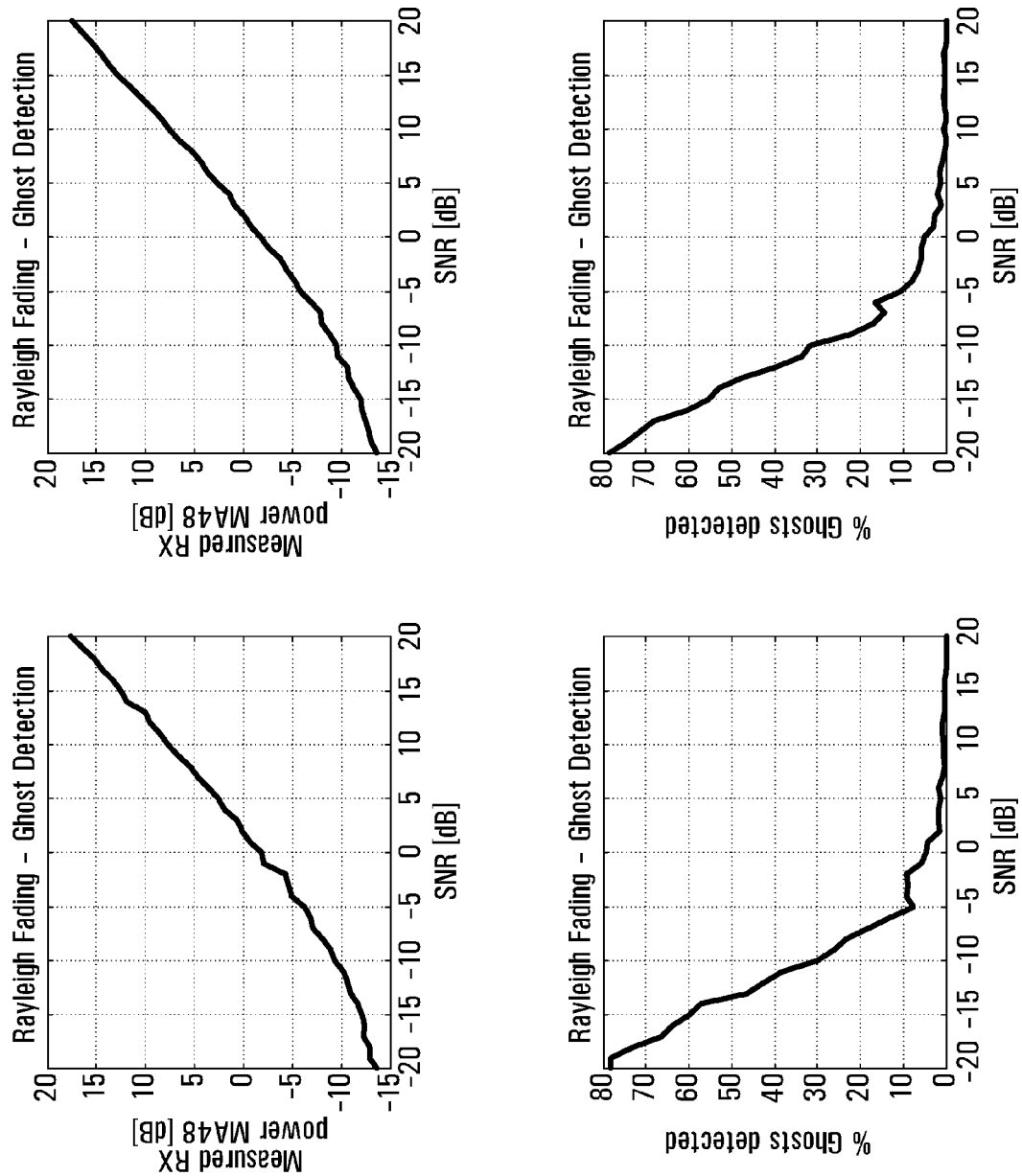
FIG. 37 depicts simulation results for Rayleigh fading and no interference.

FIG. 37 depicts simulation results where Rayleigh fading and no interference are assumed. The result looks fine. As expected there is no significant difference in-between best and worst case. The best case results are depicted in the left hand two plots, while the worst case results are depicted in the right hand two plots. For the best case, no other than P-CCPCH MA shift was used but 4 MA shifts were considered. For the worst case, 2 other than P-CCPCH MA shifts were used and 4 MA shifts were considered.

If TS0 is used for the P-CCPCH alone the described algorithms are well able to cope with the situation and provide good measurements and good detection of the ghost cells at that same time.

Once TS0 is shared with other physical channels the complexity of the algorithm needs to be stepped up sacrificing some performance nevertheless.

The P-CCPCH of other cells may be able to be detected in interference scenarios which are just providing enough SNR to detect the BCCH of that cell reasonably successful. What that SNR is required is implementation specific. Some embodiments are using the detection of the BCCH to help in making ghost cell decision.

In some embodiments, every cell should have two states reliable_cell or ghost_cell. To transit in-between the two states should is not triggered by a single measurement but by some criteria applied to multiple consecutive measurements. For example, some number of consecutive measurements, or a majority of some number of consecutive measurements (e.g. 9) must be indicative of state change in order to consider the change to have occurred.

Depending on the information of the cell make up in SIB5, it can be concluded what midamble shifts to expect and what not. Dependent on that the algorithm can be parameterized differently in order to give a better performance.

A ghost cell will have random positions for the strongest paths. It will be difficult to synchronize. In some embodiments, such information is also used to aid the identification of a ghost cell.

Since the synchronization to a ghost cell is difficult, in some embodiments, a ghost cell is searched from time to time.

In general the results assuming IC are better than the ones not using it. In some embodiments, when a ghost cell is detected with a high total receive power and no IC being performed, a systematic search for cells not included in the neighbor cell list is conducted. This might not need to be done with the full blown cell search algorithm. If the midamble of that cells is detected an offset of +/−60 chip the cell can still be recognized from the channel estimate. See the following figure. The RSCP measurement algorithm is designed anyway in a way such that with a single burst multiple estimates can be performed. Some of those could be used for looking for neighbor cells not being in the neighbor cell list. Once a candidate is found, the position is confirmed with a more precise algorithm and then the interferer not in the neighbor cell list can be used to create an unbiased estimation of the RSCP of the cells in the neighbor cell list using IC.

Expressed another way, in some embodiments, the channel estimation input for one cell may be used as an input to the channel estimation for another cell. The synchronization of the other cell needs not to be known exactly. If the input signal for the channel estimation does not coincide with the location of the midamble in the other cell, the following will be the results:

1. The channel estimate will be shifted. For example, if the midamble of the other cell comes in with 20 chip delay compared to the cell the detection was originally intended, for then the positions of the taps in the channel estimate cyclically shifts by 20 chip. That means a tap at the position 5 of the original cell would be at position 25 and a tap being at position 128 of the original cell would be at position 20.

2. The noise floor in the channel estimate is increasing. The reason is that also signal portions of the other cell which are not its midamble are in the input signal for the channel estimation. This is self-interference then.

Once there is a strong signal signature in the channel estimate either:

1. The timing is corrected. In a first example, in the case described before correction is achieved by assuming that the tap at position 25 is belonging to the P-CCPCH and has to be at position 5. Then the timing is corrected such that the processing is taking place 20 chips later. In another example, a tap on position 120 is assumed to belong to the P-CCPCH as well and should be on position 5. In this case, timing would be corrected such that processing is taking place 13 chip earlier.

In case the other cell has multiple midamble shifts in use the resulting ambiguity may be resolved by a try and error method.

After that, the synchronization of the other cell will be known, and in the case of a big timing adjustment the noise floor in the estimate should decrease.

2. The timing for the other cell is established with a cell search algorithm from scratch.

Figure 38:
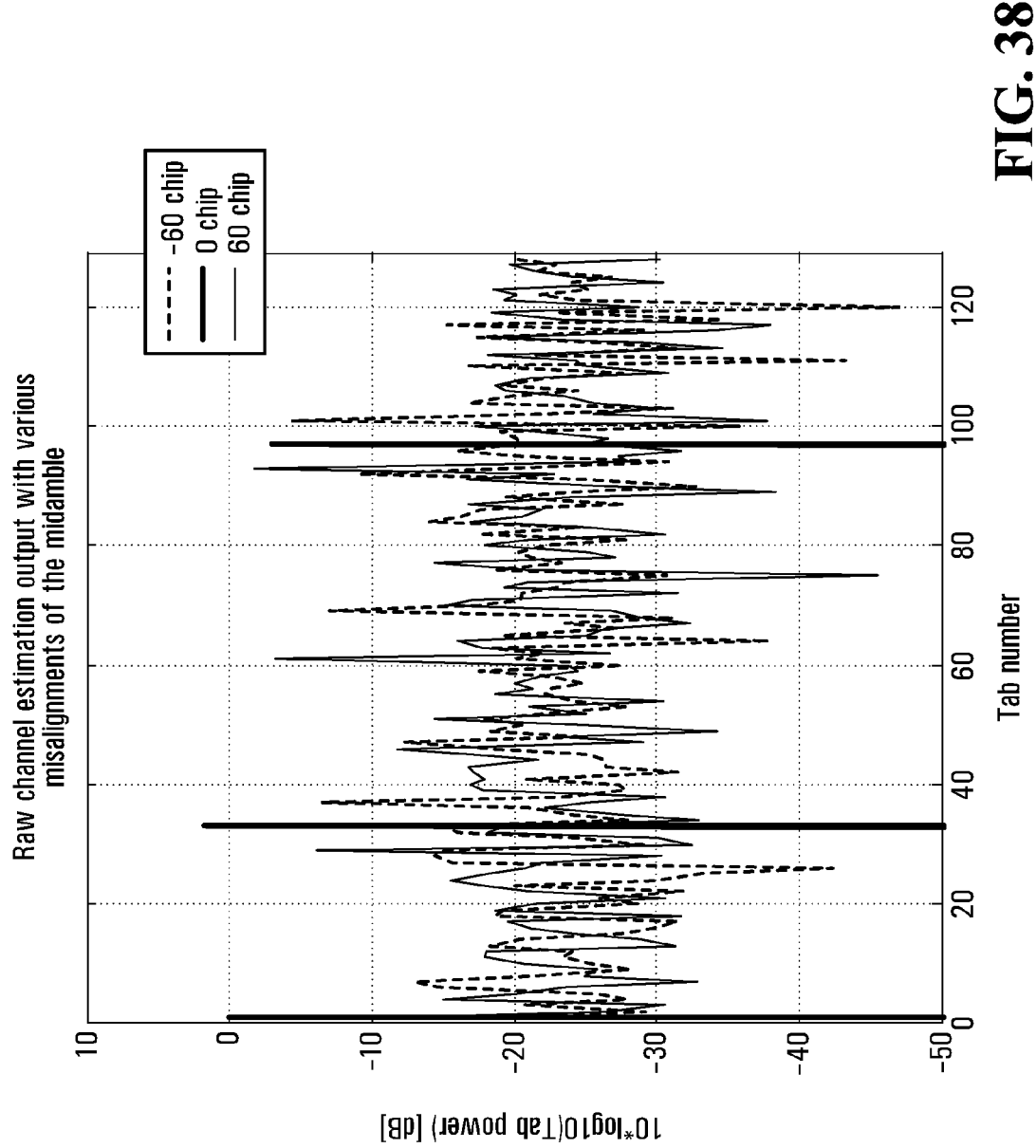
FIG. 38 depicts simulation results for raw channel estimation output with various misalignments of the midamble.

More generally, the search methods described may be used to search for unknown interfering calls in any case. FIG. 38 shows an example of raw channel estimation output with various misalignments of the midamble. For FIG. 38, it has been assumed that 3 MA shifts are used and that the burst outside the MA areas is filled with AWGN of same power as the MA.

In case the SNR on that carrier would not allow the BCCH of the cells in the neighbor cell list to be detected with sufficient quality this cell is either not reported or reported at the option of the mobile device (for neighbor cell measurements not being in need to be reported) or reported with the minimum reportable RSCP (for neighbor cell measurements which have to be reported). In case the cell has to be reported e.g. for periodic measurements it should be treated with the minimum reportable RSCP. This would provide the best performance for the ghost cell detection.

Numerous modifications and variations of the present disclosure are possible in light of the above teachings. It is therefore to be understood that within the scope of the appended claims, the disclosure may be practiced otherwise than as specifically described herein.

For example, while many of the methods and apparatuses have been described in the context of cell reselection, more generally, any of these methods can be employed in any situation where cell measurements are made, for example when making decisions regarding cell selection, cell reselection, handover, etc.

The invention claimed is:

1. A method comprising:
processing a signal to produce an interference cancellation component of a first cell;
performing signal detection for a to be detected cell operating on a same frequency as the first cell based on the signal minus the interference cancellation component if the interference cancellation component has a power that is large enough compared to a total power of the signal as defined by a first threshold;
performing signal detection for the to be detected cell based on the signal without having subtracted the interference component if the interference cancellation component has a power that is not large enough compared to the total power of the signal as defined by the first threshold;
wherein processing the signal to produce the interference cancellation component comprises:
generating a channel estimate for the signal using a cell-specific code of the first cell, the channel estimate comprising a plurality of taps;
removing certain taps from the channel estimate to produce a post-processed channel estimate;
using the cell-specific code and the channel estimate with the certain taps removed to reconstruct the interference cancellation component;
wherein performing signal detection of the to be detected cell based on the signal minus the interference cancellation component comprises using a cell-specific code of the to be detected cell; and
performing signal detection of the to be detected cell based on the signal without having subtracted the interference component comprises using the cell-specific code of the to be detected cell;
wherein removing certain taps comprises removing taps that each have a power that is small enough compared to the total power of the signal as defined by a second threshold.

2. The method of claim 1 wherein each of the taps other than the certain taps has a power that is large enough compared to the average power of taps other than the certain taps as defined by a second threshold.

3. A method comprising:
processing a signal to produce a channel estimate in respect of a first cell, the channel estimate comprising a plurality of taps;
removing certain taps from the channel estimate to leave remaining taps and then producing an interference cancellation component from the remaining taps;
performing first signal detection of a to be detected cell operating on a same frequency as the first cell based on the signal minus the interference cancellation component to produce a first signal detection result;
performing second signal detection of the to be detected cell based on the signal without having subtracted the interference cancellation component to produce a second signal detection result;
selecting between the first signal detection result and the second signal detection result;
wherein:
performing first signal detection comprises performing channel estimation to produce a first channel estimate comprising a plurality of taps and removing certain taps to produce a first post-processed channel estimate;
performing second signal detection comprises performing channel estimation to produce a second channel estimate comprising a plurality of taps and removing certain taps to produce a second post-processed channel estimate;
selecting between the first signal detection result and the second signal detection result is based on:
the power of taps in the first post-processed channel estimate; the power of taps in the second post-processed channel estimate; the average power of taps in the first channel estimate; and
the average power of taps in the second channel estimate.

4. The method of claim 3 wherein selecting comprises:
for the first signal detection, determining a ratio of a sum of powers of the taps remaining after removing certain taps to the average power of taps of the first channel estimate;
for the second signal detection, determining a ratio of a sum of powers of the taps remaining after removing certain taps to the average power of taps of the second channel estimate;
selecting the result with the larger ratio.

5. A method comprising:
processing a signal to produce an interference cancellation component that is an estimate of a component of the signal that is due to a first cell by:
generating a channel estimate for the signal using a cell-specific code of the first cell to produce a channel estimate comprising a plurality of taps;
removing certain taps from the channel estimate to produce a post-processed channel estimate;
producing the interference cancellation component using post-processed channel estimate;
performing channel estimation of a to be detected cell operating on a same frequency as the first cell based on the signal minus the interference cancellation component by:
generating a channel estimate for the to be detected cell using a cell-specific code of the to be detected cell;
removing certain taps from the channel estimate to produce a channel estimate with certain taps removed for the to be detected cell;
the method further comprising at least one of:
a) discarding the channel estimate with certain taps removed for the to be detected cell and/or reporting a lowest reportable value and/or processing a very small value and/or not reporting the channel estimate if a combined power of the taps of the channel estimate with certain taps removed that define a to be measured channel for the to be detected cell is below a total receive power for the signal by a threshold amount; and
b) discarding the channel estimate with certain taps removed for the to be detected cell and/or reporting a lowest reportable value and/or processing a very small value and/or not reporting the channel estimate if a combined power of the taps of the channel estimate with certain taps removed for the first cell is small enough compared to a total receive power for the signal as defined by a threshold amount.

6. The method of claim 5 wherein using a regression approach comprises:
sorting the plurality of taps into a sorted list;
performing a regression on a subset of taps in a sorted list representing interference and noise to produce a regression result;
removing taps that are not large enough compared to the regression result as defined by a threshold.

7. A method according to claim 5, comprising:
without first performing interference cancellation, a mobile device processing the signal to detect a ghost cell, the ghost cell being a cell with an unreliable measurement result as defined by ghost cell detection criteria;
in case the ghost cell is detected, the mobile device systematically searching for cells and their midamble codes which are not in a neighbor cell list;
for each cell found as a result of the systematic search, the wireless device applying interference cancellation of a component of the received signal due to the cell if a total received power as defined by a sum of taps of a post processed channel estimate of the cell is large enough as defined by a threshold compared to the overall received power of the midamble.

8. A method according to claim 5, comprising:
processing the signal to detect a cell in accordance with a ghost cell detection criteria, a ghost cell being a cell with an unreliable measurement result as defined by the ghost cell detection criteria;
in case a cell is detected with the ghost detection threshold, determining that the cell is a ghost cell if the cell's BCCH (broadcast control channel) cannot be detected;
determining that the cell is not a ghost cell if the cell's BCCH can be detected successfully.

9. The method of claim 5 further comprising:
determining if a cell measurement is reliable or unreliable in accordance with a criteria that spans over multiple measurement intervals.

10. The method of claim 5 further comprising:
processing the signal to detect a cell in accordance with a ghost cell detection criteria, a ghost cell being a cell with an unreliable measurement result as defined by the ghost cell detection criteria;
looking systematically for cells that are not included in a neighbor cell list, and if some are found, treating them as known cells, for the purpose of performing interference cancellation;
at least one of:
if no such cell is found, then declaring the cell detected in accordance with the ghost detection criteria to be a ghost cell;
if no such cell is found, attempting to detect a BCCH of the cell, and declaring the cell detected in accordance with the ghost detection criteria to be a ghost cell if the BCCH cannot be detected.

11. A method of claim 5 further comprising:
assigning one of two states to a cell, the two states being reliable_cell or ghost_cell;
transitioning between the two states on the basis of a criteria applied to multiple consecutive measurements.

12. A method of claim 5 further comprising:
recognizing when it is difficult to synchronize to a cell, and using such information to aid the identification of a ghost cell.

13. A method of claim 5 further comprising:
when a ghost cell is detected with a high total receive power and no interference cancellation being performed, performing a systematic search for cells not included in a neighbor cell list, and if some are found treating them as known cells for the purpose of interference cancellation.

14. A method of processing a signal, the method comprising:
obtaining a channel estimate for a cell, the channel estimate comprising a plurality of taps;
removing certain taps from the channel estimate;
if a combined power of taps of the channel estimate after removing certain taps that define a to be measured channel is less than a certain threshold below an amount based on a total power of the signal, discarding the channel estimate for the cell and/or reporting a minimum reportable receive power and/or processing a very small value;
wherein removing certain taps from the channel estimate comprises one of:
using a regression approach to differentiate between the taps to be removed and the taps not to be removed; and
removing taps that each have a power that is small enough compared to the total power of the signal as defined by a second threshold.

15. The method of claim 14 wherein taps other than the certain taps are those that each have a power that is large enough compared to the average power of the certain taps as defined by a second threshold.

16. A method comprising:
without first performing interference cancellation, a mobile device processing a signal to detect a ghost cell, the ghost cell being a cell with an unreliable measurement result as defined by ghost cell detection criteria;
in case the ghost cell is detected, the mobile device systematically searching for cells and their midamble codes which are not in a neighbor cell list;
for each cell found as a result of the systematic search, the wireless device applying interference cancellation of a component of the received signal due to the cell if a total received power as defined by a sum of taps of a post processed channel estimate of the cell is large enough as defined by a threshold compared to the overall received power of the midamble.

* * * * *